United States Patent
Zhao

(10) Patent No.: US 10,154,316 B2
(45) Date of Patent: Dec. 11, 2018

(54) MOTION-BASED CONFIGURATION OF A MULTI-USER DEVICE

(71) Applicant: Apple Inc., Cupertino, CA (US)

(72) Inventor: Lu Zhao, Markham (CA)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/274,887

(22) Filed: Sep. 23, 2016

(65) Prior Publication Data

US 2017/0251268 A1 Aug. 31, 2017

Related U.S. Application Data

(60) Provisional application No. 62/300,632, filed on Feb. 26, 2016.

(51) Int. Cl.
*H04N 7/18* (2006.01)
*H04N 21/485* (2011.01)
(Continued)

(52) U.S. Cl.
CPC ....... *H04N 21/485* (2013.01); *H04N 21/4126* (2013.01); *H04N 21/422* (2013.01);
(Continued)

(58) Field of Classification Search
CPC ............. H04N 21/485; H04N 21/4126; H04N 21/422; H04N 21/4415; H04N 21/4532;
(Continued)

(56) References Cited

U.S. PATENT DOCUMENTS

| 5,483,261 A | 1/1996 | Yasutake |
| 5,488,204 A | 1/1996 | Mead et al. |
| (Continued) | | |

FOREIGN PATENT DOCUMENTS

| JP | 2000-163031 A | 6/2000 |
| JP | 2002-342033 A | 11/2002 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
(Continued)

*Primary Examiner* — John R Schnurr
(74) *Attorney, Agent, or Firm* — Morrison & Foerster LLP

(57) ABSTRACT

In some embodiments, an electronic device obtains first motion information describing motion of an accessory of a multi-user device that is in communication with a display, and obtains second motion information describing motion of a user device that is associated with a first profile, wherein the motions of the accessory and the user device are detected during the first time period. In response to obtaining the first motion information of the accessory and/or the second motion information of the user device, in accordance with a determination that the motion of the accessory and the motion of the user device satisfy profile-switching criteria, including a criterion that is satisfied when the motion of the accessory and the motion of the user device have corresponding movement profiles during the first time period, the electronic device optionally initiates a process for configuring the multi-user device based on the first profile.

90 Claims, 38 Drawing Sheets

(51) Int. Cl.
*H04N 21/41* (2011.01)
*H04N 21/422* (2011.01)
*H04N 21/4415* (2011.01)
*H04N 21/45* (2011.01)
*H04N 21/466* (2011.01)
*H04N 21/845* (2011.01)
*H04N 21/475* (2011.01)

(52) U.S. Cl.
CPC ... *H04N 21/42204* (2013.01); *H04N 21/4415* (2013.01); *H04N 21/4532* (2013.01); *H04N 21/4667* (2013.01); *H04N 21/4751* (2013.01); *H04N 21/8456* (2013.01)

(58) Field of Classification Search
CPC .......... H04N 21/4667; H04N 21/8456; H04N 21/441; H04N 21/44218; H04N 21/4661
See application file for complete search history.

(56) References Cited

U.S. PATENT DOCUMENTS

| | | | |
|---|---|---|---|
| 5,825,352 | A | 10/1998 | Bisset et al. |
| 5,835,079 | A | 11/1998 | Shieh |
| 5,880,411 | A | 3/1999 | Gillespie et al. |
| 6,188,391 | B1 | 2/2001 | Seely et al. |
| 6,310,610 | B1 | 10/2001 | Beaton et al. |
| 6,323,846 | B1 | 11/2001 | Westerman et al. |
| 6,690,387 | B2 | 2/2004 | Zimmerman et al. |
| 7,015,894 | B2 | 3/2006 | Morohoshi |
| 7,184,064 | B2 | 2/2007 | Zimmerman et al. |
| 7,663,607 | B2 | 2/2010 | Hotelling et al. |
| 8,479,122 | B2 | 7/2013 | Hotelling et al. |
| 2004/0127197 | A1 | 7/2004 | Roskind |
| 2006/0197753 | A1 | 9/2006 | Hotelling |
| 2009/0086010 | A1 | 4/2009 | Tiphane |
| 2013/0088650 | A1* | 4/2013 | Rouady .............. H04N 21/4432 348/734 |
| 2014/0330945 | A1 | 11/2014 | Dabbiere et al. |
| 2015/0049018 | A1 | 2/2015 | Gomez |
| 2015/0106833 | A1* | 4/2015 | Kang ..................... G06F 3/017 725/25 |
| 2015/0153928 | A1* | 6/2015 | Chen ................... G06F 3/04886 715/863 |
| 2016/0094881 | A1* | 3/2016 | Khatua ............ H04N 21/44218 725/10 |
| 2016/0198322 | A1* | 7/2016 | Pitis ...................... H04W 4/008 455/420 |
| 2017/0055110 | A1* | 2/2017 | Tian ....................... G04G 21/04 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

International Search Report dated Apr. 28, 2017, for PCT Application No. PCT/US17/17525, filed Feb. 10, 2017, three pages.

* cited by examiner

MOTION-BASED CONFIGURATION OF A MULTI-USER DEVICE

CROSS-REFERENCE TO RELATED APPLICATION

This application claims the benefit of U.S. Provisional Application No. 62/300,632, filed Feb. 26, 2016, the entire disclosure of which is herein incorporated by reference for all purposes.

FIELD OF THE DISCLOSURE

This relates generally to configuring multi-user devices based on one or more user profiles.

BACKGROUND OF THE DISCLOSURE

User interaction with electronic devices has increased significantly in recent years. These devices can be devices such as computers, tablet computers, televisions, multimedia devices, mobile devices, set-top boxes, and the like.

In some circumstances, such a device is a multi-user device, and has access to different content, personalization options, passwords and/or other credentials depending on with which user profile the multi-user device is configured. Enhancing a user's ability to switch profiles on a multi-user device improves the user's experience with the device and decreases user interaction time, which is particularly important where input devices are battery-operated.

SUMMARY OF THE DISCLOSURE

The embodiments described in this disclosure are directed to ways in which a user configures a multi-user device (e.g., a set-top box) with on one or more profiles using motion of an accessory of the multi-user device (e.g., a remote control) and/or a user device (e.g., a watch). The full descriptions of the embodiments are provided in the Drawings and the Detailed Description, and it is understood that the Summary provided above does not limit the scope of the disclosure in any way.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

DETAILED DESCRIPTION

Figure 1A:
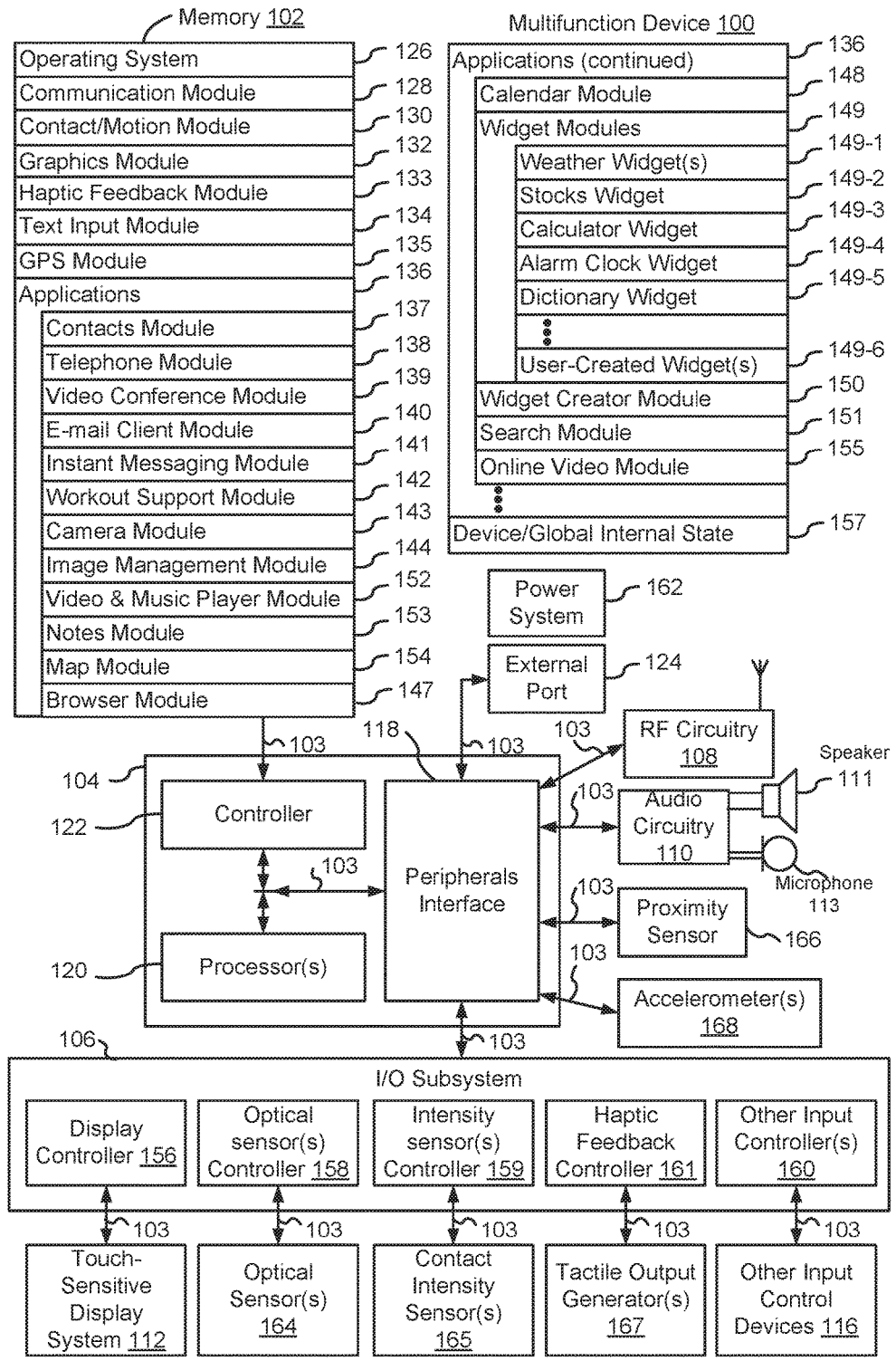
FIG. 1A is a block diagram illustrating a multifunction device with a touch-sensitive display in accordance with some embodiments of the disclosure.

In the following description of embodiments, reference is made to the accompanying drawings which form a part hereof, and in which it is shown by way of illustration specific embodiments that are optionally practiced. It is to be understood that other embodiments are optionally used and structural changes are optionally made without departing from the scope of the disclosed embodiments.

Exemplary Devices

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops, tablet computers, wearable devices (e.g., watches), etc., with touch-sensitive surfaces (e.g., touch screen displays and/or touch pads), are, optionally, used. It should also be understood that, in some embodiments, the device is not a portable communications device, but is a desktop computer or a television with a touch-sensitive surface (e.g., a touch screen display and/or a touch pad). In some embodiments, the device does not have a touch screen display and/or a touch pad, but rather is capable of outputting display information (such as the user interfaces of the disclosure) for display on a separate display device, and capable of receiving input information from a separate input device having one or more input mechanisms (such as one or more buttons, a touch screen display and/or a touch pad). In some embodiments, the device has a display, but is capable of receiving input information from a separate input device having one or more input mechanisms (such as one or more buttons, a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable or non-portable devices with touch-sensitive displays, though the devices need not include touch-sensitive displays or displays in general, as described above. FIG. 1A is a block diagram illustrating portable or non-portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable or non-portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits. Further, the various components shown in FIG. 1A are optionally implemented across two or more devices; for example, a display and audio circuitry on a display device, a touch-sensitive surface on an input device, and remaining components on device 100. In such an embodiment, device 100 optionally communicates with the display device and/or the input device to facilitate operation of the system, as described in the disclosure, and the various components described herein that relate to display and/or input remain in device 100, or are optionally included in the display and/or input device, as appropriate.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU 120 and the peripherals interface 118, is, optionally, controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display 112 provides an input interface and an output interface between the device and a user. As described above, the touch-sensitive operation and the display operation of touch-sensitive display 112 are optionally separated from each other, such that a display device is used for display purposes and a touch-sensitive surface (whether display or not) is used for input detection purposes, and the described components and functions are modified accordingly. However, for simplicity, the following description is provided with reference to a touch-sensitive display. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112.

In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable or non-portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device, so that the touch screen display is enabled for use as a viewfinder for still and/or video image acquisition. In some embodiments, another optical sensor is located on the front of the device so that the user's image is, optionally, obtained for videoconferencing while the user views the other video conference participants on the touch screen display.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is coupled to input controller 160 in I/O subsystem 106. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
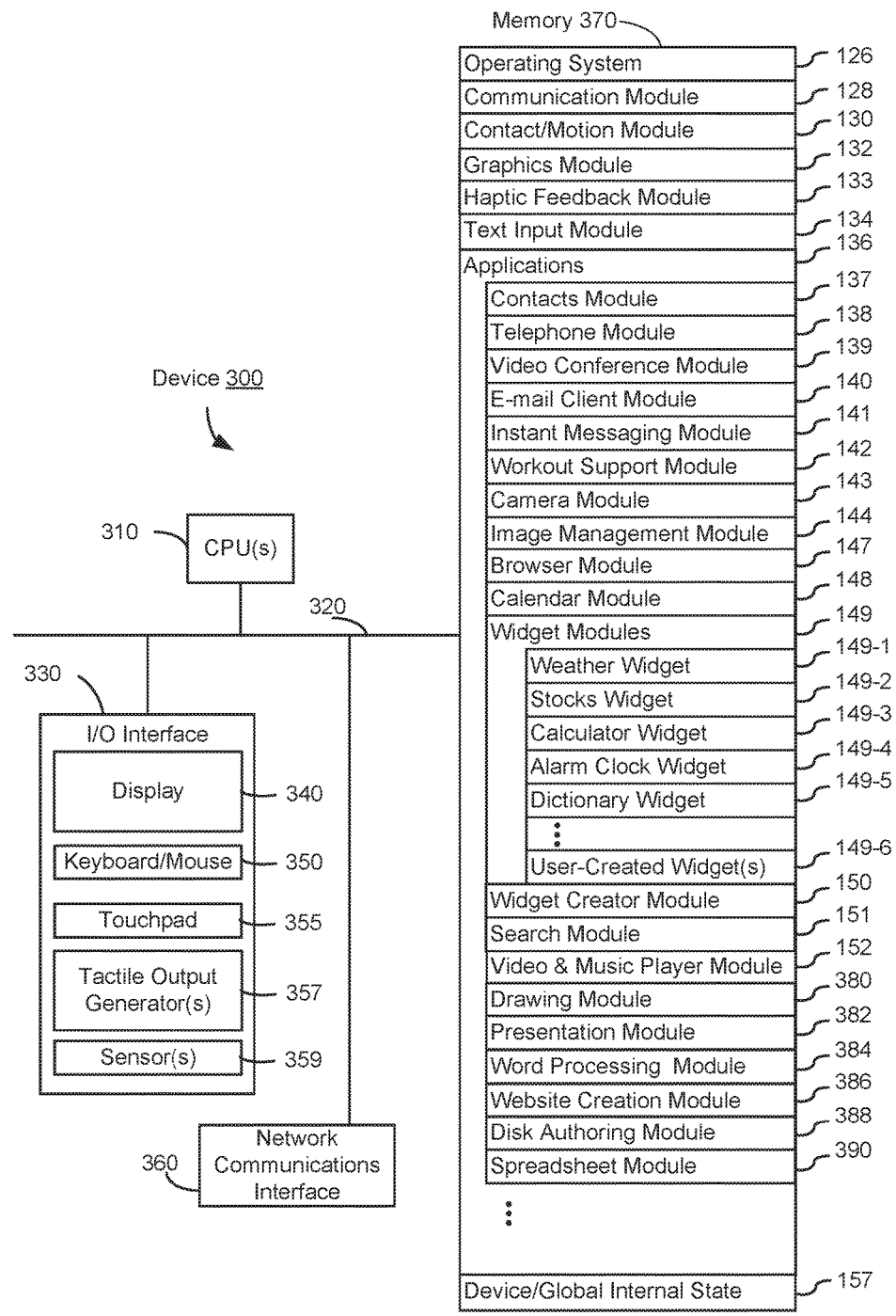
FIG. 3 is a block diagram of an exemplary multifunction device with a display and a touch-sensitive surface in accordance with some embodiments of the disclosure.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact) determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns and intensities. Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  browser module 147;

calendar module 148;

widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;

widget creator module 150 for making user-created widgets 149-6;

search module 151;

video and music player module 152, which is, optionally, made up of a video player module and a music player module;

notes module 153;

map module 154;

online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 are, optionally, used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 are, optionally, used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 are, optionally, used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (e.g., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad (whether included in device 100 or on a separate device, such as an input device). By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In some embodiments, a "menu button" is implemented using a touchpad. In some other embodiments, the menu button is a physical push button or other physical input control device instead of a touchpad.

Figure 1B:
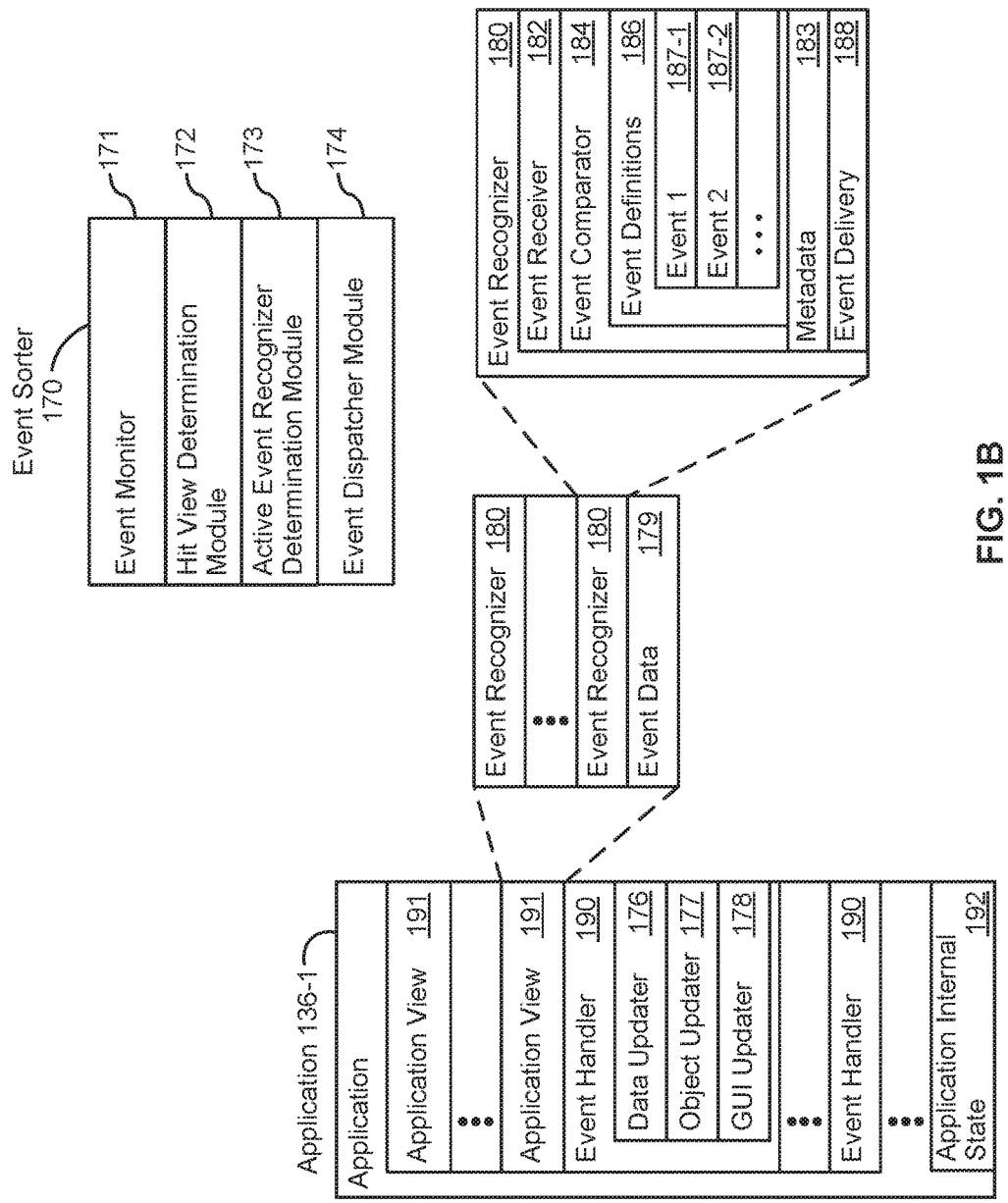
FIG. 1B is a block diagram illustrating exemplary components for event handling in accordance with some embodiments of the disclosure.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object.

In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays and/or touchpads also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
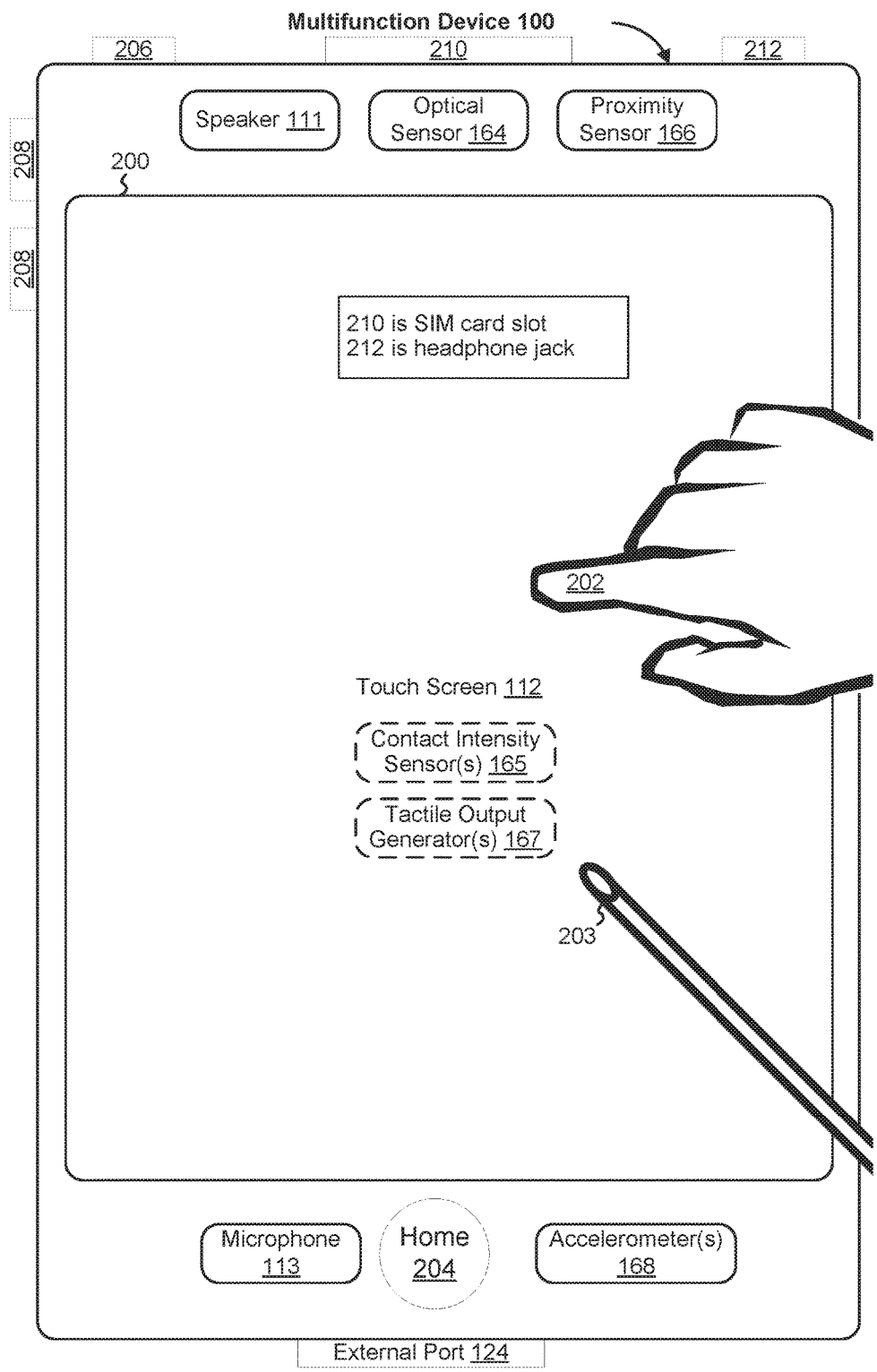
FIG. 2 illustrates a multifunction device having a touch screen in accordance with some embodiments of the disclosure.

FIG. 2 illustrates a portable or non-portable multifunction device 100 having a touch screen 112 in accordance with some embodiments. As stated above, multifunction device 100 is described as having the various illustrated structures (such as touch screen 112, speaker 111, accelerometer 168, microphone 113, etc.); however, it is understood that these structures optionally reside on separate devices. For example, display-related structures (e.g., display, speaker, etc.) and/or functions optionally reside on a separate display device, input-related structures (e.g., touch-sensitive surface, microphone, accelerometer, etc.) and/or functions optionally reside on a separate input device, and remaining structures and/or functions optionally reside on multifunction device 100.

The touch screen 112 optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As previously described, menu button 204 is, optionally, used to navigate to any application 136 in a set of applications that are, optionally executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not include the display and the touch-sensitive surface, as described above, but rather, in some embodiments, optionally communicates with the display and the touch-sensitive surface on other devices. Additionally, device 300 need not be portable. In some embodiments, device 300 is a laptop computer, a desktop computer, a tablet computer, a multimedia player device (such as a television or a set-top box), a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable or non-portable multifunction device 100 (FIG. 1A), or a subset thereof. Furthermore, memory 370 optionally stores additional programs, modules, and data structures not present in memory 102 of portable or non-portable multifunction device 100. For example, memory 370 of device 300 optionally stores drawing module 380, presentation module 382, word processing module 384, website creation module 386, disk authoring module 388, and/or spreadsheet module 390, while memory 102 of portable or non-portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (e.g., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Figure 4:
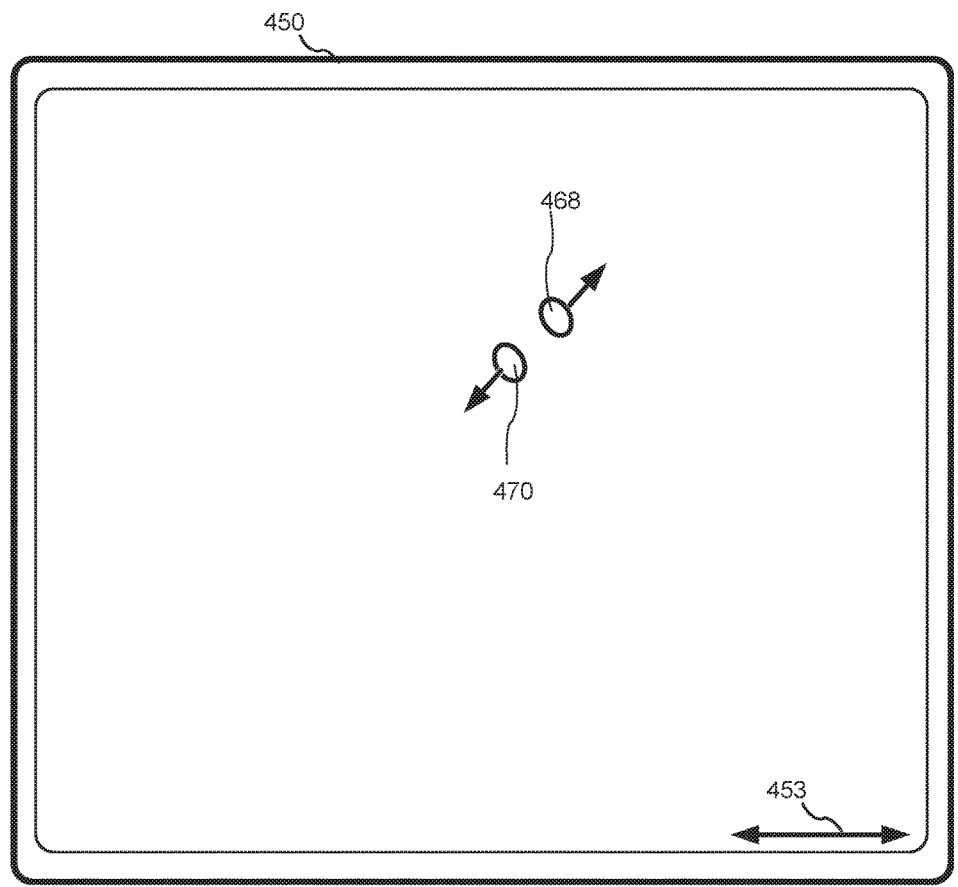
FIG. 4 illustrates an exemplary user interface for a multifunction device with a touch-sensitive surface that is separate from the display in accordance with some embodiments of the disclosure.
Figure 4:
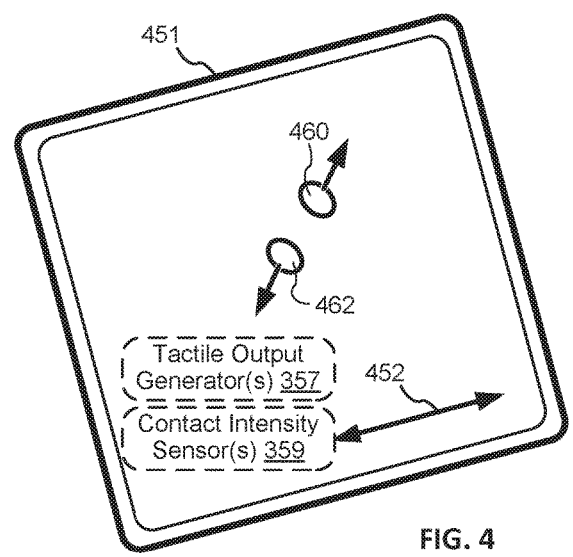

FIG. 4 illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4. In some embodiments the touch sensitive surface (e.g., 451 in FIG. 4) has a primary axis (e.g., 452 in FIG. 4) that corresponds to a primary axis (e.g., 453 in FIG. 4) on the display (e.g., 450). In accordance with these embodiments, the device detects contacts (e.g., 460 and 462 in FIG. 4) with the touch-sensitive surface 451 at locations that correspond to respective locations on the display (e.g., in FIG. 4, 460 corresponds to 468 and 462 corresponds to 470). In this way, user inputs (e.g., contacts 460 and 462, and movements thereof) detected by the device on the touch-sensitive surface (e.g., 451 in FIG. 4) are used by the device to manipulate the user interface on the display (e.g., 450 in FIG. 4) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Figure 5A:
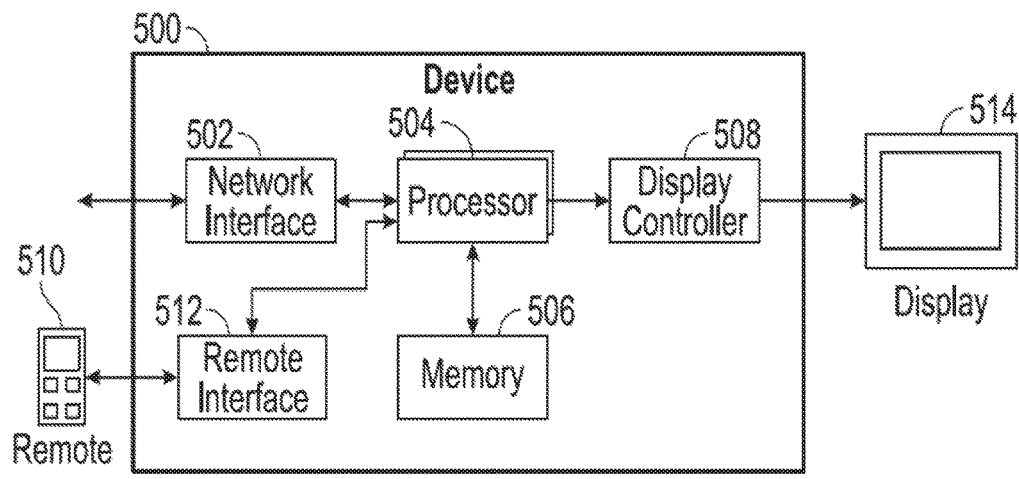
FIGS. 5A-5B illustrate block diagrams of exemplary architectures for devices according to some embodiments of the disclosure.

FIG. 5A illustrates a block diagram of an exemplary architecture for the device 500 according to some embodiments of the disclosure. In the embodiment of FIG. 5A, media or other content is optionally received by device 500 via network interface 502, which is optionally a wireless or wired connection. The one or more processors 504 optionally execute any number of programs stored in memory 506 or storage, which optionally includes instructions to perform one or more of the methods and/or processes described herein (e.g., method 700).

In some embodiments, display controller 508 causes the various user interfaces of the disclosure to be displayed on display 514. Further, input to device 500 is optionally provided by remote 510 via remote interface 512, which is optionally a wireless or a wired connection. It is understood that the embodiment of FIG. 5A is not meant to limit the features of the device of the disclosure, and that other components to facilitate other features described in the disclosure are optionally included in the architecture of FIG. 5A as well. In some embodiments, device 500 optionally corresponds to one or more of multifunction device 100 in FIGS. 1A and 2 and device 300 in FIG. 3; network interface 502 optionally corresponds to one or more of RF circuitry 108, external port 124, and peripherals interface 118 in FIGS. 1A and 2, and network communications interface 360 in FIG. 3; processor 504 optionally corresponds to one or more of processor(s) 120 in FIG. 1A and CPU(s) 310 in FIG. 3; display controller 508 optionally corresponds to one or more of display controller 156 in FIG. 1A and I/O interface 330 in FIG. 3; memory 506 optionally corresponds to one or more of memory 102 in FIG. 1A and memory 370 in FIG. 3; remote interface 512 optionally corresponds to one or more of peripherals interface 118, and I/O subsystem 106 (and/or its components) in FIG. 1A, and I/O interface 330 in FIG. 3; remote 512 optionally corresponds to and or includes one or more of speaker 111, touch-sensitive display system 112, microphone 113, optical sensor(s) 164, contact intensity sensor(s) 165, tactile output generator(s) 167, other input control devices 116, accelerometer(s) 168, proximity sensor 166, and I/O subsystem 106 in FIG. 1A, and keyboard/mouse 350, touchpad 355, tactile output generator(s) 357, and contact intensity sensor(s) 359 in FIG. 3, and touch-sensitive surface 451 in FIG. 4; and, display 514 optionally corresponds to one or more of touch-sensitive display system 112 in FIGS. 1A and 2, and display 340 in FIG. 3.

Figure 5B:
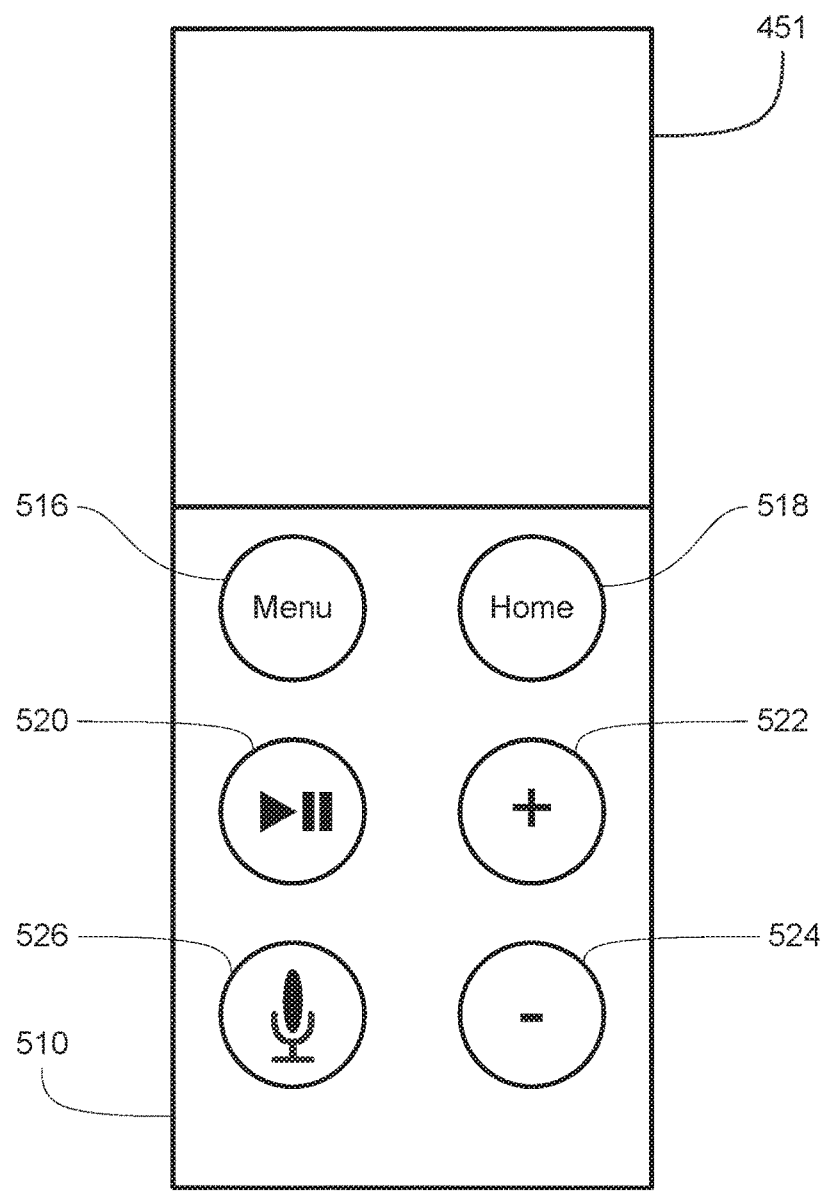

FIG. 5B illustrates an exemplary structure for remote 510 according to some embodiments of the disclosure. In some embodiments, remote 510 optionally corresponds to one or more of multifunction device 100 in FIGS. 1A and 2 and device 300 in FIG. 3. Remote 510 optionally includes touch-sensitive surface 451. In some embodiments, touch-sensitive surface 451 is edge-to-edge (e.g., it extends to the edges of remote 510, such that little or no surface of remote 510 exists between the touch-sensitive surface 451 and one or more edges of remote 510, as illustrated in FIG. 5B). Touch-sensitive surface 451 is optionally able to sense contacts as well as contact intensities (e.g., clicks of touch-sensitive surface 451), as previously described in this disclosure. Remote 510 also optionally includes buttons 516, 518, 520, 522, 524 and 526. Buttons 516, 518, 520, 522, 524 and 526 are optionally mechanical buttons or mechanical button alternatives that are able to sense contact with, or depression of, such buttons to initiate corresponding action (s) on, for example, device 500. In some embodiments, selection of "menu" button 516 by a user navigates device 500 backwards in a currently-executing application or currently-displayed user interface (e.g., back to a user interface that was displayed previous to the currently-displayed user interface), or navigates device 500 to a one-higher-level user interface than the currently-displayed user interface. In some embodiments, selection of "home" button 518 by a user navigates device 500 to a main, home, or root user interface from any user interface that is displayed on device 500 (e.g., to a home screen of device 500 that optionally includes one or more applications accessible on device 500). In some embodiments, selection of "play/pause" button 520 by a user toggles between playing and pausing a currently-playing content item on device 500 (e.g., if a content item is playing on device 500 when "play/pause" button 520 is selected, the content item is optionally paused, and if a content item is paused on device 500 when "play/pause" button 520 is selected, the content item is optionally played). In some embodiments, selection of "+" 522 or "−" 524 buttons by a user increases or decreases, respectively, the volume of audio reproduced by device 500 (e.g., the volume of a content item currently-playing on device 500). In some embodiments, selection of "audio input" button 526 by a user allows the user to provide audio input (e.g., voice input) to device 500, optionally, to a voice assistant on the device. In some embodiments, remote 510 includes a microphone via which the user provides audio input to device 500 upon selection of "audio input" button 526. In some embodiments, remote 510 includes one or more accelerometers for detecting information about the motion of the remote; the accelerometers are optionally utilized in the manners provided in the descriptions of embodiments set forth below.

User Interfaces and Associated Processes

Motion-Based Profile Switching

Users interact with electronic devices in many different manners. In some circumstances, the electronic devices are multi-user devices that are configurable based on different profiles to give the multi-user devices access to different content, personalization options, passwords and/or other credentials associated with the different profiles. At times, users may wish to switch the profile on which the configuration of a multi-user device is based, without being required to manually input profile information (e.g., profile user names and passwords) into the multi-user device. The embodiments described below provide ways in which a user configures a multi-user device (e.g., a set-top box) based on one or more profiles using the motion of an accessory of the multi-user device (e.g., a remote control) and/or a user device (e.g., a watch), thereby enhancing the user's interactions with the multi-user device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 6A:
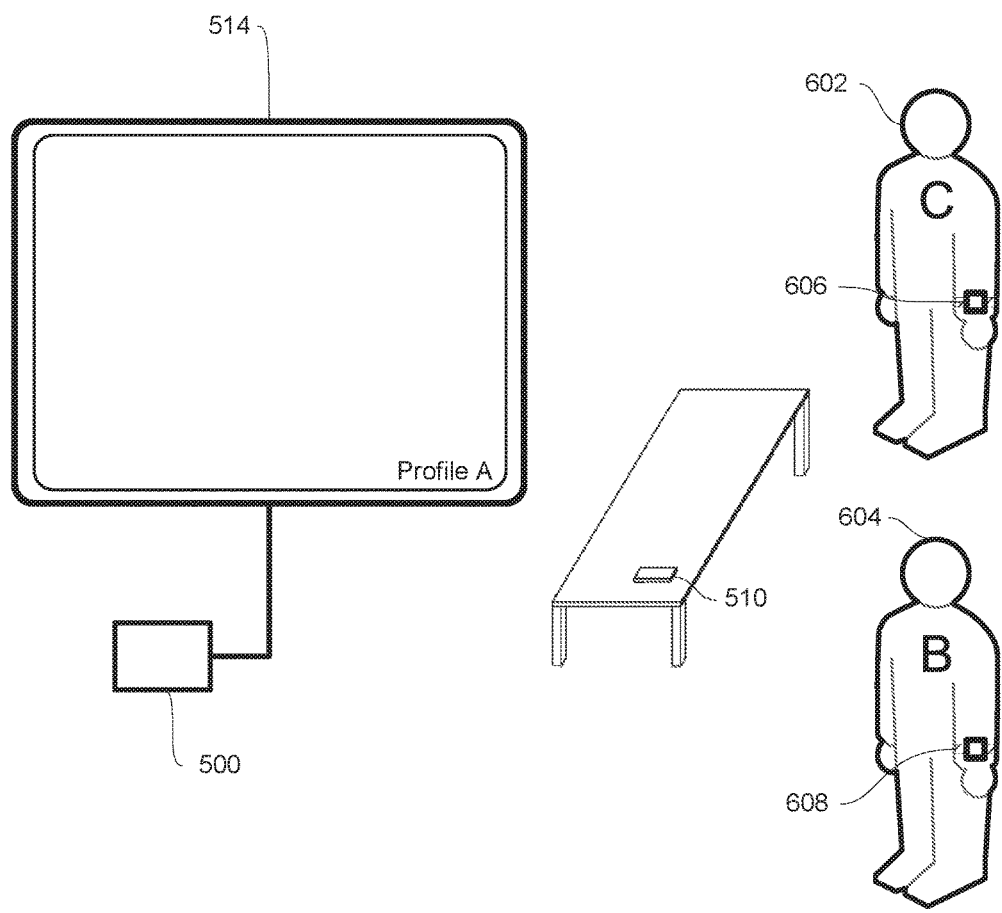
FIGS. 6A-6T illustrate exemplary motion-based ways in which configuration of a multi-user device based on one or more profiles is initiated in accordance with some embodiments of the disclosure.
Figure 6B:
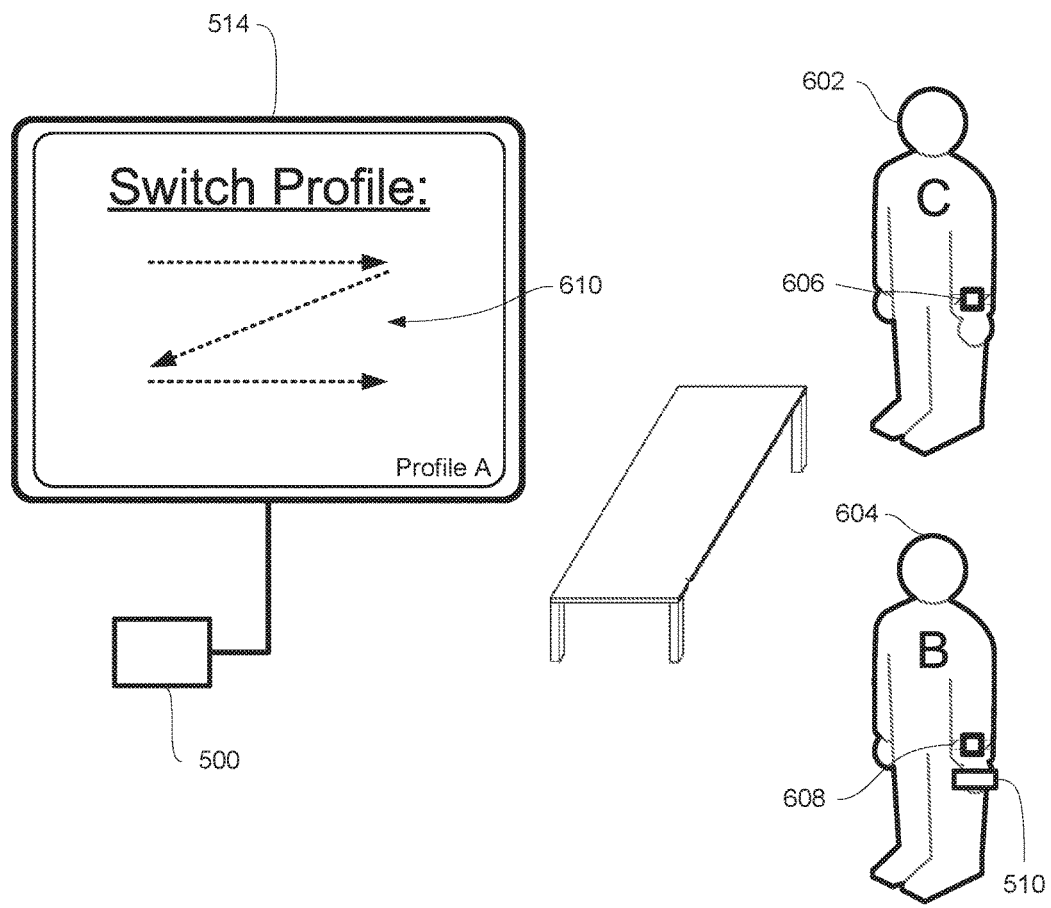
Figure 6C:
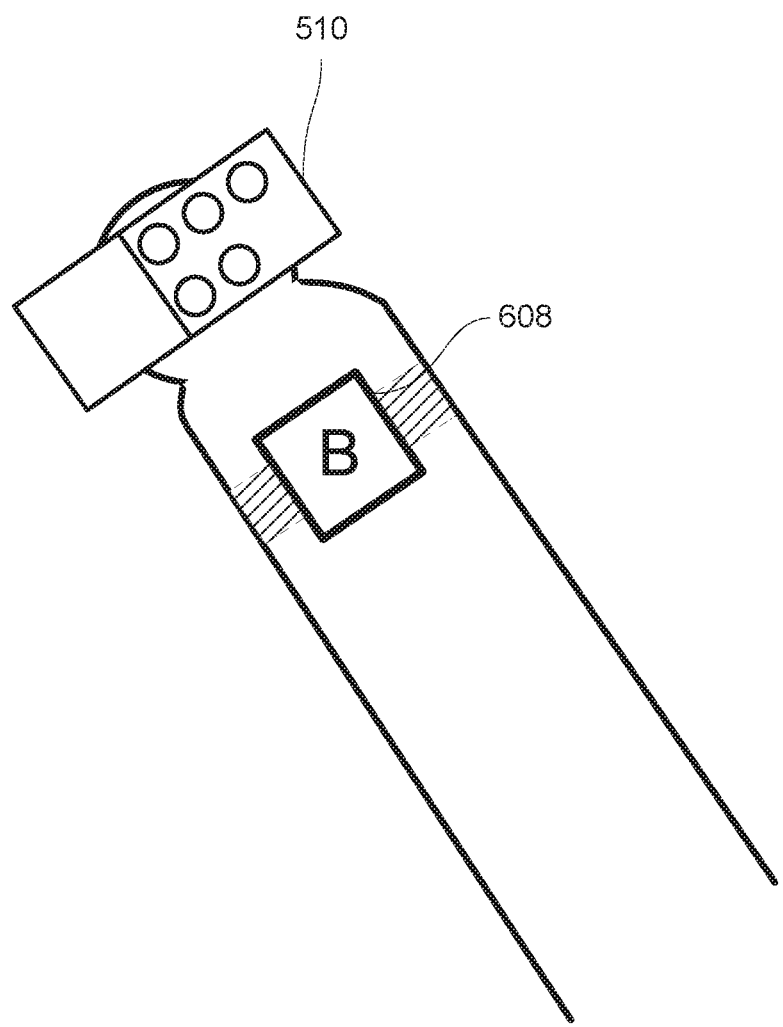
Figure 6D:
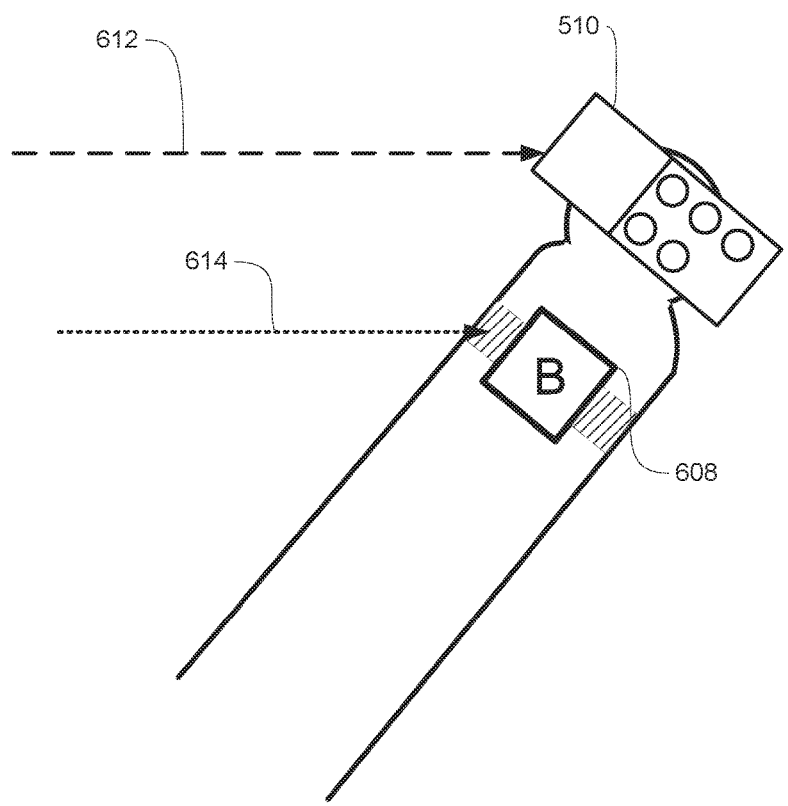
Figure 6E:
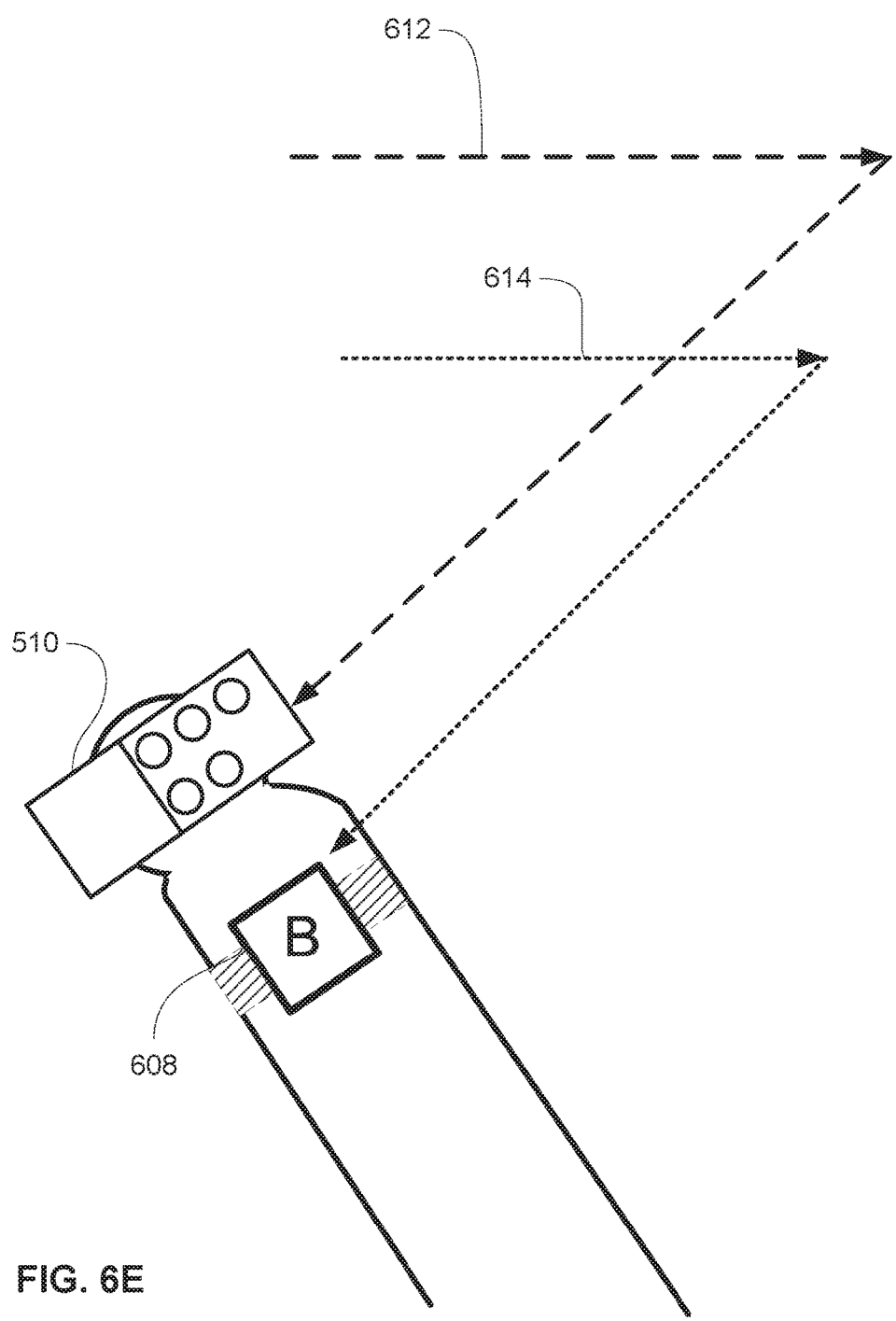
Figure 6F:
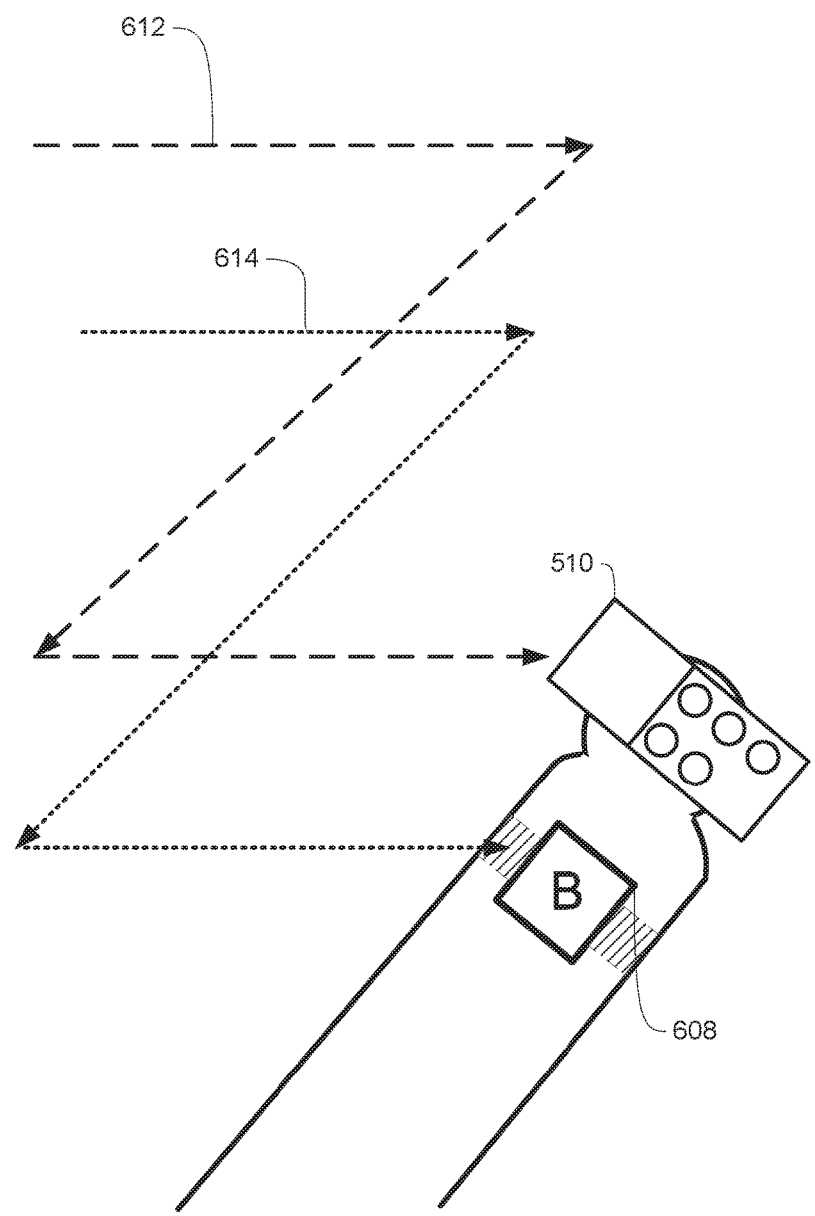
Figure 6G:
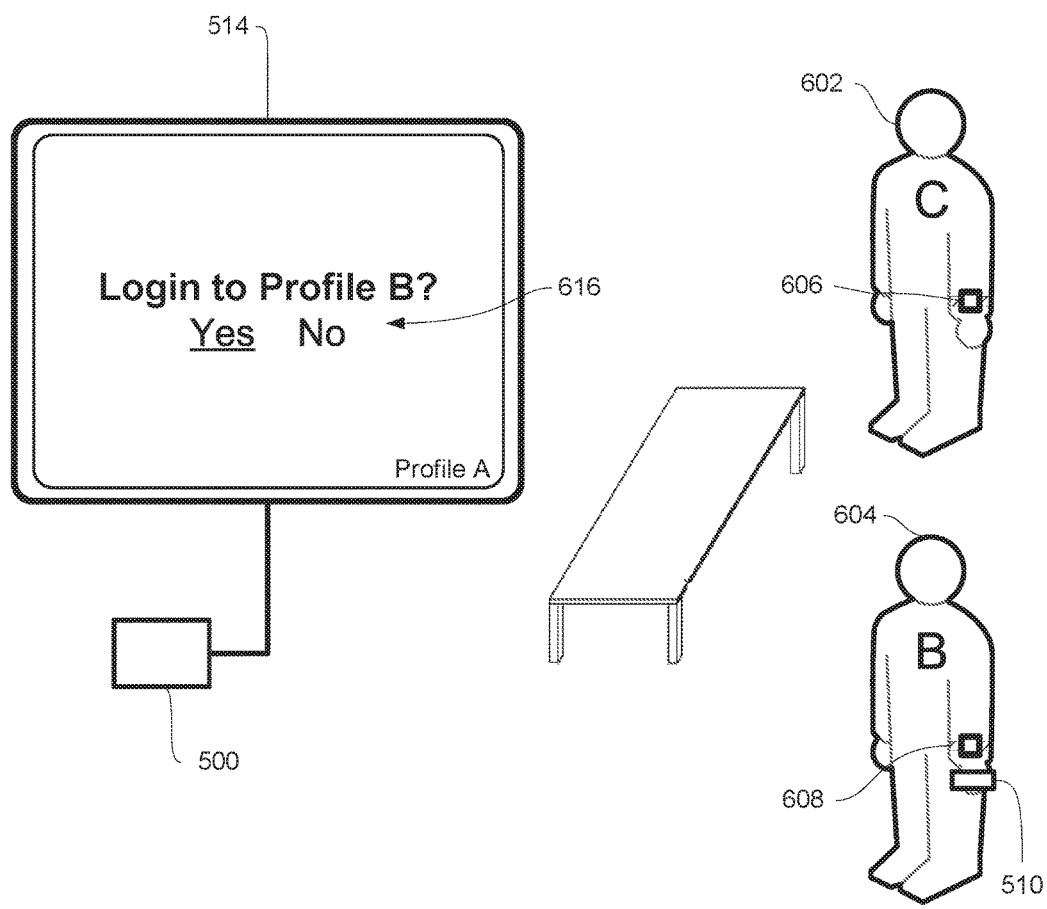
Figure 6H:
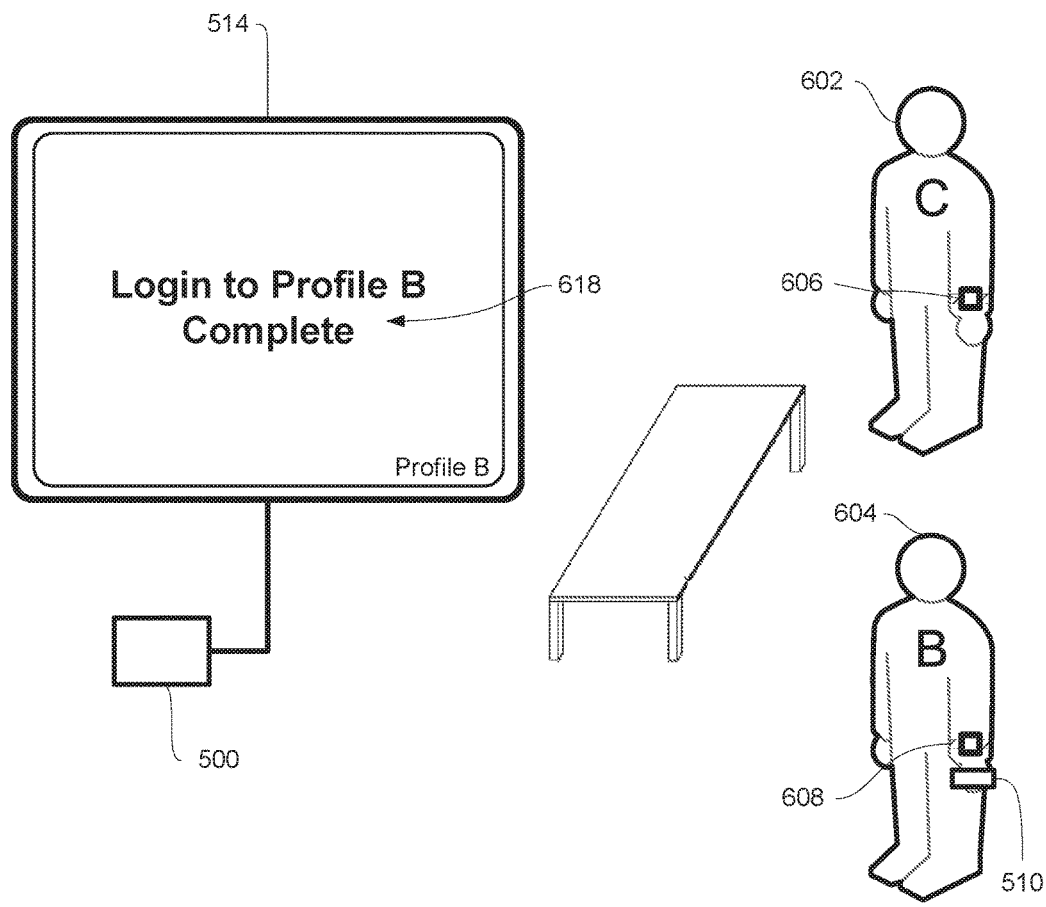
Figure 6I:
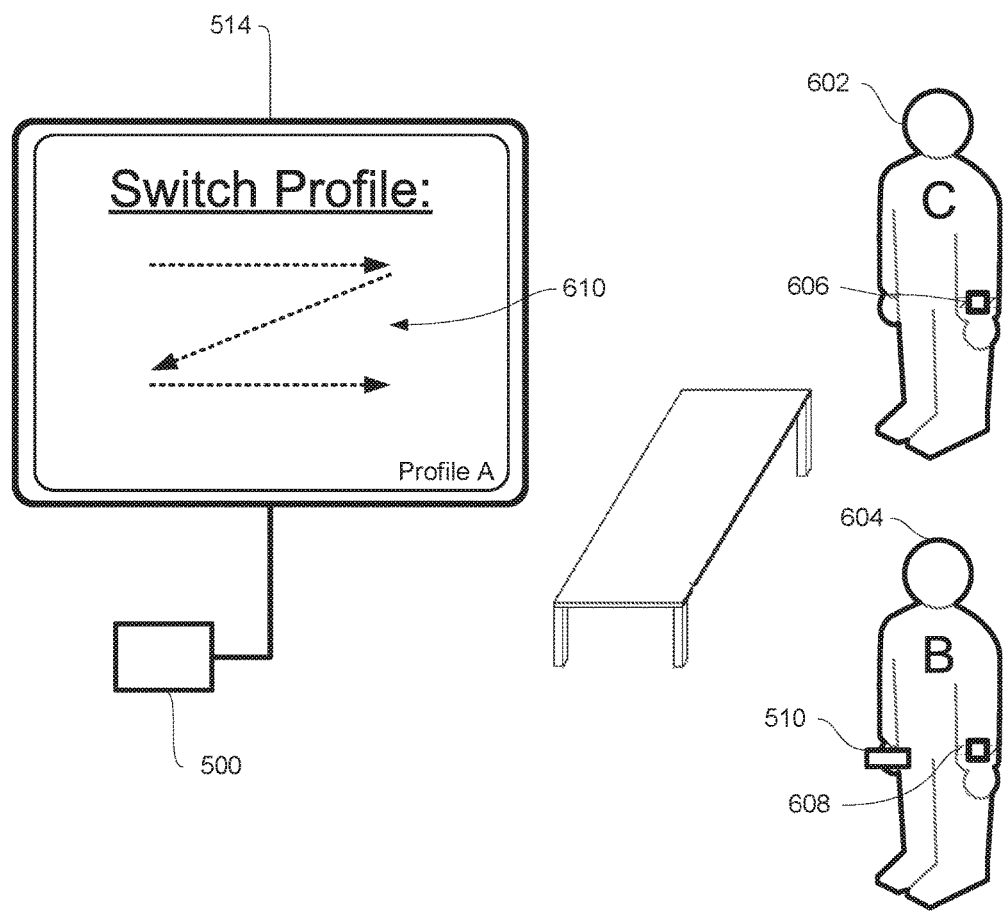
Figure 6J:
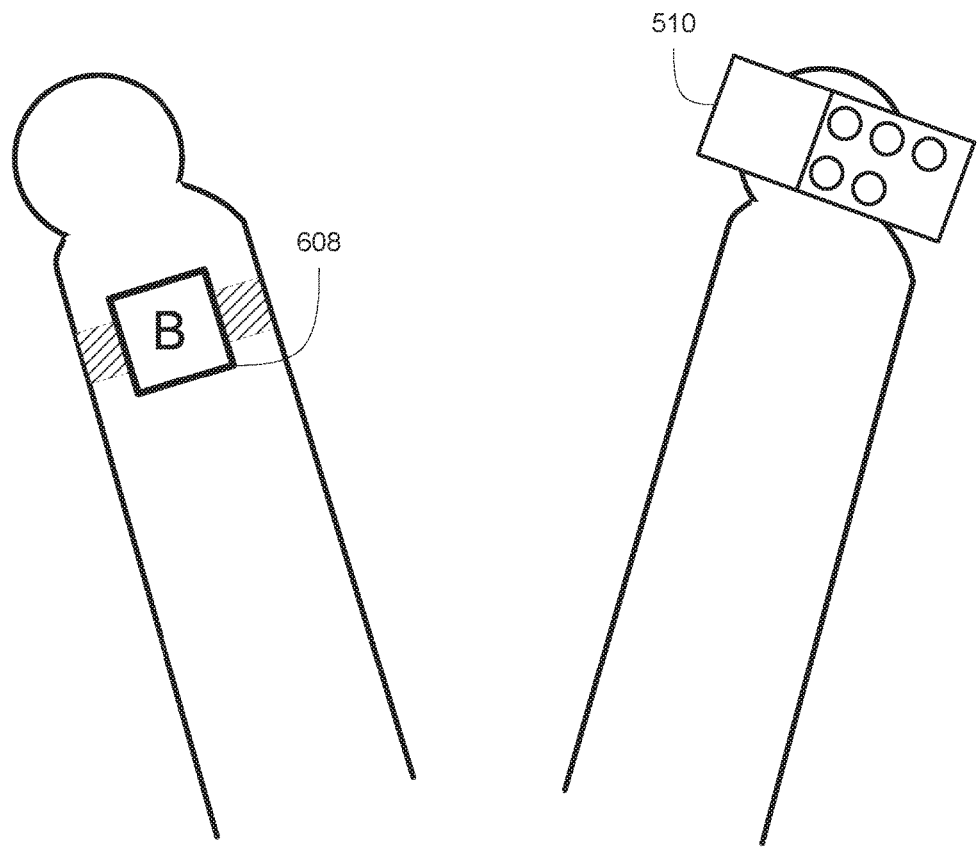
Figure 6K:
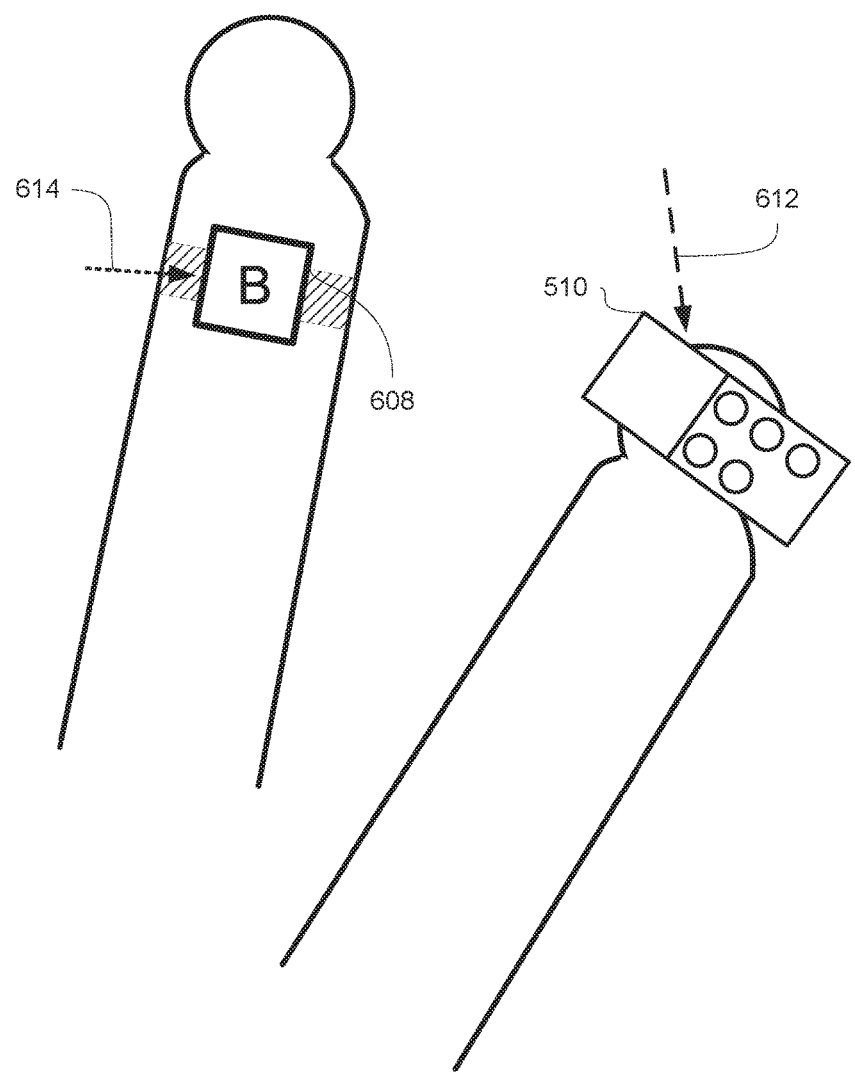
Figure 6L:
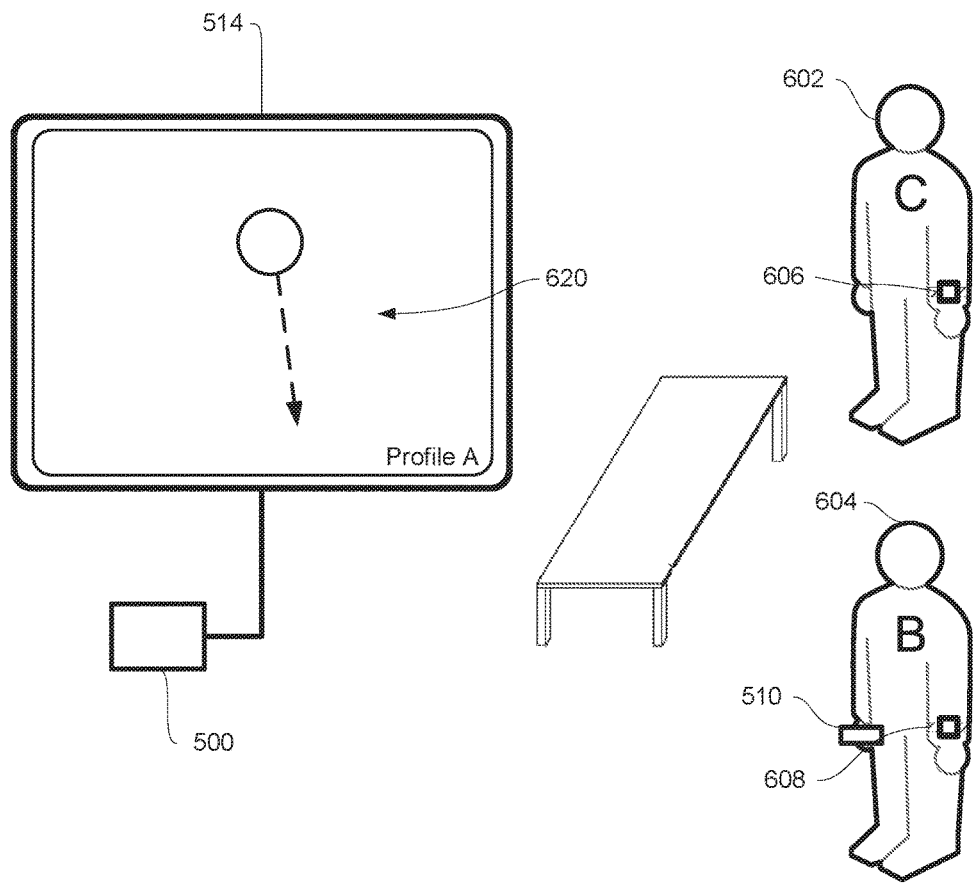
Figure 6M:
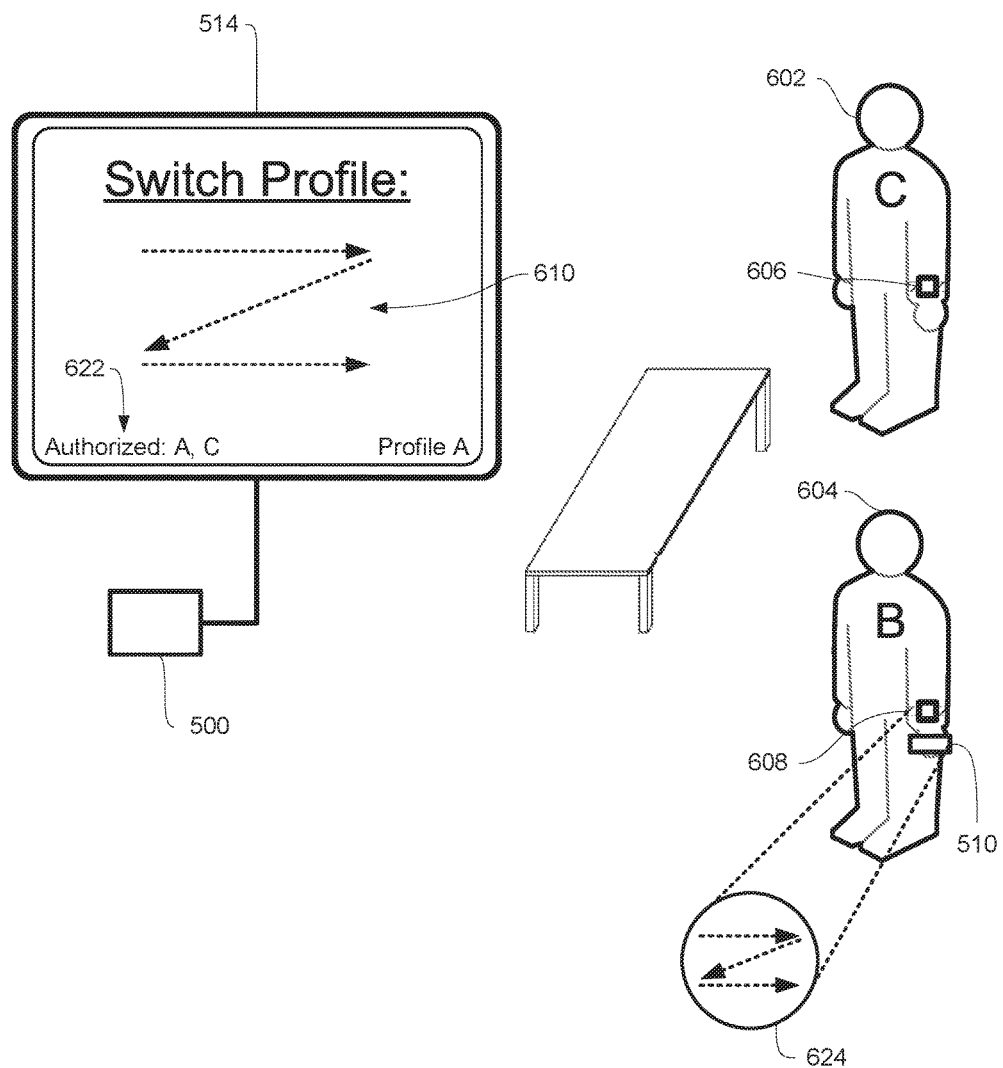
Figure 6N:
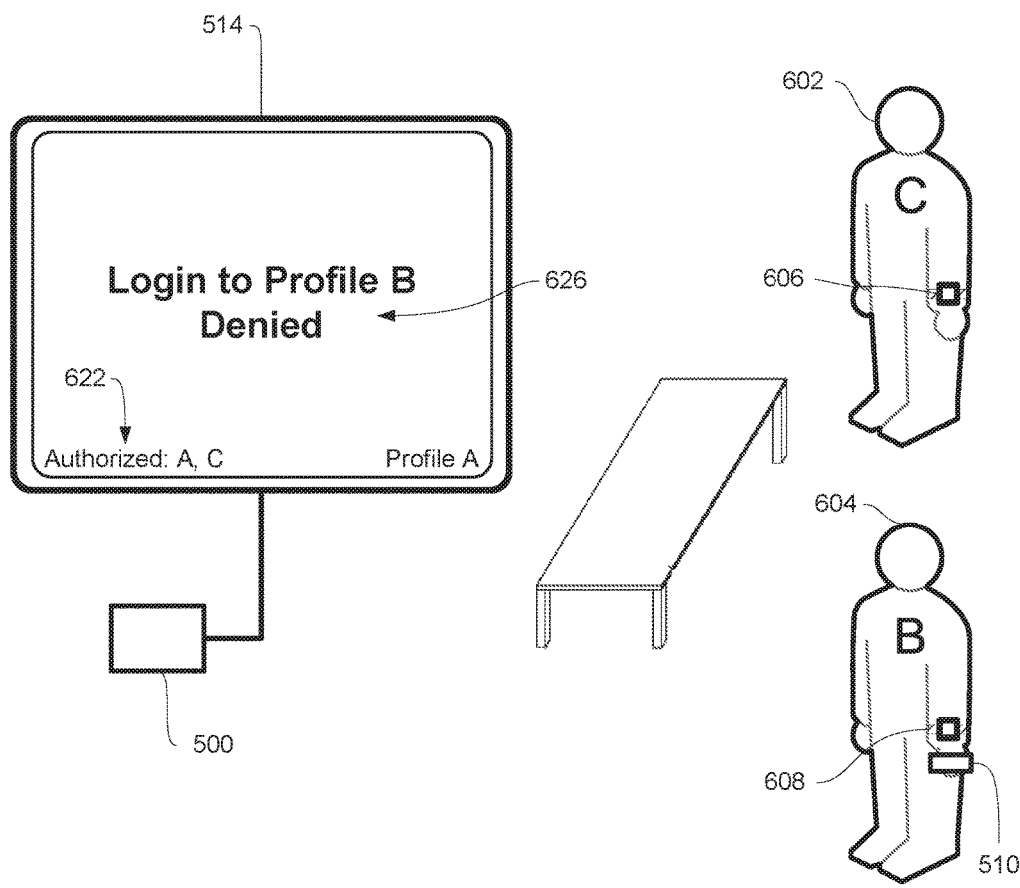
Figure 6O:
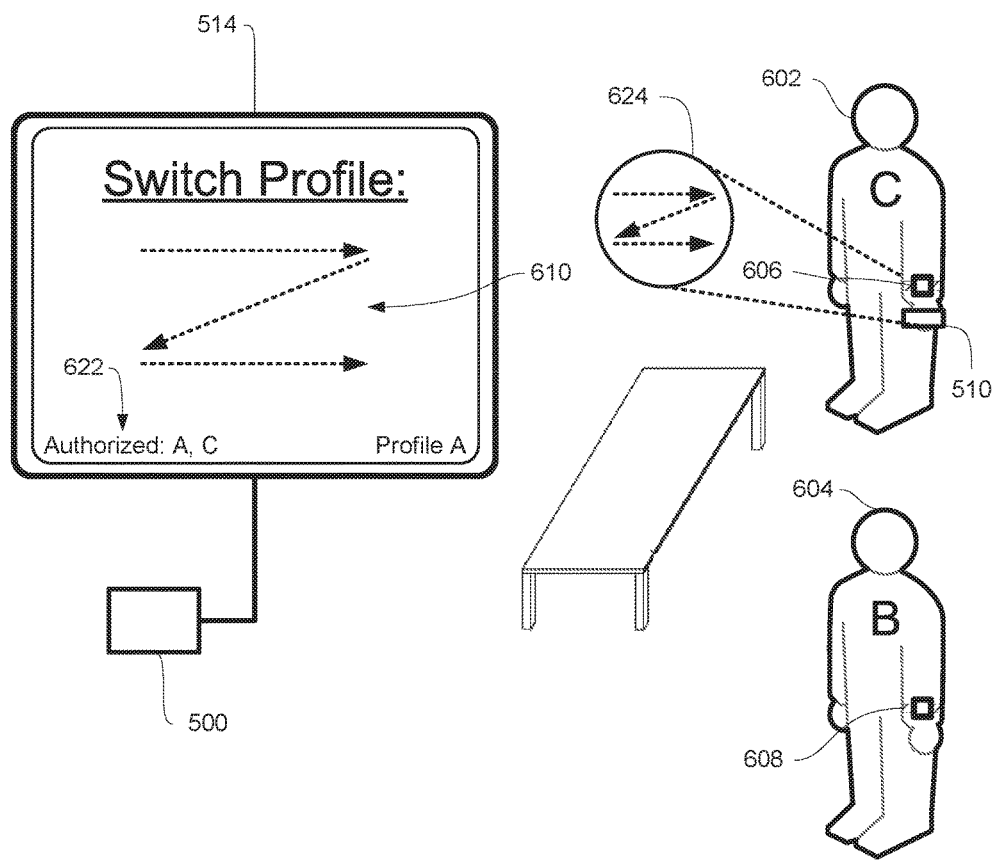
Figure 6P:
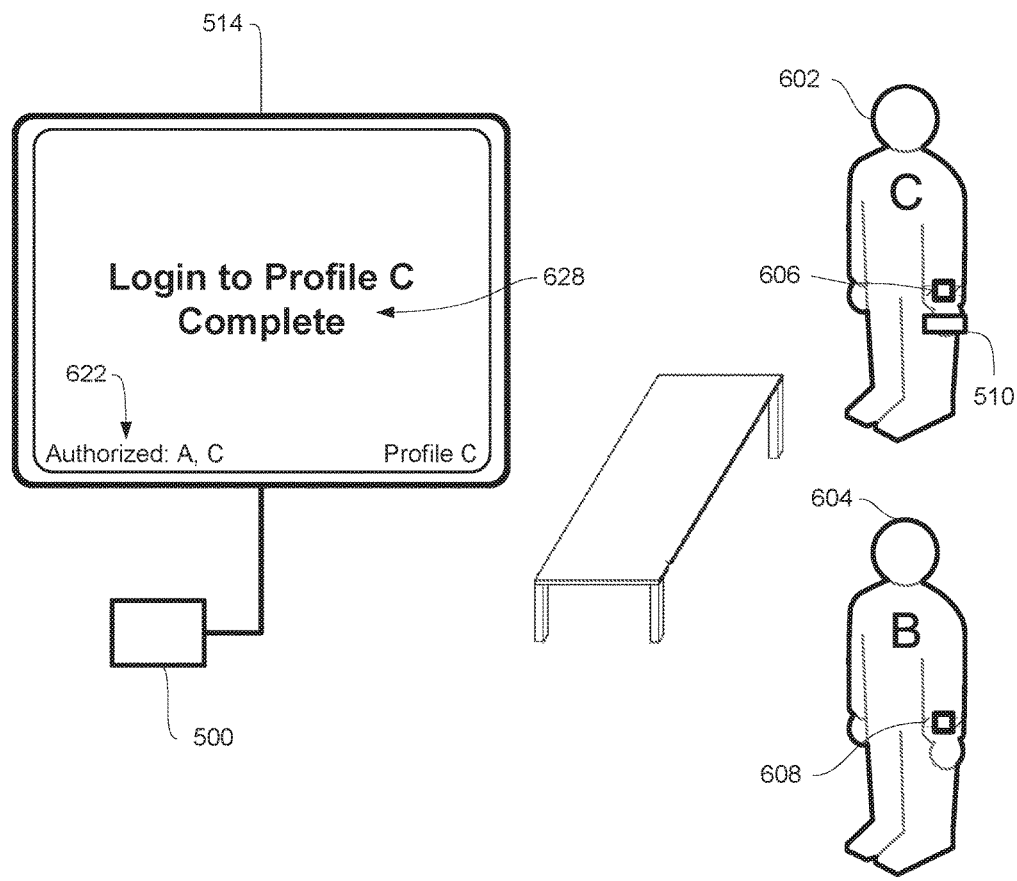
Figure 6Q:
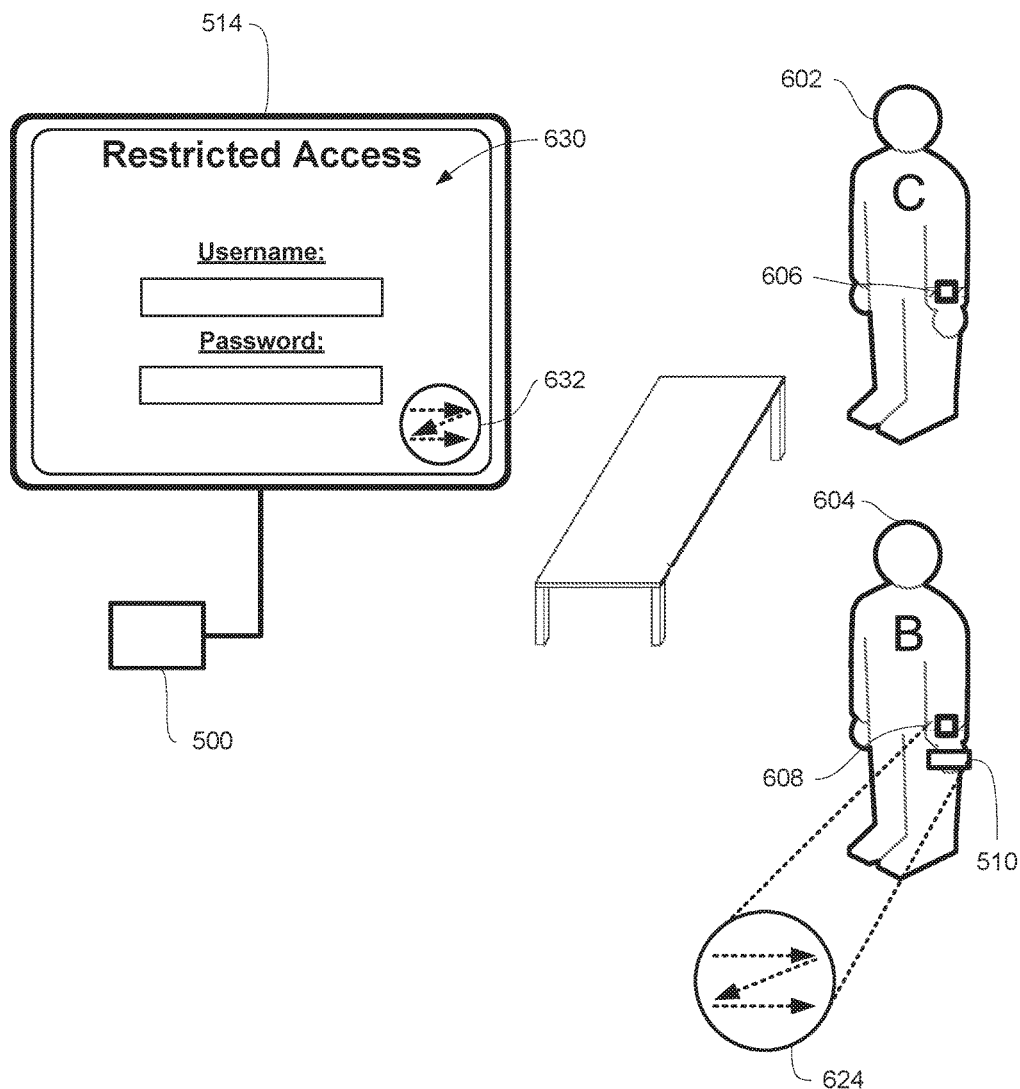
Figure 6R:
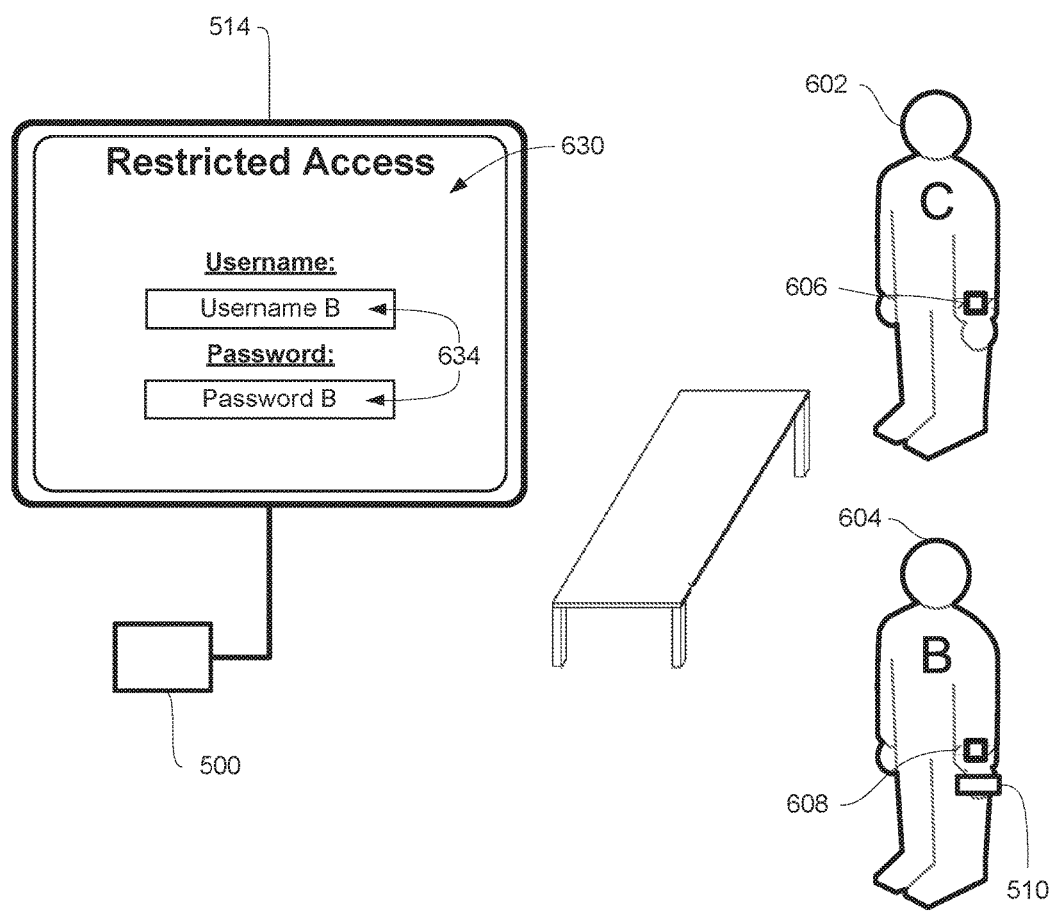
Figure 6S:
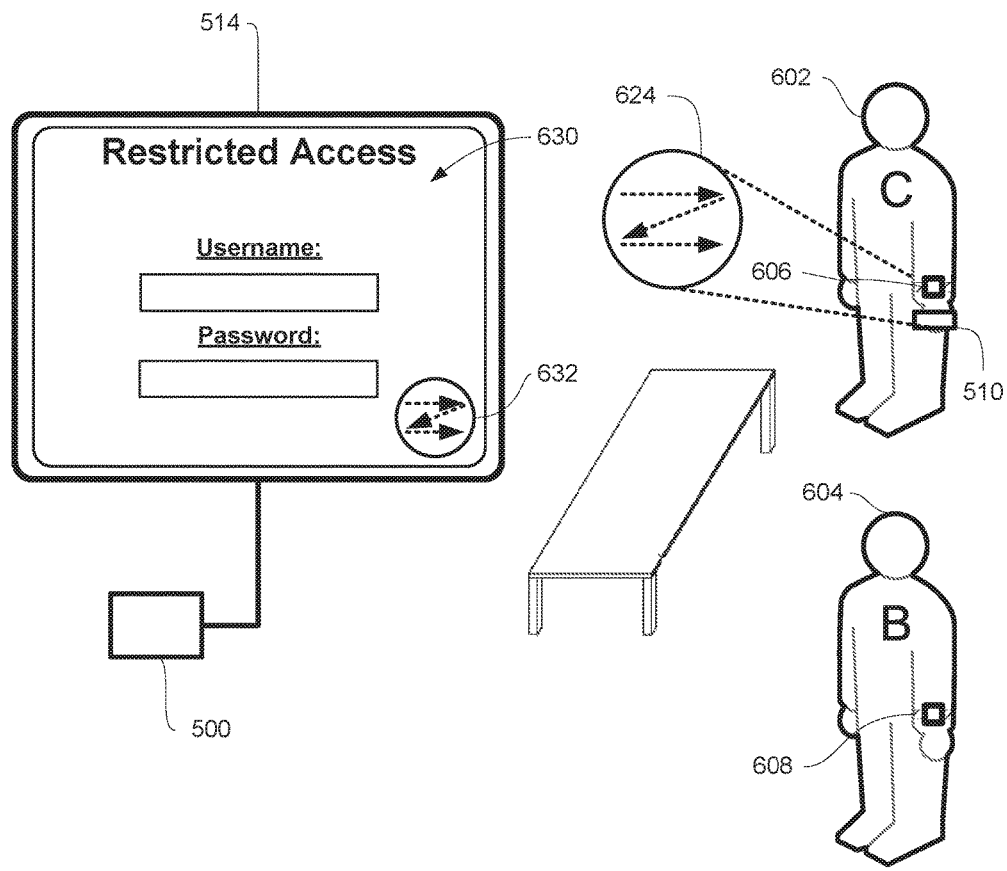
Figure 6T:
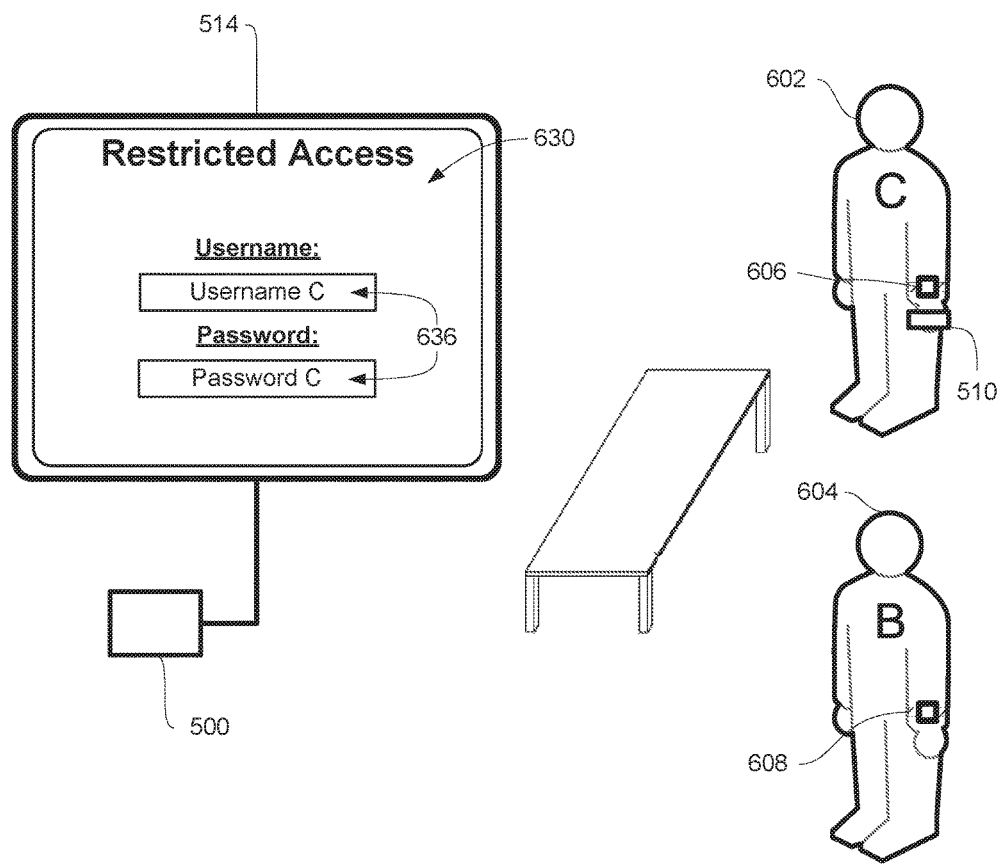
Figure 7A:
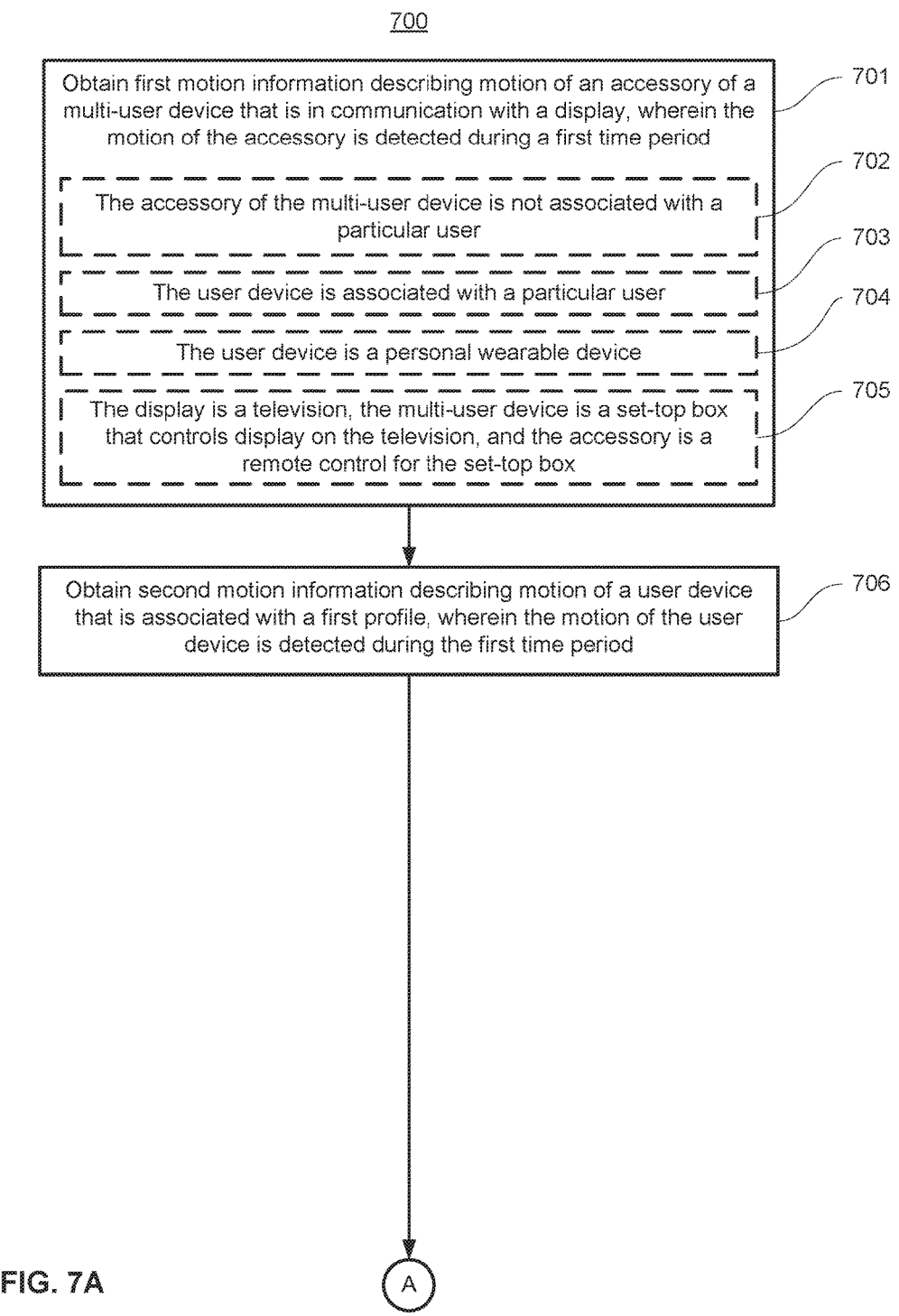
FIGS. 7A-7J are flow diagrams illustrating a motion-based method of configuring a multi-user device based on one or more profiles in accordance with some embodiments of the disclosure.
Figure 7B:
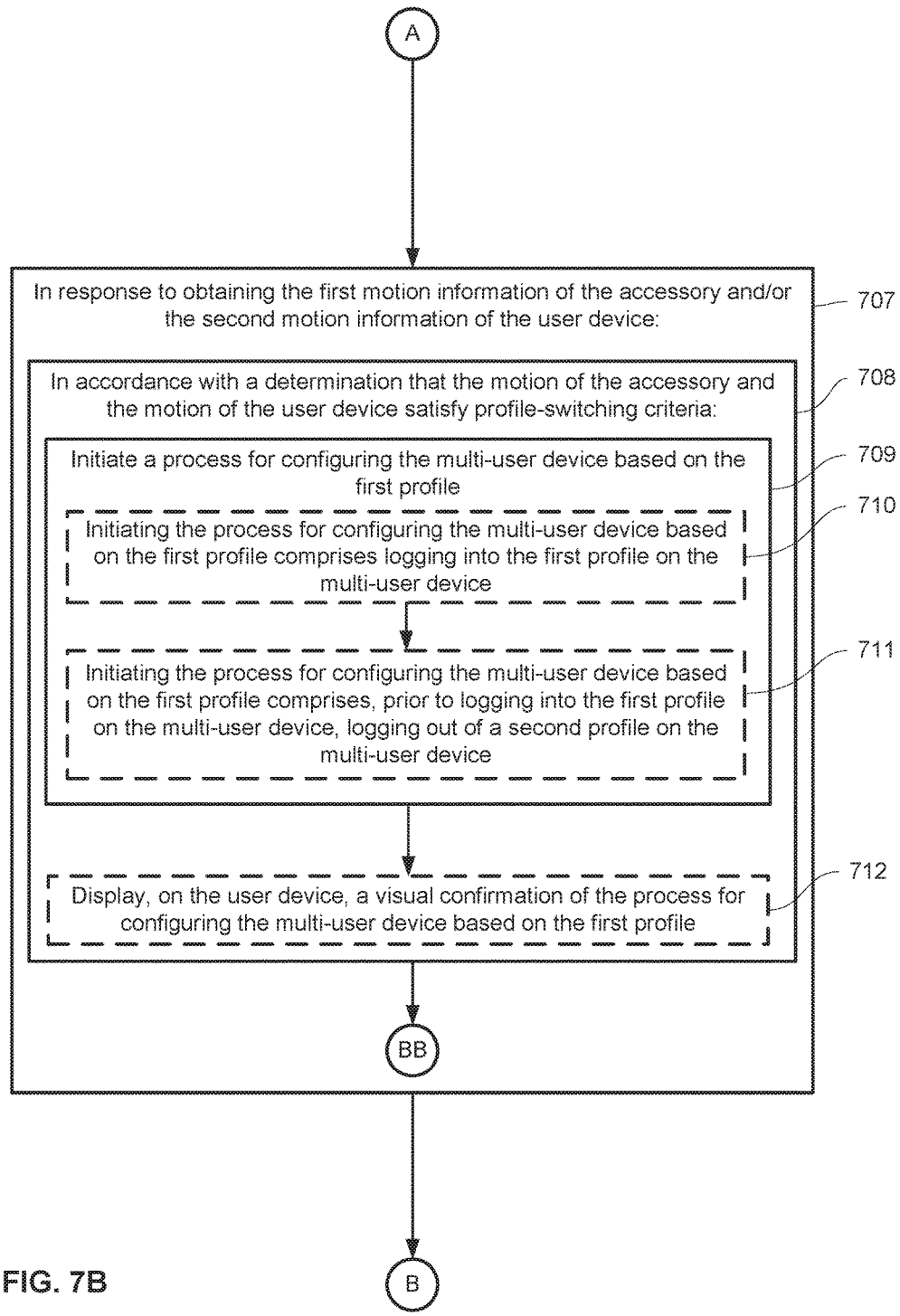
Figure 7C:
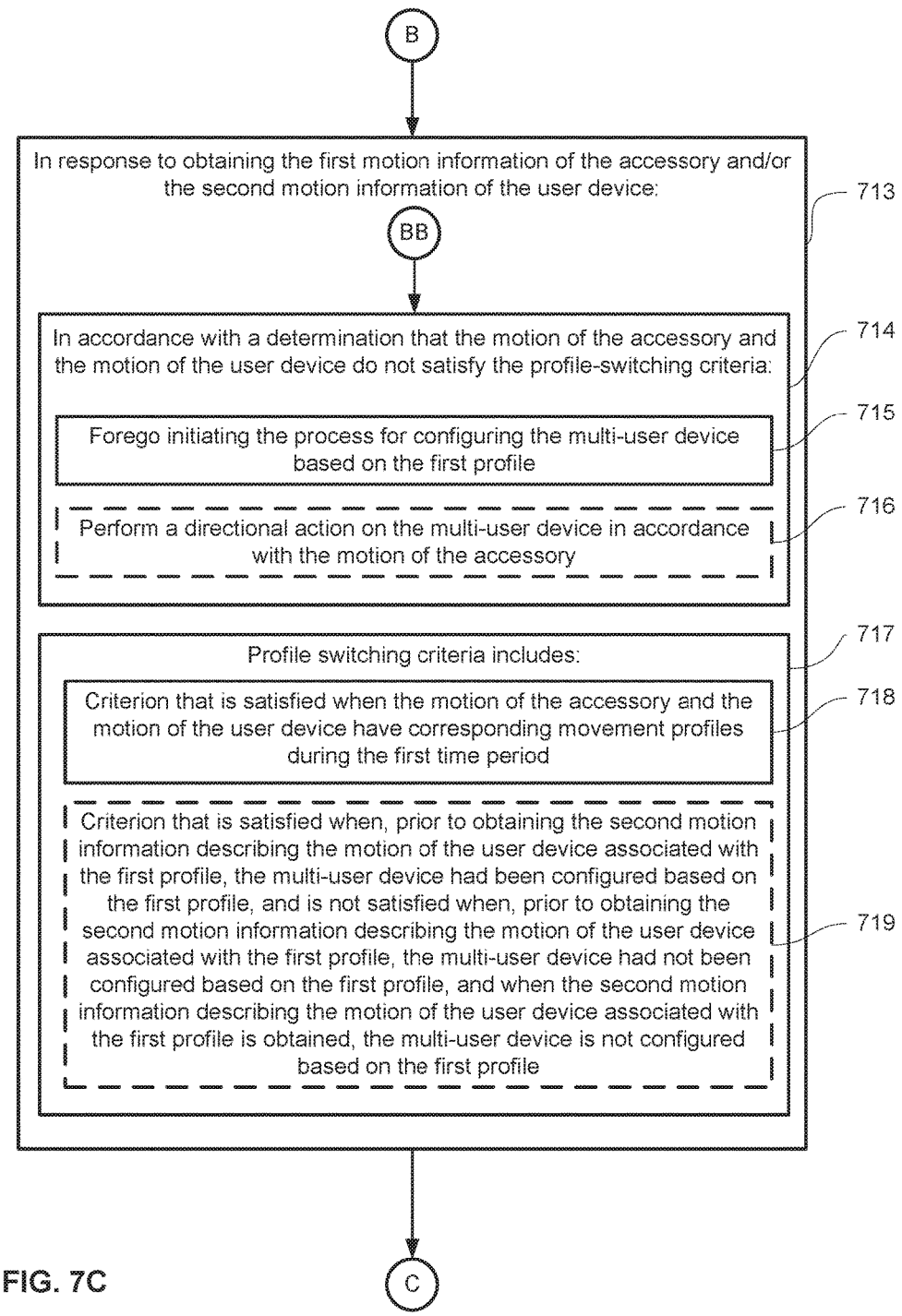
Figure 7D:
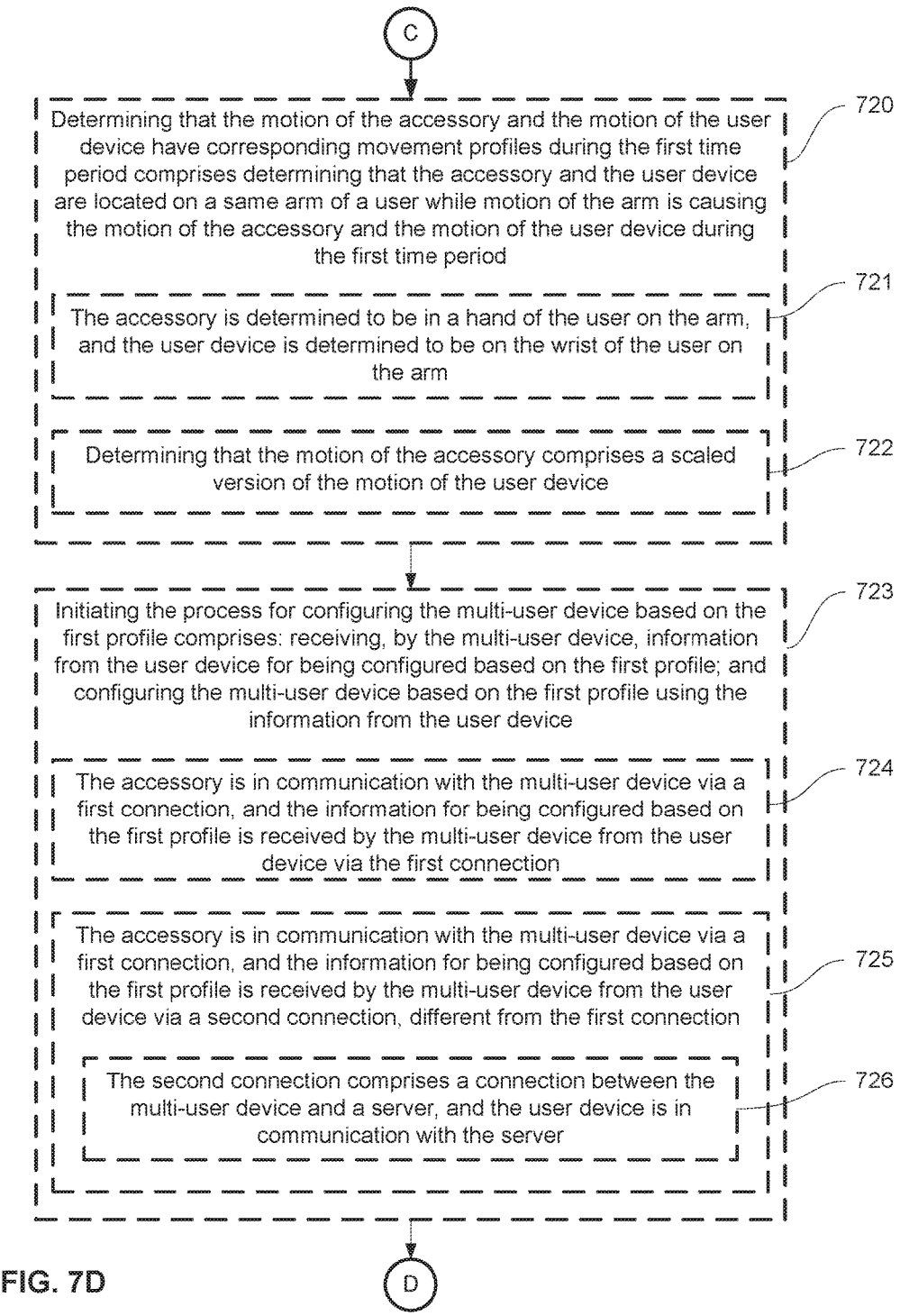
Figure 7E:
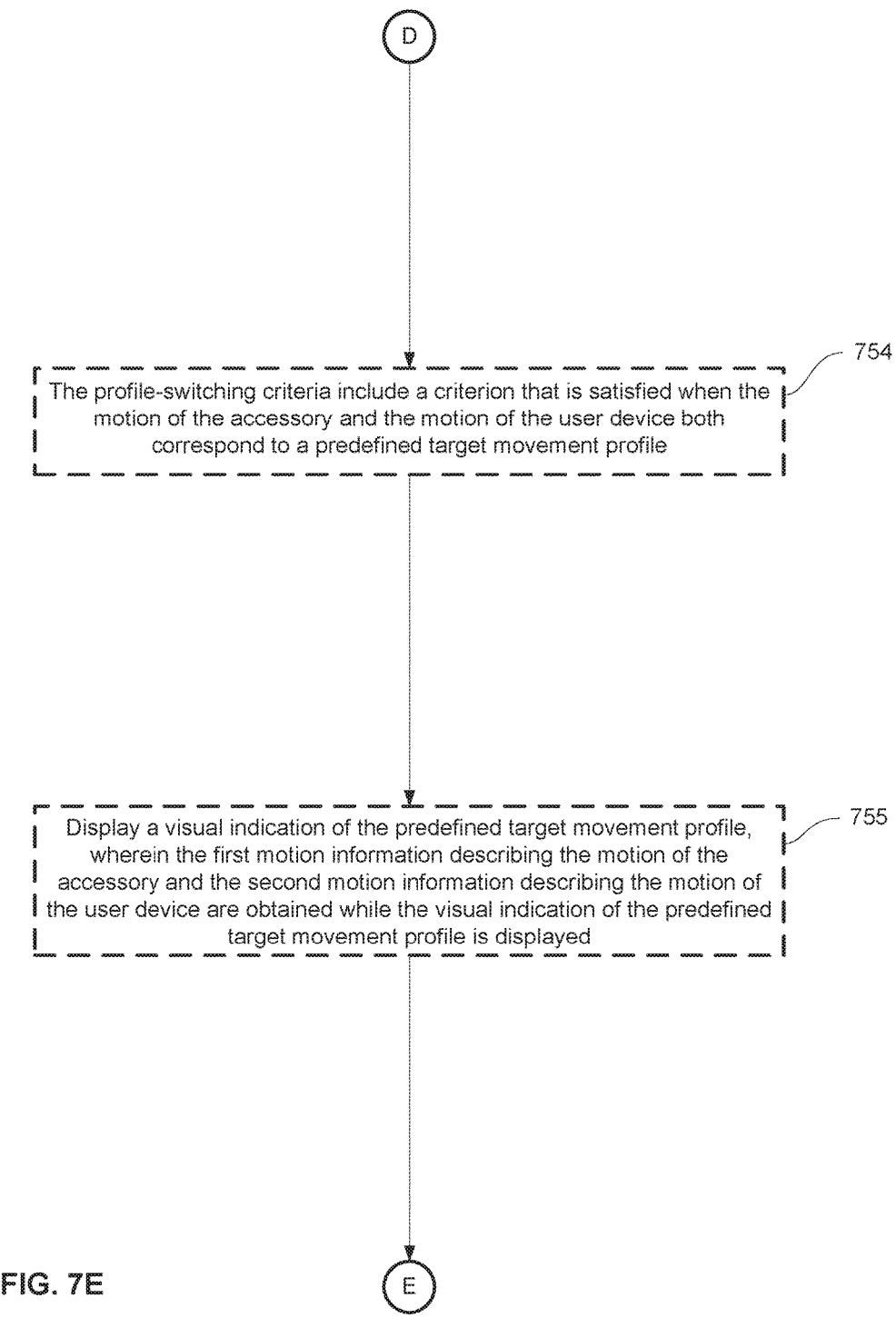
Figure 7F:
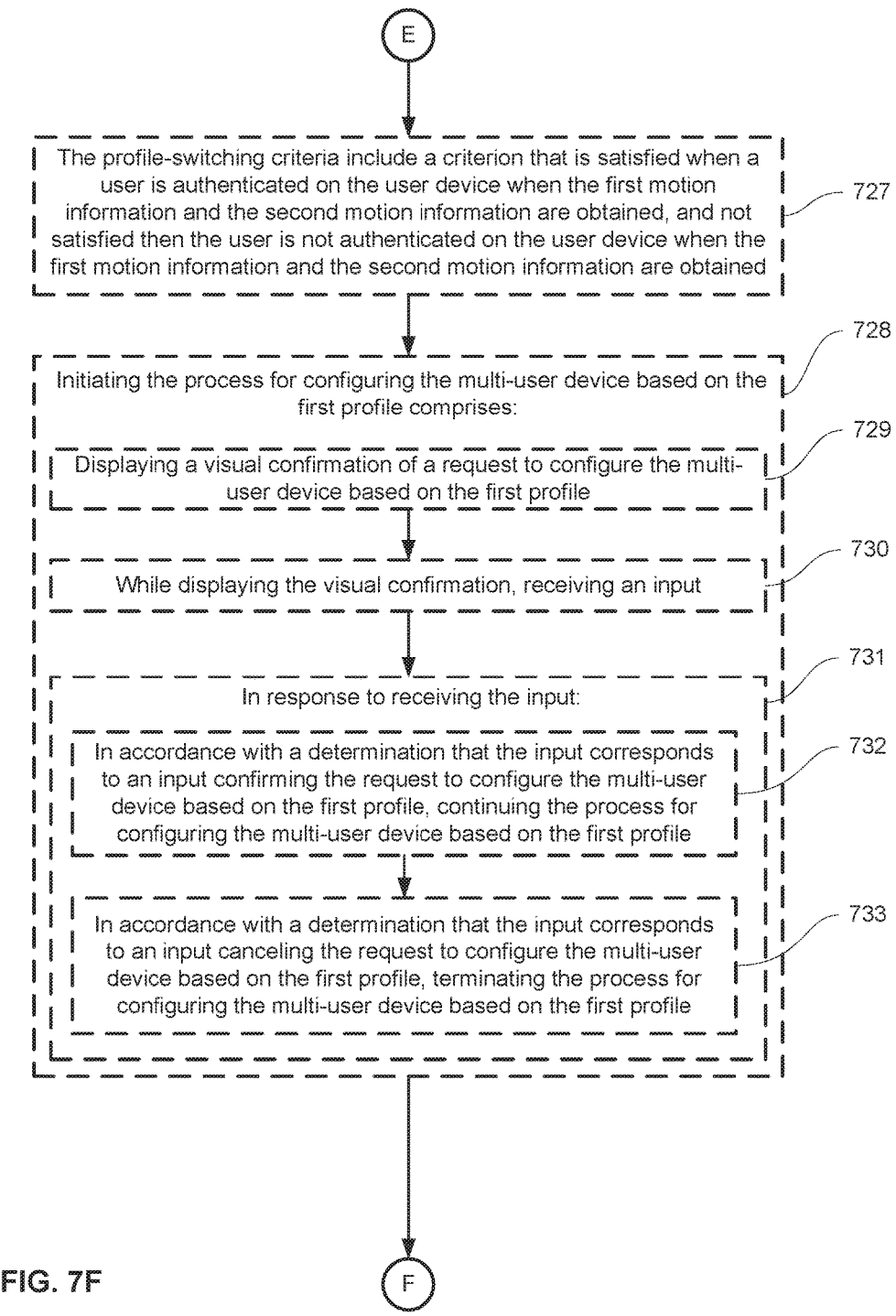
Figure 7G:
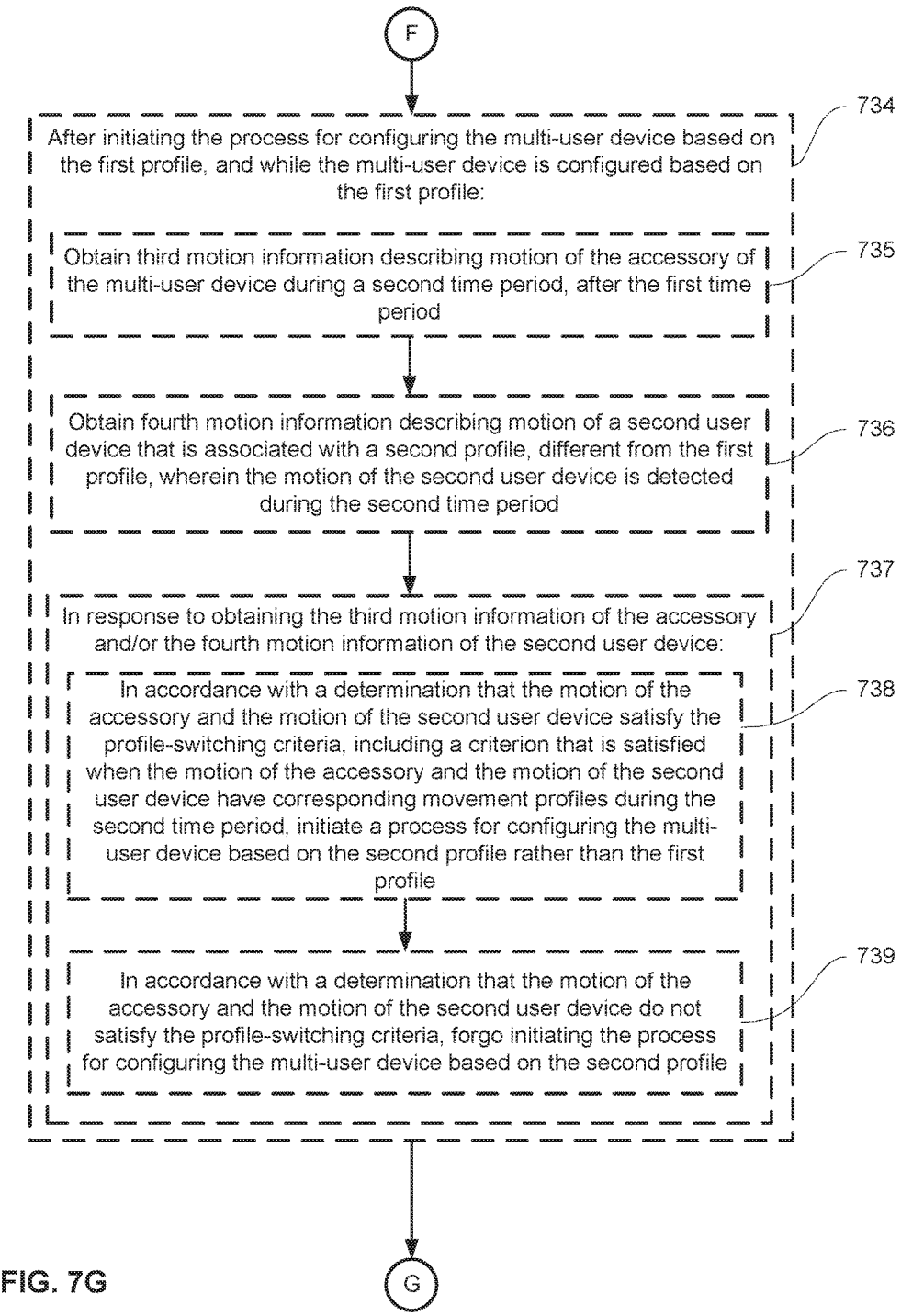
Figure 7H:
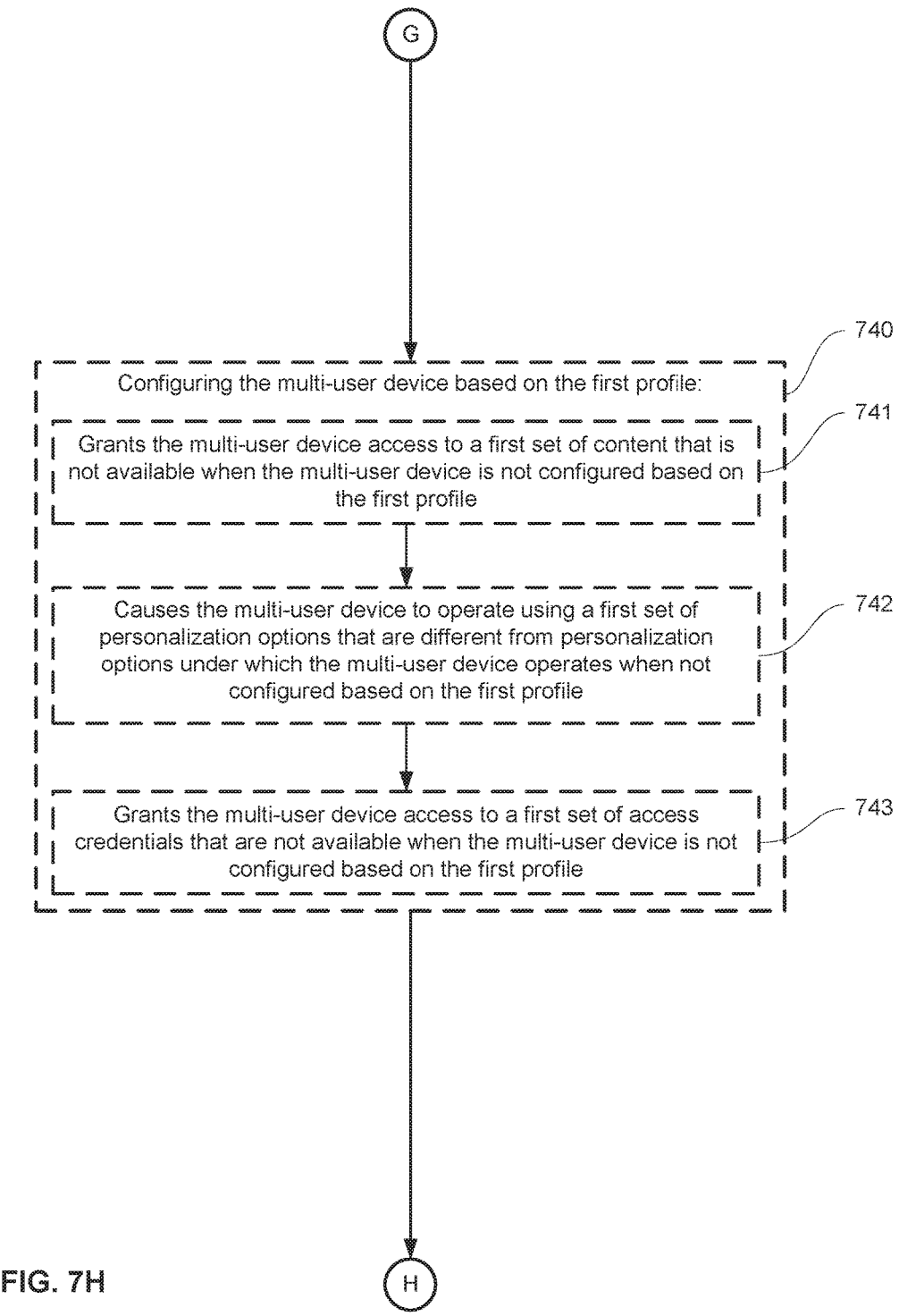
Figure 7I:
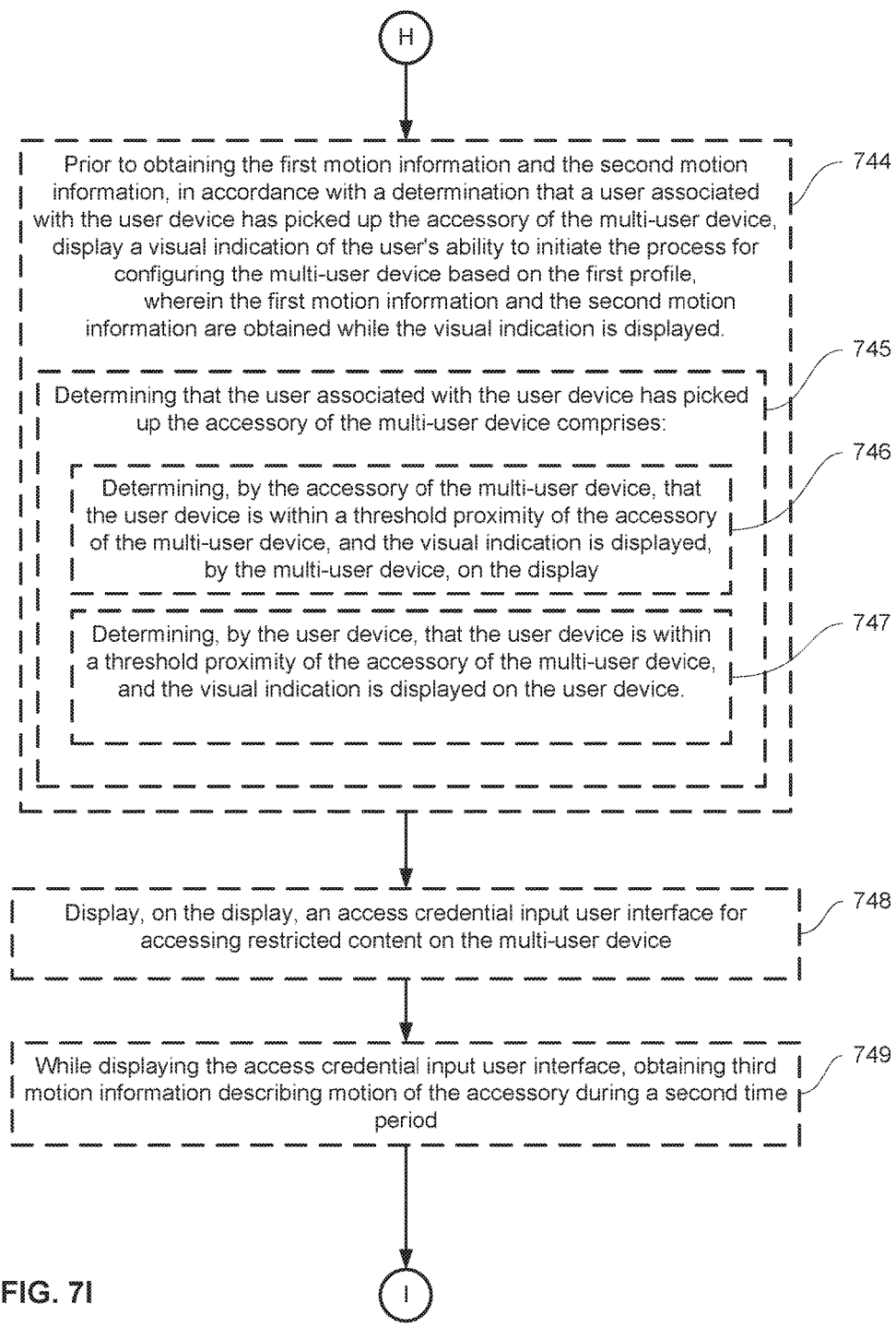
Figure 7J:
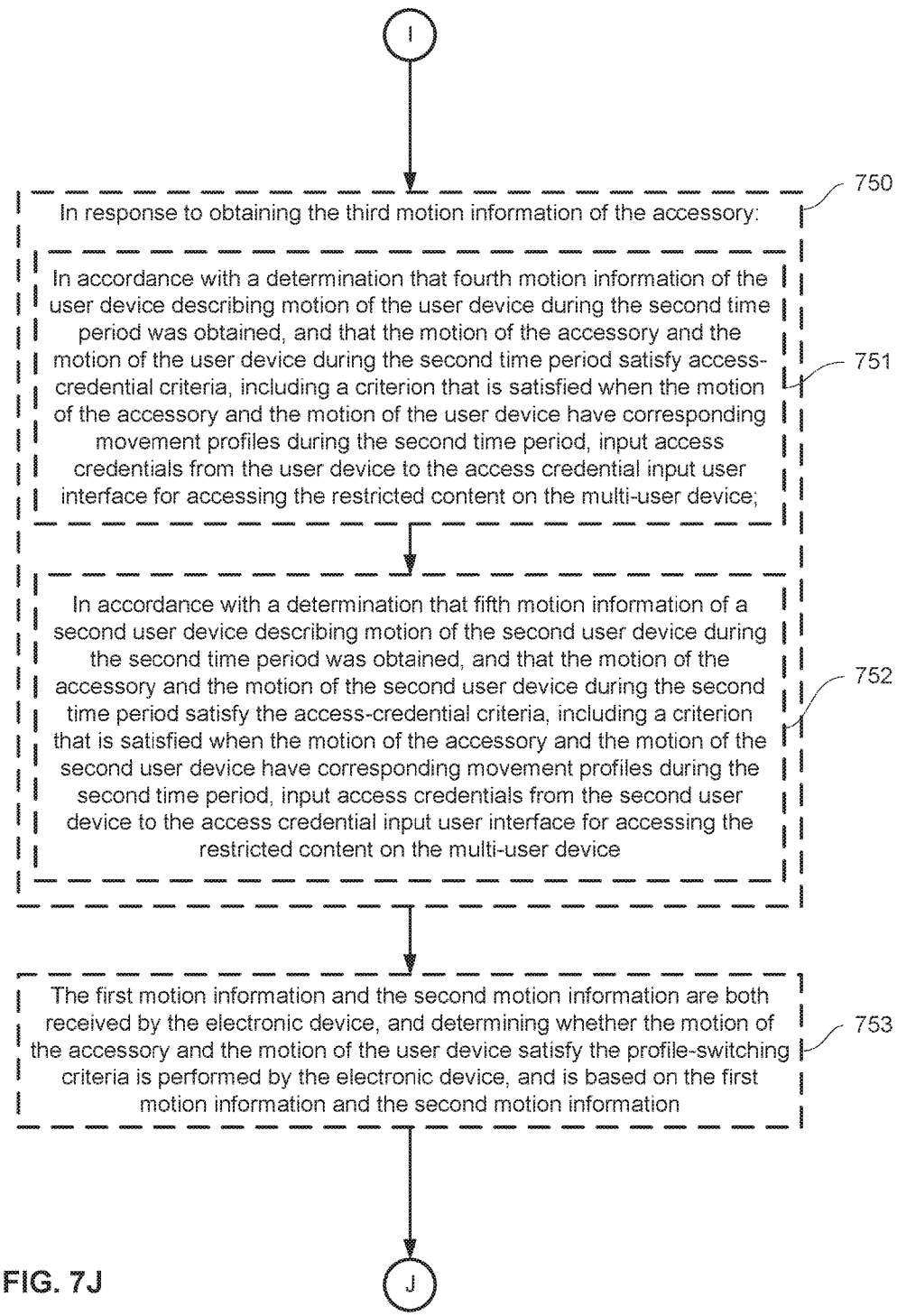

FIGS. 6A-6T illustrate exemplary motion-based ways in which configuration of a multi-user device based on one or more profiles is initiated in accordance with some embodiments of the disclosure. The embodiments in these figures are used to illustrate the processes described below, including the processes described with reference to FIGS. 7A-7J.

FIG. 6A illustrates exemplary display 514 that is in communication with multi-user device 500. Multi-user device 500 optionally corresponds to device 500 described with reference to FIG. 5A. In some embodiments, display 514 is a television, and multi-user device 500 is a set-top box connected to the television. Display 514 optionally displays one or more user interfaces generated by multi-user device 500. Further, multi-user device 500 is optionally a device that is configurable for use with multiple user profiles. When multi-user device 500 is configured based on a given profile (e.g., is logged into a given profile), the multi-user device optionally has access to content, personalization options, passwords and/or other credentials associated with the given profile not accessible when the multi-user device is not configured based on the given profile (e.g., is logged into a different profile). In FIG. 6A, multi-user device 500 is logged into Profile A, as indicated on display 514.

As described with reference to FIG. 5A, multi-user device 500 is optionally controlled by remote control 510 (e.g., an accessory of the multi-user device), which is illustrated as being on the table in FIG. 6A. User B 604 and user C 602 are present at display 514 and multi-user device 500. User B 604 is wearing wearable device 608 on his left arm, and user C 606 is wearing wearable device 606 on his left arm. Wearable device 608 is optionally associated with the profile of user B 604 (e.g., wearable device 608 is optionally logged into Profile B), and wearable device 606 is optionally associated with the profile of user C 602 (e.g., wearable device 606 is optionally logged into Profile C). In some embodiments, wearable devices 606 and 608 are watches, though the embodiments of this disclosure are optionally implemented with user devices other than watches or wearable devices (e.g., any device that is associated with a user profile such as a fitness band, smart ring, smart glasses, etc). Watches 606 and 608 optionally correspond to device 100 or device 300 described above with reference to FIGS. 1A-1B and 2-3. Multi-user device 500 is optionally able to communicate with one or more of remote 510 and watches 606 and 608 (e.g., via wireless connections, such as Bluetooth or WiFi connections). In some embodiments, watches 606 and 608 are able to communicate with remote 510 (e.g., via wireless connections, such as Bluetooth or WiFi connections).

FIG. 6B illustrates user B 604 having picked up remote 510 in his left hand (e.g., the hand on the arm on which he is wearing watch 608). Multi-user device 500, remote 510 and/or watch 608 have detected that remote 510 has been picked up by user B 604. In some embodiments, that remote 510 has been picked up is determined based on a determination by remote 510 that watch 608 is within a threshold proximity (e.g., 6 inches, 1 foot, etc.) of remote 510. In some embodiments, that remote 510 has been picked up is determined based on a determination by watch 608 that remote 510 is within a threshold proximity (e.g., 6 inches, 1 foot, etc.) of watch 608.

In response to the determination that remote 510 has been picked up by user B 604, multi-user device 500 displays, on display 514, a visual indication 610 of the user's ability to configure the multi-user device based on a profile other than Profile A (e.g., the user's ability to switch profiles on the multi-user device). In some embodiments, visual indication 610 is additionally or alternatively displayed on watch 608. In some embodiments, visual indication 610 is displayed, not as a result of a user picking up remote 510, but rather as a result of a user providing input to multi-user device 500 (e.g., via remote 510) to switch user profiles. As illustrated in FIG. 6B, in some embodiments, visual indication 610 includes information about a target motion profile that must be performed to switch profiles on multi-user device 500—in this case, a left-to-right-to-left-to-right zigzag motion profile. Though visual indication 610 is illustrated as a graphical description of the target motion profile, in some embodiments, the visual indication is a different description of the target motion profile (e.g., a textual description of the target motion profile). As will be described below, if it is determined that the motion of a user device (e.g., watch 606 or watch 608) corresponds to the motion of remote 510, and both motions correspond to the target motion profile, multi-user device 500 optionally switches to the profile associated with the user device. In some embodiments, the motion of the user device (e.g., watch 606 or watch 608) and the motion of remote 510 need only correspond to each other, and not to a target motion profile, to cause multi-user device 500 to switch to the profile associated with the user device. The required profile information for switching to a given profile (e.g., access credentials for the given profile) is optionally provided to multi-user device 500 by the appropriate user device (e.g., watch 606 or watch 608, via a wireless connection between the watches and the multi-user device, and/or between the watches and remote 510, which can communicate the information to the multi-user device). Thus, profile switching on multi-user device 500 is enhanced by enabling a user to quickly switch multi-user device 500 to a profile associated with a device that is being worn by the user. This would enable two or more users to quickly switch back and forth between different user profiles simply by handing remote 510 back and forth to each other.

FIGS. 6C-6F illustrate performance of the zigzag target motion profile by user B 604. Specifically, in FIG. 6C, the left arm of user B 604 is illustrated with watch 608 and remote 510 in the user's left hand. In FIG. 6D, user B 604 has started performing the zigzag target motion profile by performing the first left-to-right horizontal motion of the zigzag profile. As user B 604 is performing the zigzag motion, remote 510 and watch 608 optionally detect their respective motion profiles using accelerometers (or equivalent sensors) included in those devices. Remote 510 optionally detects motion profile 612, and watch 608 optionally detects motion profile 614. In FIG. 6E, user B 604 has performed the right-to-left diagonal motion of the zigzag target motion profile, and in FIG. 6F, user B 604 has performed the final left-to-right horizontal motion of the zigzag profile. Through FIGS. 6C-6F, remote 510 has detected motion profile 612, and watch 608 has detected motion profile 614.

After user B 604 has performed the motions described with reference to FIGS. 6C-6F, it is determined whether motion profile 612 of remote 510 corresponds to motion profile 614 of watch 608. In some embodiments, this determination is made by remote 510, in some embodiments, this determination is made by multi-user device 500, in some embodiments, this determination is made by watch 608, and in some embodiments, this determination is made by another device, such as a remote server. In some embodiments, motion profile 612 corresponds to motion profile 614 if the motion profiles mirror each other, such that it can be determined that the remote 510 and the watch 608 are located on the same arm of user B 604 while motion of that arm is causing the detected motions of remote 510 and watch 608. As illustrated in FIGS. 6C-6F, motion profile 612 mirrors motion profile 614, and is optionally a scaled version of motion profile 614, and thus it is determined that the motion of remote 510 corresponds to the motion of watch 608 (and optionally that remote 510 is in a hand on the same arm as watch 608). Further, in some embodiments, it is determined whether motion profiles 612 and 614 correspond to a target motion profile (e.g., as described with reference to FIG. 6B); in the examples of FIGS. 6C-6F, it is determined that motion profiles 612 and 614 do correspond to the target motion profile illustrated by visual indication 610.

FIG. 6G illustrates multi-user device 500 displaying, on display 514, a confirmation request 616 for switching to Profile B on the multi-user device. Multi-user device 500 optionally displays confirmation request 616 in response to the determination that the motion of remote 510 (e.g., motion profile 612) corresponded to the motion of watch 608 (e.g., motion profile 614) described in FIGS. 6C-6F, and in some embodiments, the determination that both motions corresponded to a target motion profile (e.g., as described with reference to FIG. 6B). In some embodiments, confirmation request 616 is additionally or alternatively displayed on watch 608. In FIG. 6G, user B 604 has confirmed the request to login to Profile B on multi-user device 500, and in FIG. 6H, multi-user device 500 displays, on display 514, visual indication 618 of the successful completion of configuring multi-user device 500 based on Profile B. In some embodiments, visual indication 618 is additionally or alternatively displayed on watch 608. If, at FIG. 6G, user B 604 had canceled the request to login to Profile B on multi-user device 500, multi-user device 500 would optionally remain logged into Profile A, rather than switching to Profile B. It is understood that user C 602 (or any other user) can analogously cause multi-user device 500 to login to Profile C (associated with watch 606) by holding remote 510, and performing the motions described with reference to FIGS. 6C-6F.

As described with reference to FIGS. 6B-6H, multi-user device 500 optionally only logs into a new profile in response to detected motions of watch 608 and/or remote 510 if the motions correspond to each other; if the motions of watch 608 and remote 510 do not correspond to each other, multi-user device 500 optionally does not log into a new profile in response to detecting the motions of watch 608 and remote 510.

In particular, in FIG. 6I, user B 604 is wearing watch 608 on his left arm, and has picked up remote 510 in his right hand. Further, multi-user device 500 is displaying, on display 514, visual indication 610 of the user's ability to configure the multi-user device based on a profile other than Profile A, as described with reference to FIG. 6B.

FIGS. 6J-6K illustrate exemplary motions of watch 608 and remote 510 performed by user B 604, where the motions do not correspond to each other. FIG. 6J shows the left arm of user B 604 including watch 608, and the right arm of user B 604 in the right hand of which user B 604 is holding remote 510. In FIG. 6K, user B 604 has performed non-corresponding motions in his left and right arms. In particular, user B 604 has moved his left arm substantially from left-to-right, and has moved his right arm substantially from top-to-bottom. As a result, watch 608 has detected motion profile 614, and remote 510 has detected motion profile 612. As illustrated in FIG. 6K, motion profile 612 does not mirror or otherwise correspond to motion profile 614, and thus, it is determined that the motion profiles of watch 608 and remote 510 do not correspond to each other. As a result, multi-user device 500 is not configured based on Profile B, but rather remains configured based on Profile A, as illustrated in FIG. 6L. Further, in some embodiments, in response to detecting non-corresponding motions of watch 608 and remote 510 (e.g., as described with reference to FIGS. 6J-6K), multi-user device 500 performs a directional action in accordance with the detected motion of remote 510, because the multi-user device optionally generally (e.g., in circumstances other than profile switching) performs directional actions in accordance with the detected motions of the remote. For example, multi-user device 500 optionally moves a cursor on display 514 in accordance with the detected motion of remote 510 (shown as 620 in FIG. 6L).

In some embodiments, multi-user device 500 will only switch to a given profile in response to detected motions of remote 510 and watches 606 and/or 608 if the multi-user device has previously been configured based on that given profile. In this way, multi-user device 500 optionally avoids being configured based on profiles of potentially unknown users. FIG. 6M illustrates user B holding remote 510 in his left hand, and wearing watch 608 on his left arm. Multi-user device 500 is displaying, on display 514, visual indication 610 of the ability to configure the multi-user device based on a profile other than Profile A, as described with reference to FIG. 6B. Additionally, multi-user device 500 optionally allows for motion-based configuration of Profiles A and C, only, as shown at 622 (e.g., because the multi-user device has previously been configured based on only Profiles A and C). While holding remote 510 in his left hand and wearing watch 608 (associated with Profile B) on his left arm, user B 604 optionally performs the required motion for switching profiles on multi-user device 500 (indicated by 624 in FIG. 6M, and as previously discussed with respect to FIGS. 6B-6F).

In response to the performance of the required motion for switching profiles on multi-user device 500, the multi-user device optionally denies the attempt by user B 604 to configure the multi-user device based on Profile B, because the multi-user device was not previously configured based on Profile B. Multi-user device 500 optionally displays, on display 514, visual indication 626 that the attempt to configure the multi-user device based on Profile B was denied, as illustrated in FIG. 6N. In some embodiments, visual indication 626 is additionally or alternatively displayed on watch 608.

In FIG. 6O, user C 602 is holding remote 510 in his left hand, and wearing watch 606 on his left arm. Multi-user device 500 is displaying, on display 514, visual indication 610 of the ability to configure the multi-user device based on a profile other than Profile A, as described with reference to FIG. 6B. Additionally, just as described with reference to FIG. 6M, multi-user device 500 optionally allows for motion-based configuration of Profiles A and C, only, as shown at 622 (e.g., because the multi-user device has previously been configured based on only Profiles A and C). While holding remote 510 in his left hand and wearing watch 606 (associated with Profile C) on his left arm, user C 602 optionally performs the required motion for switching profiles on multi-user device 500 (indicated by 624 in FIG. 6O, and as previously discussed with respect to FIGS. 6B-6F).

In response to the performance of the required motion for switching profiles on multi-user device 500, the multi-user device optionally accepts the attempt by user C 602 to configure the multi-user device based on Profile C, because the multi-user device was previously configured based on Profile C. Multi-user device 500 optionally displays, on display 514, visual indication 628 that the attempt to configure the multi-user device based on Profile C was successful, as illustrated in FIG. 6P. In some embodiments, visual indication 628 is additionally or alternatively displayed on watch 606.

In some embodiments, in addition or alternatively to using motion to configure multi-user device 500 based on user profiles, motion is used to enter access credentials into user interfaces displayed on display 514. FIG. 6Q illustrates multi-user device 500 displaying, on display 514, user interface 630 that is associated with access to a restricted area accessible on the multi-user device (e.g., restricted media content, restricted settings, restricted website, etc.). User interface 630 includes entry fields for a username and a password to gain access to the restricted area on multi-user device 500. Additionally, user interface 630 includes visual indication 632 of the ability to enter access credentials into user interface 630 using motion. Multi-user device 500 optionally displays visual indication 632 when the multi-user device displays a user interface into which access credentials are entered, such as user interface 630. Visual indication 632 optionally corresponds to visual indication 610 described with reference to FIG. 6B. In some embodiments, visual indication 632 includes information about a target motion that must be performed to enter access credentials into user interface 630 (e.g., in some embodiments, it is sufficient that the motion of watch 608 correspond to the motion of remote 510, while in other embodiments, the motions of watch 608 and remote 510 must also correspond to a predefined target motion, as previously described with reference to FIG. 6B). In some embodiments, visual indication 632 is additionally or alternatively displayed on watch 608. It is understood that in some embodiments, the motion required to enter access credentials into user interface 630 is user-specific, such that user B 604 may be required to perform a first motion to enter user B's access credentials into the user interface, while user C 602 may be required to perform a second motion, different from the first motion, to enter user C's access credentials into the user interface. Additionally, such user-specific motion profiles may be utilized in the embodiments described with reference FIGS. 6A-6P.

In FIG. 6Q, user B 604 is holding remote 510 in his left hand, and wearing watch 608 on his left arm. While holding remote 510 in his left hand and wearing watch 608 on his left arm, user B 604 optionally performs the required motion for inputting access credentials into multi-user device 500 (indicated by 624 in FIG. 6Q). This required motion, and the subsequent determination as to whether the detected motions of remote 510 and watch 608 correspond to each other (and in some embodiments, correspond to the predefined target motion), are optionally as described with references to FIGS. 6B-6F.

In response to the performance of the required motion for inputting access credentials into user interface 630, and the determination that the motions of remote 510 and watch 608 correspond to each other, watch 608 (associated with user B 604) optionally transmits, to multi-user device 500, access credentials associated with user B 604 (e.g., a username and password associated with user B 604). Multi-user device 500 optionally inputs those access credentials into user interface 630, illustrated as 634 in FIG. 6R.

Other users can similarly input their associated access credentials into user interface 630 using the same process as described above with respect to FIGS. 6Q-6R. For example, in FIG. 6S, user C 602 is holding remote 510 in his left hand, and wearing watch 606 on his left arm. While holding remote 510 in his left hand and wearing watch 606 on his left arm, user C 602 optionally performs the required motion for inputting access credentials into multi-user device 500 (indicated by 624 in FIG. 6S). This required motion, and the subsequent determination as to whether the detected motions of remote 510 and watch 606 correspond to each other (and in some embodiments, correspond to the predefined target motion), are optionally as described with references to FIGS. 6B-6F. In accordance with the same steps as described with reference to FIGS. 6Q-6R, watch 606 (associated with user C 602) optionally transmits, to multi-user device 500, access credentials associated with user C 602 (e.g., a username and password associated with user C 602). Multi-user device 500 optionally inputs those access credentials into user interface 630, illustrated as 636 in FIG. 6T.

FIGS. 7A-7J are flow diagrams illustrating a motion-based method 700 of configuring a multi-user device based on one or more profiles in accordance with some embodiments of the disclosure. The method 700 is optionally performed at an electronic device such as device 100, device 300, device 500 or remote 510 as described above with reference to FIGS. 1A-1B, 2-3 and 5A-5B. Some operations in method 700 are, optionally, combined and/or the order of some operations is, optionally, changed.

As described below, the method 700 provides ways in which a user configures a multi-user device based on one or more profiles using motion of an accessory of the multi-user device and/or a user device. The method reduces the cognitive burden on a user when interacting with the multi-user device of the disclosure, thereby creating a more efficient human-machine interface. For battery-operated electronic devices, increasing the efficiency of the user's interaction with the multi-user device conserves power and increases the time between battery charges.

In some embodiments, an electronic device (e.g., device 100, device 300, device 500 or remote 510 in FIGS. 1A-1B, 2-3 and 5A-5B) with one or more processors and memory, obtains (701) first motion information describing motion of an accessory (e.g., a remote control of a set-top box, such as remote 510 in FIG. 6A) of a multi-user device that is in communication with a display (e.g., a set-top box connected to a television, such as device 500 connected to display 514 in FIG. 6A), such as described with reference to FIGS. 6C-6F. The motion of the accessory is optionally detected during a first time period (701). In some embodiments, the electronic device obtains (706) second motion information describing motion of a user device (e.g., a watch, a cellular phone, that is associated with a particular user, etc., such as watch 608 in FIG. 6A) that is associated with a first profile (e.g., the user device is logged into the first profile, which optionally gives the user device access to content, personalization options, passwords and/or other credentials associated with the first profile), wherein the motion of the user device is detected during the first time period, such as described with reference to FIGS. 6C-6F.

In response to obtaining the first motion information of the accessory and/or the second motion information of the user device (707) (e.g., obtained by the accessory, obtained by the user device, obtained by the multi-user device, and/or obtained by another device, such as a remote server), in accordance with a determination that the motion of the accessory and the motion of the user device satisfy profile-switching criteria (707), including a criterion that is satisfied when the motion of the accessory and the motion of the user device have corresponding movement profiles during the first time period (718) (e.g., the motion of the accessory mirrors the motion of the user device, such that the electronic device determines that the accessory and the user device are located on the same arm of the user while motion of that arm is causing the detected motions of the accessory and the user device), the electronic device optionally initiates (709) a process for configuring the multi-user device based on the first profile, such as described with reference to FIGS. 6B-6H (e.g., initiating a process for the multi-user device to log into the first profile—the same profile associated with the user device—to give the multi-user device access to the same content, personalization options, passwords and/or other credentials associated with the first profile and accessible on the user device).

In some embodiments, in accordance with a determination that the motion of the accessory and the motion of the user device do not satisfy the profile-switching criteria (714), the electronic device forgoes initiating (715) the process for configuring the multi-user device based on the first profile, such as described with reference to FIGS. 6I-6L. In some embodiments, the electronic device is the accessory of the multi-user device, the user device, the multi-user device, or a remote server (e.g., a server different and/or remote from the multi-user device, the user device, and the accessory of the multi-user device). In some embodiments, the determination about the motions of the accessory and the user device with respect to the profile-switching criteria is made by the accessory, in some embodiments, the determination is made by the multi-user device, in some embodiments, the determination is made by the user device, and in some embodiments, the determination is made by another device, such as a remote server.

In some embodiments, the accessory of the multi-user device is not associated with a particular user (702) (e.g., the accessory, such as a remote control, merely controls the multi-user device, and is not, itself, logged into a user profile, such as the first profile). In some embodiments, the user device is associated with a particular user (703), such as described with reference to FIG. 6B (e.g., the user device is registered to a particular user, logged into a profile of the particular user, etc.). In some embodiments, the user device is a personal wearable device (704), such as watches 606 and 608 in FIG. 6B (e.g., a watch, a ring, a bracelet, glasses, etc.). In some embodiments, the display is a television, the multi-user device is a set-top box that controls display on the television, and the accessory is a remote control for the set-top box (705), such as described with reference to FIG. 6A.

In some embodiments, in accordance with the determination that the motion of the accessory and the motion of the user device do not satisfy the profile-switching criteria, the electronic device performs (716) a directional action on the multi-user device in accordance with the motion of the accessory, such as described with reference to FIG. 6L (e.g., a right-to-left movement of the accessory optionally moves a current-selection indicator from right-to-left on a user interface displayed by the multi-user device on the display). In some embodiments, the profile-switching criteria include a criterion that is satisfied then the multi-user device is in a mode of operation that allows for configuring the multi-user device based on a profile. If the motion of the accessory and the motion of the user device are detected during a mode of operation that does not allow for configuring the multi-user device based on a profile (e.g., because the multi-user device is in a navigation mode rather than a "log-in" mode of operation), then the profile-switching criteria are optionally not satisfied, and a directional action is optionally performed on the multi-user device in accordance with the motion of the accessory.

In some embodiments, initiating the process for configuring the multi-user device based on the first profile comprises logging into (710) the first profile on the multi-user device, such as described with reference to FIGS. 6G-6H (e.g., to give the multi-user device access to the same content, personalization options, passwords and/or other credentials associated with the first profile and accessible on the user device). In some embodiments, initiating the process for configuring the multi-user device based on the first profile comprises, prior to logging into the first profile on the multi-user device, logging out (711) of a second profile on the multi-user device, such as described with reference to FIGS. 6G-6H (e.g., switching from access on the multi-user device of content, personalization options, passwords and/or other credentials associated with the second profile to content, personalization options, passwords and/or other credentials associated with the first profile). In some embodiments, a different user with a device associated with the second profile can pickup the remote and perform the same gesture to log out of the first profile and log back into the second profile. Additionally a user with a device associated with a third profile, such as user C 602 with watch 606 in FIG. 6H, could pick up the remote and perform the same gesture to log out of the first profile and log into the third profile.

In some embodiments, in accordance with the determination that the motion of the accessory and the motion of the user device satisfy the profile-switching criteria, the user device displays (712) a visual confirmation of the process for configuring the multi-user device based on the first profile, such as described with reference to FIGS. 6G-6H (e.g., a confirmation message informing the user that the motion of the accessory and the motion of the user device had corresponding movement profiles, that the configuration of the multi-user device based on the first profile was successfully initiated, in-progress and/or completed, a dialog box asking the user for confirmation of configuring the multi-user device based on the first profile before initiating the process for doing so, etc.).

In some embodiments, the profile-switching criteria include a criterion that is satisfied when, prior to obtaining the second motion information describing the motion of the user device associated with the first profile, the multi-user device had been configured based on the first profile, and is not satisfied when, prior to obtaining the second motion information describing the motion of the user device associated with the first profile, the multi-user device had not been configured based on the first profile, and when the second motion information describing the motion of the user device associated with the first profile is obtained, the multi-user device is not configured based on the first profile (719), such as described with reference to FIGS. 6M-6P (e.g., profile switching on the multi-user device to a profile associated with the user device using motion-based switching is only allowed when the multi-user device has previously been configured based on the profile associated with the user device to prevent unwanted configuration using unknown user devices, for example).

In some embodiments, determining that the motion of the accessory and the motion of the user device have corresponding movement profiles during the first time period comprises determining (720) that the accessory and the user device are located on a same arm of a user while motion of the arm is causing the motion of the accessory and the motion of the user device during the first time period, such as described with reference to FIGS. 6B-6F (e.g., the remote control is being held in a same hand that is wearing a smartwatch that is associated with the first profile). In some embodiments, the accessory is determined to be in a hand of the user on the arm, and the user device is determined to be on a wrist of the user on the arm (721), such as described with reference to FIGS. 6B-6F (e.g., the user device is a watch on the user's right wrist, the user is holding the accessory (remote) in the user's right hand, and the user is generating the motion of the accessory and the watch by moving the user's right arm in a given movement pattern, such as a circular movement pattern). In some embodiments, determining that the motion of the accessory and the motion of the user device have corresponding movement profiles during the first time period comprises determining (722) that the motion of the accessory comprises a scaled (e.g., larger) version of the motion of the user device. For example, if the accessory is in the user's hand, and the user device is a watch on the user's wrist corresponding to that hand, then movement originating from the user's elbow or shoulder will cause movement of the user device at a first magnitude, and movement of the accessory at a second magnitude, larger than the first magnitude. The above is optionally true, because of the greater distance between the accessory and the joint of movement as compared with the distance between the watch and the joint of movement. In such a scenario, the electronic device optionally determines that the movement of the user device and the movement of the accessory have corresponding movement profiles.

In some embodiments, initiating the process for configuring the multi-user device based on the first profile comprises receiving (723), by the multi-user device, information from the user device for being configured based on the first profile (e.g., the user device has access to a username and password (or other credentials) for logging into the first profile, and transmits that information to the multi-user device; the information is optionally stored on the user device, or the user device otherwise has access to the information, such as via a connection to a server). In some embodiments, initiating the process for configuring the multi-user device based on the first profile also comprises configuring (723) the multi-user device based on the first profile using the information from the user device (e.g., the multi-user device uses the username and password (or other credentials) received from the user device to log into the first profile). In some embodiments, the accessory is in communication with the multi-user device via a first connection (e.g., a Bluetooth, infrared or other wireless or wired connection between the accessory and the multi-user device), and the information for being configured based on the first profile is received by the multi-user device from the user device via the first connection (724) (e.g., the user device transmits the information to the accessory, which then transmits the information to the multi-user device). In some embodiments, the accessory is in communication with the multi-user device via a first connection (e.g., a Bluetooth, infrared or other wireless or wired connection between the accessory and the multi-user device), and the information for being configured based on the first profile is received by the multi-user device from the user device via a second connection, different from the first connection (725). For example, the user device transmits the information to the multi-user device, not via the accessory, but via a different connection to the multi-user device, such as a direct connection between the user device and the multi-user device, or an indirect connection between the user device and the multi-user device, such as a connection between the user device and a remote server, and the remote server and the multi-user device. In some embodiments, the second connection comprises a connection between the multi-user device and a server, and the user device is in communication with the server (726).

In some embodiments, the profile-switching criteria include a criterion that is satisfied when the motion of the accessory and the motion of the user device both correspond to a predefined target movement profile (754), such as described with reference to FIGS. 6B-6F (e.g., the motions of the accessory and the user device must correspond to each other, as well as a predefined movement profile, before the process for configuring the multi-user device based on the first profile is initiated). The predefined target movement profile is optionally any movement profile, such as a circle profile, a zig-zag profile (e.g., as described with reference to FIGS. 6B-6F), a shaking (back-and-forth) profile, etc. In some embodiments, a visual indication of the predefined target movement profile is displayed (755) (e.g., on the display, on the user device, and/or on the accessory), and the first motion information describing the motion of the accessory and the second motion information describing the motion of the user device are obtained while the visual indication of the predefined target movement profile is displayed, such as described with reference to FIG. 6B (e.g., the target movement profile is optionally displayed so that a user knows how to move the accessory and user device in order to initiate the process for configuring the multi-user device based on the first profile, such as a quick movement from left to right and back again or a circular motion or figure eight repeated a predefined number of times). For example, when the user selects an option to log in to a user account on the multi-user device, and the user device is detected in proximity to the accessory, the multi-user device can prompt the user to log-in using the gesture by displaying a text prompt describing the gesture and/or displaying a graphical prompt to perform the gesture in order to log-in.

In some embodiments, the profile-switching criteria include a criterion that is satisfied when a user is authenticated on the user device (e.g., the user device is unlocked) when the first motion information and the second motion information are obtained, and not satisfied then the user is not authenticated on the user device when the first motion information and the second motion information are obtained (727) (e.g., the process for configuring the multi-user device based on the first profile is only initiated if the user device is unlocked or otherwise in an authenticated state when the motions of the accessory and the user device are detected).

In some embodiments, initiating the process for configuring the multi-user device based on the first profile comprises (728) displaying (729) (e.g., by the multi-user device on the display, by the accessory on the accessory, and/or by the user device on the user device) a visual confirmation of a request to configure the multi-user device based on the first profile, such as described with reference to FIG. 6G. While displaying the visual confirmation, an input is optionally received (730) (e.g., from the accessory of the multi-user device, and/or from the user device). In response to receiving the input (731), in accordance with a determination that the input corresponds to an input confirming the request to configure the multi-user device based on the first profile, the electronic device optionally continues (732) the process for configuring the multi-user device based on the first profile, such as described with reference to FIGS. 6G-6H. In accordance with a determination that the input corresponds to an input canceling the request to configure the multi-user device based on the first profile, the electronic device optionally terminates (733) the process for configuring the multi-user device based on the first profile.

In some embodiments, after initiating the process for configuring the multi-user device based on the first profile, and while the multi-user device is configured based on the first profile (734) (e.g., while the multi-user device is logged into the first profile), the electronic device obtains (735) third motion information describing motion of the accessory (e.g., a remote control of a set-top box) of the multi-user device during a second time period, after the first time period, and obtains (736) fourth motion information describing motion of a second user device (e.g., a watch, a cellular phone, that is associated with a particular user etc., such as watch 606 of user C 602 in FIG. 6H) that is associated with a second profile (e.g., the second user device is logged into the second profile, which optionally gives the second user device access to content, personalization options, passwords and/or other credentials associated with the second profile), different from the first profile, wherein the motion of the second user device is detected during the second time period. In response to obtaining the third motion information of the accessory and/or the fourth motion information of the second user device (737), in accordance with a determination that the motion of the accessory and the motion of the second user device satisfy the profile-switching criteria, including a criterion that is satisfied when the motion of the accessory and the motion of the second user device have corresponding movement profiles during the second time period (e.g., the motion of the accessory mirrors the motion of the second user device, such that the electronic device determines that the accessory and the second user device are located on the same arm of the user while motion of that arm is causing the detected motions of the accessory and the second user device), the electronic device optionally initiates (738) a process for configuring the multi-user device based on the second profile rather than the first profile (e.g., initiating a process for the multi-user device to log out of the first profile and log into the second profile—the same profile associated with the second user device—to give the multi-user device access to the same content, personalization options, passwords and/or other credentials associated with the second profile and accessible on the second user device). In accordance with a determination that the motion of the accessory and the motion of the second user device do not satisfy the profile-switching criteria, the electronic device optionally forgoes initiating (739) the process for configuring the multi-user device based on the second profile. In some embodiments, the determination about the motions of the accessory and the second user device with respect to the profile-switching criteria is made by the multi-user device, in some embodiments, the determination is made by the second user device, and in some embodiments, the determination is made by another device, such as a remote server.

In some embodiments, configuring the multi-user device based on the first profile (740) grants the multi-user device access to a first set of content that is not available when the multi-user device is not configured based on the first profile (741) (e.g., music, movies, television shows, applications, content subscriptions, access to content stored on the multi-user device or in the cloud, etc., associated with the first profile). In some embodiments, forgoing configuring the multi-user device based on the first profile denies the multi-user device access to the first set of content. In some embodiments, configuring the multi-user device based on the first profile (740) causes the multi-user device to operate using a first set of personalization options that are different from personalization options under which the multi-user device operates when not configured based on the first profile (742) (e.g., volume, display, favorites, bookmarks, watchlists, playlists, media queues, etc., associated with the first profile). In some embodiments, forgoing configuring the multi-user device based on the first profile denies the multi-user device access to the first set of personalization options. In some embodiments, configuring the multi-user device based on the first profile (740) grants the multi-user device access to a first set of access credentials that are not available when the multi-user device is not configured based on the first profile (743) (e.g., passwords or other credentials associated with the first profile, an iCloud keychain, etc., associated with the first profile). In some embodiments, forgoing configuring the multi-user device based on the first profile denies the multi-user device access to the first set of access credentials (e.g., when the multi-user device is not configured based on the first profile, the multi-user device is not logged in to other accounts associated with the user who is associated with the first profile).

In some embodiments, prior to obtaining the first motion information and the second motion information, in accordance with a determination that a user associated with the user device has picked up the accessory of the multi-user device (e.g., determining that a user wearing a watch has picked up a remote control for a set-top box), a visual indication of the user's ability to initiate the process for configuring the multi-user device based on the first profile is displayed (744), such as described with reference to FIG. 6B (e.g., by the multi-user device on the display, on the user device, and/or on the accessory). For example, upon determining the accessory has been picked up by the user wearing a watch, the user is presented with a visual indication that a process for configuring the multi-user device based on a profile associated with the user device can be initiated by the user in response to the user providing appropriate motion to the accessory and the user device. In some embodiments, the first motion information and the second motion information are obtained while the visual indication is displayed (744). In some embodiments, determining that the user associated with the user device has picked up the accessory of the multi-user device comprises (745) determining (746), by the accessory of the multi-user device, that the user device is within a threshold proximity (e.g., 6 inches, 1 foot, etc.) of the accessory of the multi-user device (e.g., using Bluetooth Low Energy (LE)), and the visual indication is displayed, by the multi-user device, on the display. In some embodiments, a visual indication that that the user device is within a threshold proximity (e.g., 6 inches, 1 foot, etc.) of the accessory of the multi-user device is displayed on a display of the accessory instead of or in addition to the visual indication displayed by the multi-user device on the display. In some embodiments, determining that the user associated with the user device has picked up the accessory of the multi-user device comprises (745) determining (747), by the user device, that the user device is within a threshold proximity (e.g., 6 inches, 1 foot, etc.) of the accessory of the multi-user device (e.g., using Bluetooth Low Energy (LE)), and the visual indication is displayed on the user device.

In some situations, an analogous approach can be used to provide access to restricted content instead of (or in addition to) switching between different user profiles (e.g., as described above with reference to FIGS. 6Q-6T). In some embodiments, the multi-user device displays (748), on the display, an access credential input user interface for accessing restricted content on the multi-user device, such as described with reference to FIG. 6Q (e.g., displaying a login page for logging into an access-restricted area of the multi-user device, website, etc., with username and password, or other access credential, entry fields). While displaying the access credential input user interface, the electronic device optionally obtains (749) third motion information describing motion of the accessory during a second time period, such as described with reference to FIG. 6Q. In response to obtaining the third motion information of the accessory (750), in accordance with a determination that fourth motion information of the user device (e.g., watch 608 in FIG. 6Q) describing motion of the user device during the second time period was obtained (e.g., determining that the accessory and a user device were both moving during the second time period, such as described with reference to FIG. 6Q), and that the motion of the accessory and the motion of the user device during the second time period satisfy access-credential criteria, including a criterion that is satisfied when the motion of the accessory and the motion of the user device have corresponding movement profiles during the second time period (e.g., the motion of the accessory mirrors the motion of the user device, such that the electronic device determines that the accessory and the user device are located on the same arm of the user while motion of that arm is causing the detected motions of the accessory and the user device), access credentials are optionally inputted (751) from the user device to the access credential input user interface for accessing the restricted content on the multi-user device, such as described with reference to FIG. 6R (e.g., the user device transmits a first set of username and password, or other access credentials, to the multi-user device and into the entry fields in the user interface). In accordance with a determination that fifth motion information of a second user device (e.g., watch 606 in FIG. 6S) describing motion of the second user device during the second time period was obtained (e.g., determining that the accessory and a second user device were both moving during the second time period, such as described with reference to FIG. 6S), and that the motion of the accessory and the motion of the second user device during the second time period satisfy the access-credential criteria, including a criterion that is satisfied when the motion of the accessory and the motion of the second user device have corresponding movement profiles during the second time period, access credentials are optionally inputted (752) from the second user device to the access credential input user interface for accessing the restricted content on the multi-user device, such as described with reference to FIG. 6T (e.g., the second user device transmits a second set of username and password, or other access credentials, to the multi-user device and into the entry fields in the user interface). In some embodiments, the determinations about the motions of the accessory and the user device and/or second user device with respect to the access-credential criteria are made by the multi-user device, in some embodiments, the determination is made by the user device and/or the second user device, and in some embodiments, the determination is made by another device, such as a remote server.

In some embodiments, the first motion information and the second motion information are both received by the electronic device, and determining whether the motion of the accessory and the motion of the user device satisfy the profile-switching criteria is performed by the electronic device, and is based on the first motion information and the second motion information (753) (e.g., by comparing the first motion and the second motion to determine a similarity between the first motion and the second motion and evaluating whether or not the first motion and the second motion meet a set of predefined similarity criteria).

It should be understood that the particular order in which the operations in FIGS. 7A-7J have been described is merely exemplary and is not intended to indicate that the described order is the only order in which the operations could be performed. One of ordinary skill in the art would recognize various ways to reorder the operations described herein. Additionally, the operations in the information processing methods described above are, optionally, implemented by running one or more functional modules in an information processing apparatus such as general purpose processors (e.g., as described above with respect to FIGS. 1A, 3 and 5A) or application specific chips.

Figure 8:
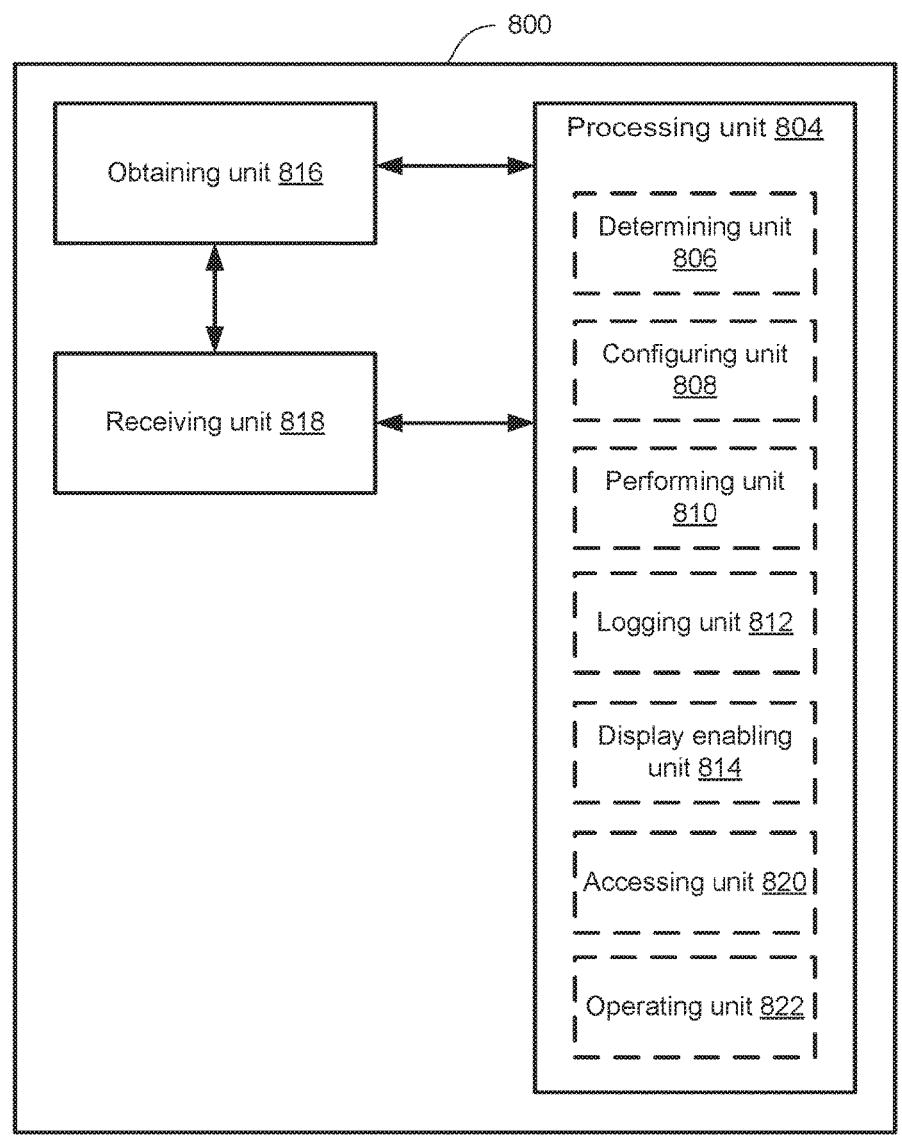
FIG. 8 is a functional block diagram of an electronic device in accordance with some embodiments of the disclosure.

In accordance with some embodiments, FIG. 8 shows a functional block diagram of an electronic device 800 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 8 are, optionally, combined or separated into sub-blocks to implement the principles of the various described embodiments. Therefore, the description herein optionally supports any possible combination or separation or further definition of the functional blocks described herein.

As shown in FIG. 8, an electronic device 800 optionally includes an obtaining unit 816 configured to obtain motion information, a receiving unit 818 coupled to the obtaining unit 816 and configured to receive inputs and a processing unit 804 coupled to each of the obtaining unit 816 and the receiving unit 818. In some embodiments, the processing unit 804 includes a determining unit 806, a configuring unit 808, a performing unit 810, a logging unit 812, a display enabling unit 814, and an accessing unit 820.

In some embodiments, the obtaining unit 816 is configured to obtain first motion information describing motion of an accessory of a multi-user device that is in communication with a display, wherein the motion of the accessory is detected during a first time period, and obtain second motion information describing motion of a user device that is associated with a first profile, wherein the motion of the user device is detected during the first time period. In some embodiments, the processing unit 804 is configured to, in response to the obtaining unit 816 obtaining the first motion information of the accessory and/or the second motion information of the user device, in accordance with a determination (e.g., with the determining unit 806) that the motion of the accessory and the motion of the user device satisfy profile-switching criteria, including a criterion that is satisfied when the motion of the accessory and the motion of the user device have corresponding movement profiles during the first time period, initiate a process for configuring (e.g., with the configuring unit 808) the multi-user device based on the first profile, and in accordance with a determination (e.g., with the determining unit 806) that the motion of the accessory and the motion of the user device do not satisfy the profile-switching criteria, forgo initiating the process for configuring (e.g., with the configuring unit 808) the multi-user device based on the first profile.

In some embodiments, the accessory of the multi-user device is not associated with a particular user. In some embodiments, the user device is associated with a particular user. In some embodiments, the user device is a personal wearable device. In some embodiments, the display is a television, the multi-user device is a set-top box that controls display on the television, and the accessory is a remote control for the set-top box.

In some embodiments, the processing unit 804 is further configured to, in accordance with the determination (e.g., with the determining unit 806) that the motion of the accessory and the motion of the user device do not satisfy the profile-switching criteria, cause performance of a directional action (e.g., with the performing unit 810) on the multi-user device in accordance with the motion of the accessory. In some embodiments, initiating the process for configuring (e.g., with the configuring unit 808) the multi-user device based on the first profile comprises, logging into (e.g., with logging unit 812) the first profile on the multi-user device. In some embodiments, initiating the process for configuring (e.g., with the configuring unit 808) the multi-user device based on the first profile comprises, prior to logging into (e.g., with the logging unit 812) the first profile on the multi-user device, logging out of a second profile on the multi-user device.

In some embodiments, the processing unit 804 is further configured to, in accordance with the determination (e.g., with the determining unit 806) that the motion of the accessory and the motion of the user device satisfy the profile-switching criteria, cause display (e.g., with the display enabling unit 814), on the user device, of a visual confirmation of the process for configuring (e.g., with the configuring unit 808) the multi-user device based on the first profile.

In some embodiments, the profile-switching criteria include a criterion that is satisfied when, prior to the obtaining unit 816 obtaining the second motion information describing the motion of the user device associated with the first profile, the multi-user device had been configured based on the first profile, and is not satisfied when, prior to the obtaining unit 816 obtaining the second motion information describing the motion of the user device associated with the first profile, the multi-user device had not been configured based on the first profile, and when the second motion information describing the motion of the user device associated with the first profile is obtained by the obtaining unit 816, the multi-user device is not configured based on the first profile.

In some embodiments, determining (e.g., with the determining unit 806) that the motion of the accessory and the motion of the user device have corresponding movement profiles during the first time period comprises determining (e.g., with the determining unit 806) that the accessory and the user device are located on a same arm of a user while motion of the arm is causing the motion of the accessory and the motion of the user device during the first time period. In some embodiments, the accessory is determined (e.g., with the determining unit 806) to be in a hand of the user on the arm, and the user device is determined (e.g., with the determining unit 806) to be on a wrist of the user on the arm. In some embodiments, determining (e.g., with the determining unit 806) that the motion of the accessory and the motion of the user device have corresponding movement profiles during the first time period comprises determining (e.g., with the determining unit 806) that the motion of the accessory comprises a scaled version of the motion of the user device.

In some embodiments, initiating the process for configuring (e.g., with the configuring unit 808) the multi-user device based on the first profile comprises receiving, by the multi-user device, information from the user device for being configured based on the first profile, and configuring (e.g., with the configuring unit 808) the multi-user device based on the first profile using the information from the user device. In some embodiments, the accessory is in communication with the multi-user device via a first connection, and the information for being configured based on the first profile is received by the multi-user device from the user device via the first connection. In some embodiments, the accessory is in communication with the multi-user device via a first connection, and the information for being configured based on the first profile is received by the multi-user device from the user device via a second connection, different from the first connection. In some embodiments, the second connection comprises a connection between the multi-user device and a server and the user device is in communication with the server.

In some embodiments, the profile-switching criteria include a criterion that is satisfied when the motion of the accessory and the motion of the user device both correspond to a predefined target movement profile. In some embodiments, the processing unit 804 is further configured to cause display (e.g., with the display enabling unit 814) of a visual indication of the predefined target movement profile, wherein the first motion information describing the motion of the accessory and the second motion information describing the motion of the user device are obtained (e.g., with the obtaining unit 816) while the visual indication of the predefined target movement profile is displayed. In some embodiments, the profile-switching criteria include a criterion that is satisfied when a user is authenticated on the user device when the first motion information and the second motion information are obtained by the obtaining unit 816, and not satisfied when the user is not authenticated on the user device when the first motion information and the second motion information are obtained by the obtaining unit 816.

In some embodiments, initiating the process for configuring (e.g., with the configuring unit 808) the multi-user device based on the first profile comprises displaying (e.g., with the display enabling unit 814) a visual confirmation of a request to configure the multi-user device based on the first profile, while displaying (e.g., with the display enabling unit 814) the visual confirmation, receiving an input via a receiving unit 818 of the electronic device. In some examples, in response to receiving (e.g., with the receiving unit 818) the input, in accordance with a determination (e.g., with the determining unit 806) that the input corresponds to an input confirming the request to configure the multi-user device based on the first profile, continuing the process for configuring (e.g., with the configuring unit 808) the multi-user device based on the first profile, in accordance with a determination (e.g., with the determining unit 806) that the input corresponds to an input canceling the request to configure the multi-user device based on the first profile, terminating the process for configuring (e.g., with the configuring unit 808) the multi-user device based on the first profile.

In some embodiments, the obtaining unit 816 is further configured to, after initiating the process for configuring (e.g., with the configuring unit 808) the multi-user device based on the first profile, and while the multi-user device is configured based on the first profile, obtain (e.g., with the obtaining unit 816) third motion information describing motion of the accessory of the multi-user device during a second time period, after the first time period, and obtain (e.g., with the obtaining unit 816) fourth motion information describing motion of a second user device that is associated with a second profile, different from the first profile, wherein the motion of the second user device is detected during the second time period. In some embodiments, the processing unit 804 is further configured to, in response to the obtaining unit 816 obtaining the third motion information of the accessory and/or the fourth motion information of the second user device, in accordance with a determination (e.g., with the determining unit 806) that the motion of the accessory and the motion of the second user device satisfy the profile-switching criteria, including a criterion that is satisfied when the motion of the accessory and the motion of the second user device have corresponding movement profiles during the second time period, initiate a process for configuring (e.g., with the configuring unit 808) the multi-user device based on the second profile rather than the first profile, and, in accordance with a determination (e.g., with the determining unit 806) that the motion of the accessory and the motion of the second user device do not satisfy the profile-switching criteria, forego initiating the process for configuring (e.g., with the configuring unit 808) the multi-user device based on the second profile.

In some embodiments, configuring (e.g., with the configuring unit 808) the multi-user device based on the first profile grants the multi-user device access (e.g., with the accessing unit 820) to a first set of content that is not available when the multi-user device is not configured based on the first profile. In some embodiments, configuring (e.g., with the configuring unit 808) the multi-user device based on the first profile causes the multi-user device to operate (e.g., with the operating unit 822) using a first set of personalization options that are different from personalization options under which the multi-user device operates when not configured based on the first profile. In some embodiments, configuring (e.g., with the configuring unit 808) the multi-user device based on the first profile grants the multi-user device access (e.g., with the accessing unit 820) to a first set of access credentials that are not available when the multi-user device is not configured based on the first profile.

In some embodiments, prior to obtaining (e.g., with the obtaining unit 816) the first motion information and the second motion information, in accordance with a determination (e.g., with the determining unit 806) that a user associated with the user device has picked up the accessory of the multi-user device, a visual indication is displayed (e.g., with the display enabling unit 814) of the user's ability to initiate the process for configuring (e.g., with the configuring unit 808) the multi-user device based on the first profile, and the first motion information and the second motion information are obtained by the obtaining unit 816 while the visual indication is displayed.

In some embodiments, determining (e.g., with the determining unit 806) that the user associated with the user device has picked up the accessory of the multi-user device comprises determining, by the accessory of the multi-user device, that the user device is within a threshold proximity of the accessory of the multi-user device, and the visual indication is displayed, by the multi-user device, on the display. In some embodiments, determining (e.g., with the determining unit 806) that the user associated with the user device has picked up the accessory of the multi-user device comprises determining, by the user device, that the user device is within a threshold proximity of the accessory of the multi-user device, and the visual indication is displayed, on the user device.

In some embodiments, the obtaining unit 816 is further configured to, while an access credential input user interface for accessing (e.g., with the accessing unit 820) restricted content on the multi-user device is displayed (e.g., with display enabling unit 814) on the display, obtain third motion information describing motion of the accessory during a second time period. In some embodiments, the processing unit 804 is further configured to, in response to the obtaining unit 816 obtaining the third motion information of the accessory, in accordance with a determination (e.g., with the determining unit 806) that fourth motion information of the user device describing motion of the user device during the second time period was obtained, and that the motion of the accessory and the motion of the user device during the second time period satisfy access-credential criteria, including a criterion that is satisfied when the motion of the accessory and the motion of the user device have corresponding movement profiles during the second time period, input access credentials from the user device to the access credential input user interface for accessing (e.g., with the accessing unit 820) the restricted content on the multi-user device, and in accordance with a determination (e.g., with the determining unit 806) that fifth motion information of a second user device describing motion of the second user device during the second time period was obtained, and that the motion of the accessory and the motion of the second user device during the second time period satisfy the access-credential criteria, including a criterion that is satisfied when the motion of the accessory and the motion of the second user device have corresponding movement profiles during the second time period, input access credentials from the second user device to the access credential input user interface for accessing (e.g., with the accessing unit 820) the restricted content on the multi-user device.

In some embodiments, the electronic device 800 further comprises a receiving unit 818 coupled to the processing unit 804 and configured to receive the first motion information and the second motion information, wherein determining (e.g., with the determining unit 806) whether the motion of the accessory and the motion of the user device satisfy the profile-switching criteria is performed by the processing unit 804 of the electronic device, and is based on the first motion information and the second motion information.

The operations described above with reference to FIGS. 7A-7J are, optionally, implemented by components depicted in FIGS. 1A-1B and 8. For example, displaying operation 702, receiving operation 704, transitioning operation 708 and playing operation 710 are, optionally, implemented by event sorter 170, event recognizer 180, and event handler 190. Event monitor 171 in event sorter 170 detects an input, such as motion input from a remote control or a user device, and event dispatcher module 174 delivers the event information to application 136-1. A respective event recognizer 180 of application 136-1 compares the event information to respective event definitions 186, and determines whether the detected input(s) corresponds to a predefined event or sub-event, such as motion for configuring a multi-user device. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B and 8.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:
at an electronic device with one or more processors and memory:
obtaining first motion information describing motion, through space, of an accessory of a multi-user device that is in communication with a display, wherein the motion of the accessory is detected during a first time period;
obtaining second motion information describing motion, through space, of a respective user device that is associated with a respective profile, wherein the motion of the respective user device is detected during the first time period; and
in response to obtaining the first motion information of the accessory and the second motion information of the respective user device:
in accordance with a determination that the motion of the accessory and the motion of the respective user device satisfy profile-switching criteria, including a criterion that is satisfied when the motion of the accessory and the motion of the respective user device have corresponding movement profiles during the first time period, initiating a process for configuring the multi-user device based on the respective profile, wherein:
in accordance with a determination that the respective user device is a first user device associated with a first profile, the respective profile is the first profile, and
in accordance with a determination that the respective user device is a second user device associated with a second profile, different than the first profile, the respective profile is the second profile; and
in accordance with a determination that the motion of the accessory and the motion of the respective user device do not satisfy the profile-switching criteria, forgoing initiating the process for configuring the multi-user device based on the respective profile.

2. The method of claim 1, wherein the accessory of the multi-user device is not associated with a particular user.

3. The method of claim 1, wherein the respective user device is associated with a particular user.

4. The method of claim 1, wherein the respective user device is a personal wearable device.

5. The method of claim 1, wherein the display is a television, the multi-user device is a set-top box that controls display on the television, and the accessory is a remote control for the set-top box.

6. The method of claim 1, further comprising:
in accordance with the determination that the motion of the accessory and the motion of the respective user device do not satisfy the profile-switching criteria, performing a directional action on the multi-user device in accordance with the motion of the accessory.

7. The method of claim 1, wherein initiating the process for configuring the multi-user device based on the respective profile comprises:
logging into the respective profile on the multi-user device.

8. The method of claim 7, wherein initiating the process for configuring the multi-user device based on the respective profile comprises:
prior to logging into the respective profile on the multi-user device, logging out of a second respective profile on the multi-user device.

9. The method of claim 1, further comprising:
in accordance with the determination that the motion of the accessory and the motion of the respective user device satisfy the profile-switching criteria, displaying, on the respective user device, a visual confirmation of the process for configuring the multi-user device based on the first profile.

10. The method of claim 1, wherein:
the profile-switching criteria include a criterion that is satisfied when, prior to obtaining the second motion information describing the motion, through space, of the respective user device associated with the respective profile, the multi-user device had at one time been configured based on the respective profile, and is not satisfied when, prior to obtaining the second motion information describing the motion, through space, of the respective user device associated with the respective profile, the multi-user device had not at one time been configured based on the first profile, and
when the second motion information describing the motion, through space, of the respective user device associated with the respective profile is obtained, the multi-user device is not configured based on the respective profile.

11. The method of claim 1, wherein determining that the motion of the accessory and the motion of the respective user device have corresponding movement profiles during the first time period comprises determining that the accessory and the respective user device are located on a same arm of a user while motion of the arm is causing the motion of the accessory and the motion of the respective user device during the first time period.

12. The method of claim 11, wherein the accessory is determined to be in a hand of the user on the arm, and the respective user device is determined to be on a wrist of the user on the arm.

13. The method of claim 11, wherein determining that the motion of the accessory and the motion of the respective user device have corresponding movement profiles during the first time period comprises determining that the motion of the accessory comprises a scaled version of the motion of the respective user device.

14. The method of claim 1, wherein initiating the process for configuring the multi-user device based on the respective profile comprises:
receiving, by the multi-user device, information from the respective user device for being configured based on the respective profile; and
configuring the multi-user device based on the respective profile using the information from the respective user device.

15. The method of claim 14, wherein:
the accessory is in communication with the multi-user device via a first connection, and
the information for being configured based on the respective profile is received by the multi-user device from the respective user device via the first connection.

16. The method of claim 14, wherein:
the accessory is in communication with the multi-user device via a first connection, and
the information for being configured based on the respective profile is received by the multi-user device from the respective user device via a second connection, different from the first connection.

17. The method of claim 16, wherein the second connection comprises a connection between the multi-user device and a server, and the respective user device is in communication with the server.

18. The method of claim 1, wherein the profile-switching criteria include a criterion that is satisfied when the motion of the accessory and the motion of the respective user device both correspond to a predefined target movement profile.

19. The method of claim 18, further comprising:
displaying a visual indication of the predefined target movement profile,
wherein the first motion information describing the motion, through space, of the accessory and the second motion information describing the motion, through space, of the respective user device are obtained while the visual indication of the predefined target movement profile is displayed.

20. The method of claim 1, wherein the profile-switching criteria include a criterion that is satisfied when a user is authenticated on the respective user device when the first motion information and the second motion information are obtained, and not satisfied when the user is not authenticated on the respective user device when the first motion information and the second motion information are obtained.

21. The method of claim 1, wherein initiating the process for configuring the multi-user device based on the respective profile comprises:
displaying a visual confirmation of a request to configure the multi-user device based on the respective profile;
while displaying the visual confirmation, receiving an input; and
in response to receiving the input:
in accordance with a determination that the input corresponds to an input confirming the request to configure the multi-user device based on the respective profile, continuing the process for configuring the multi-user device based on the respective profile; and in accordance with a determination that the input corresponds to an input canceling the request to configure the multi-user device based on the respective profile, terminating the process for configuring the multi-user device based on the respective profile.

22. The method of claim 1, further comprising:
after initiating the process for configuring the multi-user device based on the respective profile, and while the multi-user device is configured based on the respective profile:
  obtaining third motion information describing motion, through space, of the accessory of the multi-user device during a second time period, after the first time period;
  obtaining fourth motion information describing motion, through space, of a second respective user device that is associated with a second respective profile, different from the respective profile, wherein the motion of the second respective user device is detected during the second time period; and
  in response to obtaining the third motion information of the accessory and the fourth motion information of the second respective user device:
    in accordance with a determination that the motion of the accessory and the motion of the second respective user device satisfy the profile-switching criteria, including a criterion that is satisfied when the motion of the accessory and the motion of the second respective user device have corresponding movement profiles during the second time period, initiating a process for configuring the multi-user device based on the second respective profile rather than the respective profile; and
    in accordance with a determination that the motion of the accessory and the motion of the second respective user device do not satisfy the profile-switching criteria, forgoing initiating the process for configuring the multi-user device based on the second respective profile.

23. The method of claim 1, wherein:
configuring the multi-user device based on the respective profile grants the multi-user device access to a first set of content that is not available when the multi-user device is not configured based on the respective profile.

24. The method of claim 1, wherein:
configuring the multi-user device based on the respective profile causes the multi-user device to operate using a first set of personalization options that are different from personalization options under which the multi-user device operates when not configured based on the respective profile.

25. The method of claim 1, wherein:
configuring the multi-user device based on the respective profile grants the multi-user device access to a first set of access credentials that are not available when the multi-user device is not configured based on the respective profile.

26. The method of claim 1, further comprising:
prior to obtaining the first motion information and the second motion information, in accordance with a determination that a user associated with the respective user device has picked up the accessory of the multi-user device, displaying a visual indication of the user's ability to initiate the process for configuring the multi-user device based on the respective profile, wherein the first motion information and the second motion information are obtained while the visual indication is displayed.

27. The method of claim 26, wherein:
determining that the user associated with the respective user device has picked up the accessory of the multi-user device comprises determining, by the accessory of the multi-user device, that the respective user device is within a threshold proximity of the accessory of the multi-user device, and
the visual indication is displayed, by the multi-user device, on the display.

28. The method of claim 26, wherein:
determining that the user associated with the respective user device has picked up the accessory of the multi-user device comprises determining, by the respective user device, that the respective user device is within a threshold proximity of the accessory of the multi-user device, and
the visual indication is displayed on the respective user device.

29. The method of claim 1, further comprising:
displaying, on the display, an access credential input user interface for accessing restricted content on the multi-user device;
while displaying the access credential input user interface, obtaining third motion information describing motion, through space, of the accessory during a second time period;
in response to obtaining the third motion information of the accessory:
  in accordance with a determination that fourth motion information of the respective user device describing motion, through space, of the respective user device during the second time period was obtained, and that the motion of the accessory and the motion of the respective user device during the second time period satisfy access-credential criteria, including a criterion that is satisfied when the motion of the accessory and the motion of the respective user device have corresponding movement profiles during the second time period, inputting access credentials from the respective user device to the access credential input user interface for accessing the restricted content on the multi-user device; and
  in accordance with a determination that fifth motion information of a second respective user device describing motion, through space, of the second respective user device during the second time period was obtained, and that the motion of the accessory and the motion of the second respective user device during the second time period satisfy the access-credential criteria, including a criterion that is satisfied when the motion of the accessory and the motion of the second respective user device have corresponding movement profiles during the second time period, inputting access credentials from the second respective user device to the access credential input user interface for accessing the restricted content on the multi-user device.

30. The method of claim 1, wherein:
the first motion information and the second motion information are both received by the electronic device, and
determining whether the motion of the accessory and the motion of the respective user device satisfy the profile-switching criteria is performed by the electronic device, and is based on the first motion information and the second motion information.

31. An electronic device, comprising:
one or more processors;
memory; and
one or more programs, wherein the one or more programs are stored in the memory and configured to be executed by the one or more processors, the one or more programs including instructions for:
obtaining first motion information describing motion, through space, of an accessory of a multi-user device that is in communication with a display, wherein the motion of the accessory is detected during a first time period;
obtaining second motion information describing motion, through space, of a respective user device that is associated with a respective profile, wherein the motion of the respective user device is detected during the first time period; and
in response to obtaining the first motion information of the accessory and the second motion information of the respective user device:
in accordance with a determination that the motion of the accessory and the motion of the respective user device satisfy profile-switching criteria, including a criterion that is satisfied when the motion of the accessory and the motion of the respective user device have corresponding movement profiles during the first time period, initiating a process for configuring the multi-user device based on the respective profile, wherein:
in accordance with a determination that the respective user device is a first user device associated with a first profile, the respective profile is the first profile, and
in accordance with a determination that the respective user device is a second user device associated with a second profile, different than the first profile, the respective profile is the second profile; and
in accordance with a determination that the motion of the accessory and the motion of the respective user device do not satisfy the profile-switching criteria, forgoing initiating the process for configuring the multi-user device based on the respective profile.

32. The electronic device of claim 31, wherein the accessory of the multi-user device is not associated with a particular user.

33. The electronic device of claim 31, wherein the respective user device is associated with a particular user.

34. The electronic device of claim 31, wherein the respective user device is a personal wearable device.

35. The electronic device of claim 31, wherein the display is a television, the multi-user device is a set-top box that controls display on the television, and the accessory is a remote control for the set-top box.

36. The electronic device of claim 31, the one or more programs including further instructions for:
in accordance with the determination that the motion of the accessory and the motion of the respective user device do not satisfy the profile-switching criteria, performing a directional action on the multi-user device in accordance with the motion of the accessory.

37. The electronic device of claim 31, wherein initiating the process for configuring the multi-user device based on the respective profile comprises:
logging into the respective profile on the multi-user device.

38. The electronic device of claim 37, wherein initiating the process for configuring the multi-user device based on the respective profile comprises:
prior to logging into the respective profile on the multi-user device, logging out of a second respective profile on the multi-user device.

39. The electronic device of claim 31, the one or more programs including further instructions for:
in accordance with the determination that the motion of the accessory and the motion of the respective user device satisfy the profile-switching criteria, displaying, on the respective user device, a visual confirmation of the process for configuring the multi-user device based on the first profile.

40. The electronic device of claim 31, wherein:
the profile-switching criteria include a criterion that is satisfied when, prior to obtaining the second motion information describing the motion, through space, of the respective user device associated with the respective profile, the multi-user device had at one time been configured based on the respective profile, and is not satisfied when, prior to obtaining the second motion information describing the motion, through space, of the respective user device associated with the respective profile, the multi-user device had not at one time been configured based on the first profile, and
when the second motion information describing the motion, through space, of the respective user device associated with the respective profile is obtained, the multi-user device is not configured based on the respective profile.

41. The electronic device of claim 31, wherein determining that the motion of the accessory and the motion of the respective user device have corresponding movement profiles during the first time period comprises determining that the accessory and the respective user device are located on a same arm of a user while motion of the arm is causing the motion of the accessory and the motion of the respective user device during the first time period.

42. The electronic device of claim 41, wherein the accessory is determined to be in a hand of the user on the arm, and the respective user device is determined to be on a wrist of the user on the arm.

43. The electronic device of claim 41, wherein determining that the motion of the accessory and the motion of the respective user device have corresponding movement profiles during the first time period comprises determining that the motion of the accessory comprises a scaled version of the motion of the respective user device.

44. The electronic device of claim 31, wherein initiating the process for configuring the multi-user device based on the respective profile comprises:
receiving, by the multi-user device, information from the respective user device for being configured based on the respective profile; and
configuring the multi-user device based on the respective profile using the information from the respective user device.

45. The electronic device of claim 44, wherein:
the accessory is in communication with the multi-user device via a first connection, and
the information for being configured based on the respective profile is received by the multi-user device from the respective user device via the first connection.

46. The electronic device of claim 44, wherein:
the accessory is in communication with the multi-user device via a first connection, and the information for being configured based on the respective profile is received by the multi-user device from the respective user device via a second connection, different from the first connection.

47. The electronic device of claim 46, wherein the second connection comprises a connection between the multi-user device and a server, and the respective user device is in communication with the server.

48. The electronic device of claim 31, wherein the profile-switching criteria include a criterion that is satisfied when the motion of the accessory and the motion of the respective user device both correspond to a predefined target movement profile.

49. The electronic device of claim 48, the one or more programs including further instructions for:
displaying a visual indication of the predefined target movement profile,
wherein the first motion information describing the motion, through space, of the accessory and the second motion information describing the motion, through space, of the respective user device are obtained while the visual indication of the predefined target movement profile is displayed.

50. The electronic device of claim 31, wherein the profile-switching criteria include a criterion that is satisfied when a user is authenticated on the respective user device when the first motion information and the second motion information are obtained, and not satisfied when the user is not authenticated on the respective user device when the first motion information and the second motion information are obtained.

51. The electronic device of claim 31, wherein initiating the process for configuring the multi-user device based on the respective profile comprises:
displaying a visual confirmation of a request to configure the multi-user device based on the respective profile;
while displaying the visual confirmation, receiving an input; and
in response to receiving the input:
in accordance with a determination that the input corresponds to an input confirming the request to configure the multi-user device based on the respective profile, continuing the process for configuring the multi-user device based on the respective profile; and
in accordance with a determination that the input corresponds to an input canceling the request to configure the multi-user device based on the respective profile, terminating the process for configuring the multi-user device based on the respective profile.

52. The electronic device of claim 31, the one or more programs including further instructions for:
after initiating the process for configuring the multi-user device based on the respective profile, and while the multi-user device is configured based on the respective profile:
obtaining third motion information describing motion, through space, of the accessory of the multi-user device during a second time period, after the first time period;
obtaining fourth motion information describing motion, through space, of a second respective user device that is associated with a second respective profile, different from the respective profile, wherein the motion of the second respective user device is detected during the second time period; and
in response to obtaining the third motion information of the accessory and the fourth motion information of the second respective user device:
in accordance with a determination that the motion of the accessory and the motion of the second respective user device satisfy the profile-switching criteria, including a criterion that is satisfied when the motion of the accessory and the motion of the second respective user device have corresponding movement profiles during the second time period, initiating a process for configuring the multi-user device based on the second respective profile rather than the respective profile; and
in accordance with a determination that the motion of the accessory and the motion of the second respective user device do not satisfy the profile-switching criteria, forgoing initiating the process for configuring the multi-user device based on the second respective profile.

53. The electronic device of claim 31, wherein:
configuring the multi-user device based on the respective profile grants the multi-user device access to a first set of content that is not available when the multi-user device is not configured based on the respective profile.

54. The electronic device of claim 31, wherein:
configuring the multi-user device based on the respective profile causes the multi-user device to operate using a first set of personalization options that are different from personalization options under which the multi-user device operates when not configured based on the respective profile.

55. The electronic device of claim 31, wherein:
configuring the multi-user device based on the respective profile grants the multi-user device access to a first set of access credentials that are not available when the multi-user device is not configured based on the respective profile.

56. The electronic device of claim 31, the one or more programs including further instructions for:
prior to obtaining the first motion information and the second motion information, in accordance with a determination that a user associated with the respective user device has picked up the accessory of the multi-user device, displaying a visual indication of the user's ability to initiate the process for configuring the multi-user device based on the respective profile,
wherein the first motion information and the second motion information are obtained while the visual indication is displayed.

57. The electronic device of claim 56, wherein:
determining that the user associated with the respective user device has picked up the accessory of the multi-user device comprises determining, by the accessory of the multi-user device, that the respective user device is within a threshold proximity of the accessory of the multi-user device, and
the visual indication is displayed, by the multi-user device, on the display.

58. The electronic device of claim 56, wherein:
determining that the user associated with the respective user device has picked up the accessory of the multi-user device comprises determining, by the respective user device, that the respective user device is within a threshold proximity of the accessory of the multi-user device, and
the visual indication is displayed on the respective user device.

59. The electronic device of claim 31, the one or more programs including further instructions for:
  displaying, on the display, an access credential input user interface for accessing restricted content on the multi-user device;
  while displaying the access credential input user interface, obtaining third motion information describing motion, through space, of the accessory during a second time period;
  in response to obtaining the third motion information of the accessory:
    in accordance with a determination that fourth motion information of the respective user device describing motion, through space, of the respective user device during the second time period was obtained, and that the motion of the accessory and the motion of the respective user device during the second time period satisfy access-credential criteria, including a criterion that is satisfied when the motion of the accessory and the motion of the respective user device have corresponding movement profiles during the second time period, inputting access credentials from the respective user device to the access credential input user interface for accessing the restricted content on the multi-user device; and
    in accordance with a determination that fifth motion information of a second respective user device describing motion, through space, of the second respective user device during the second time period was obtained, and that the motion of the accessory and the motion of the second respective user device during the second time period satisfy the access-credential criteria, including a criterion that is satisfied when the motion of the accessory and the motion of the second respective user device have corresponding movement profiles during the second time period, inputting access credentials from the second respective user device to the access credential input user interface for accessing the restricted content on the multi-user device.

60. The electronic device of claim 31, wherein:
  the first motion information and the second motion information are both received by the electronic device, and
  determining whether the motion of the accessory and the motion of the respective user device satisfy the profile-switching criteria is performed by the electronic device, and is based on the first motion information and the second motion information.

61. A non-transitory computer readable storage medium storing one or more programs, the one or more programs comprising instructions, which when executed by one or more processors of an electronic device, cause the electronic device to:
  obtain first motion information describing motion, through space, of an accessory of a multi-user device that is in communication with a display, wherein the motion of the accessory is detected during a first time period;
  obtain second motion information describing motion, through space, of a respective user device that is associated with a respective profile, wherein the motion of the respective user device is detected during the first time period; and
  in response to obtaining the first motion information of the accessory and the second motion information of the respective user device:
    in accordance with a determination that the motion of the accessory and the motion of the respective user device satisfy profile-switching criteria, include a criterion that is satisfied when the motion of the accessory and the motion of the respective user device have corresponding movement profiles during the first time period, initiate a process for configuring the multi-user device based on the respective profile, wherein:
      in accordance with a determination that the respective user device is a first user device associated with a first profile, the respective profile is the first profile, and
      in accordance with a determination that the respective user device is a second user device associated with a second profile, different than the first profile, the respective profile is the second profile; and
    in accordance with a determination that the motion of the accessory and the motion of the respective user device do not satisfy the profile-switching criteria, forgo initiating the process for configuring the multi-user device based on the respective profile.

62. The non-transitory computer readable storage medium of claim 61, wherein the accessory of the multi-user device is not associated with a particular user.

63. The non-transitory computer readable storage medium of claim 61, wherein the respective user device is associated with a particular user.

64. The non-transitory computer readable storage medium of claim 61, wherein the respective user device is a personal wearable device.

65. The non-transitory computer readable storage medium of claim 61, wherein the display is a television, the multi-user device is a set-top box that controls display on the television, and the accessory is a remote control for the set-top box.

66. The non-transitory computer readable storage medium of claim 61, the one or more programs comprising further instructions causing the electronic device to:
  in accordance with the determination that the motion of the accessory and the motion of the respective user device do not satisfy the profile-switching criteria, perform a directional action on the multi-user device in accordance with the motion of the accessory.

67. The non-transitory computer readable storage medium of claim 61, wherein initiating the process for configuring the multi-user device based on the respective profile comprises:
  logging into the respective profile on the multi-user device.

68. The non-transitory computer readable storage medium of claim 67, wherein initiating the process for configuring the multi-user device based on the respective profile comprises:
  prior to logging into the respective profile on the multi-user device, logging out of a second respective profile on the multi-user device.

69. The non-transitory computer readable storage medium of claim 61, the one or more programs comprising further instructions causing the electronic device to:
  in accordance with the determination that the motion of the accessory and the motion of the respective user device satisfy the profile-switching criteria, display, on the respective user device, a visual confirmation of the process for configuring the multi-user device based on the first profile.

70. The non-transitory computer readable storage medium of claim 61, wherein:
- the profile-switching criteria include a criterion that is satisfied when, prior to obtaining the second motion information describing the motion, through space, of the respective user device associated with the respective profile, the multi-user device had at one time been configured based on the respective profile, and is not satisfied when, prior to obtaining the second motion information describing the motion, through space, of the respective user device associated with the respective profile, the multi-user device had not at one time been configured based on the first profile, and
- when the second motion information describing the motion, through space, of the respective user device associated with the respective profile is obtained, the multi-user device is not configured based on the respective profile.

71. The non-transitory computer readable storage medium of claim 61, wherein determining that the motion of the accessory and the motion of the respective user device have corresponding movement profiles during the first time period comprises determining that the accessory and the respective user device are located on a same arm of a user while motion of the arm is causing the motion of the accessory and the motion of the respective user device during the first time period.

72. The non-transitory computer readable storage medium of claim 71, wherein the accessory is determined to be in a hand of the user on the arm, and the respective user device is determined to be on a wrist of the user on the arm.

73. The non-transitory computer readable storage medium of claim 71, wherein determining that the motion of the accessory and the motion of the respective user device have corresponding movement profiles during the first time period comprises determining that the motion of the accessory comprises a scaled version of the motion of the respective user device.

74. The non-transitory computer readable storage medium of claim 71, wherein initiating the process for configuring the multi-user device based on the respective profile comprises:
- receiving, by the multi-user device, information from the respective user device for being configured based on the respective profile; and
- configuring the multi-user device based on the respective profile using the information from the respective user device.

75. The non-transitory computer readable storage medium of claim 74, wherein:
- the accessory is in communication with the multi-user device via a first connection, and
- the information for being configured based on the respective profile is received by the multi-user device from the respective user device via the first connection.

76. The non-transitory computer readable storage medium of claim 74, wherein:
- the accessory is in communication with the multi-user device via a first connection, and
- the information for being configured based on the respective profile is received by the multi-user device from the respective user device via a second connection, different from the first connection.

77. The non-transitory computer readable storage medium of claim 76, wherein the second connection comprises a connection between the multi-user device and a server, and the respective user device is in communication with the server.

78. The non-transitory computer readable storage medium of claim 61, wherein the profile-switching criteria include a criterion that is satisfied when the motion of the accessory and the motion of the respective user device both correspond to a predefined target movement profile.

79. The non-transitory computer readable storage medium of claim 78, the one or more programs comprising further instructions causing the electronic device to:
- display a visual indication of the predefined target movement profile,
- wherein the first motion information describing the motion, through space, of the accessory and the second motion information describing the motion, through space, of the respective user device are obtained while the visual indication of the predefined target movement profile is displayed.

80. The non-transitory computer readable storage medium of claim 61, wherein the profile-switching criteria include a criterion that is satisfied when a user is authenticated on the respective user device when the first motion information and the second motion information are obtained, and not satisfied when the user is not authenticated on the respective user device when the first motion information and the second motion information are obtained.

81. The non-transitory computer readable storage medium of claim 61, wherein initiating the process for configuring the multi-user device based on the respective profile comprises:
- displaying a visual confirmation of a request to configure the multi-user device based on the respective profile;
- while displaying the visual confirmation, receiving an input; and
- in response to receiving the input:
  - in accordance with a determination that the input corresponds to an input confirming the request to configure the multi-user device based on the respective profile, continuing the process for configuring the multi-user device based on the respective profile; and
  - in accordance with a determination that the input corresponds to an input canceling the request to configure the multi-user device based on the respective profile, terminating the process for configuring the multi-user device based on the respective profile.

82. The non-transitory computer readable storage medium of claim 61, the one or more programs comprising further instructions causing the electronic device to:
- after initiating the process for configuring the multi-user device based on the respective profile, and while the multi-user device is configured based on the respective profile:
  - obtain third motion information describing motion, through space, of the accessory of the multi-user device during a second time period, after the first time period;
  - obtain fourth motion information describing motion, through space, of a second respective user device that is associated with a second respective profile, different from the respective profile, wherein the motion of the second respective user device is detected during the second time period; and
  - in response to obtaining the third motion information of the accessory and the fourth motion information of the second respective user device:

in accordance with a determination that the motion of the accessory and the motion of the second respective user device satisfy the profile-switching criteria, including a criterion that is satisfied when the motion of the accessory and the motion of the second respective user device have corresponding movement profiles during the second time period, initiate a process for configuring the multi-user device based on the second respective profile rather than the respective profile; and in accordance with a determination that the motion of the accessory and the motion of the second respective user device do not satisfy the profile-switching criteria, forgo initiating the process for configuring the multi-user device based on the second respective profile.

83. The non-transitory computer readable storage medium of claim 61, wherein:
configuring the multi-user device based on the respective profile grants the multi-user device access to a first set of content that is not available when the multi-user device is not configured based on the respective profile.

84. The non-transitory computer readable storage medium of claim 61, wherein:
configuring the multi-user device based on the respective profile causes the multi-user device to operate using a first set of personalization options that are different from personalization options under which the multi-user device operates when not configured based on the respective profile.

85. The non-transitory computer readable storage medium of claim 61, wherein:
configuring the multi-user device based on the respective profile grants the multi-user device access to a first set of access credentials that are not available when the multi-user device is not configured based on the respective profile.

86. The non-transitory computer readable storage medium of claim 61, the one or more programs comprising further instructions causing the electronic device to:
prior to obtaining the first motion information and the second motion information, in accordance with a determination that a user associated with the respective user device has picked up the accessory of the multi-user device, display a visual indication of the user's ability to initiate the process for configuring the multi-user device based on the respective profile,
wherein the first motion information and the second motion information are obtained while the visual indication is displayed.

87. The non-transitory computer readable storage medium of claim 86, wherein:
determining that the user associated with the respective user device has picked up the accessory of the multi-user device comprises determining, by the accessory of the multi-user device, that the respective user device is within a threshold proximity of the accessory of the multi-user device, and
the visual indication is displayed, by the multi-user device, on the display.

88. The non-transitory computer readable storage medium of claim 86, wherein:
determining that the user associated with the respective user device has picked up the accessory of the multi-user device comprises determining, by the respective user device, that the respective user device is within a threshold proximity of the accessory of the multi-user device, and
the visual indication is displayed on the respective user device.

89. The non-transitory computer readable storage medium of claim 61, the one or more programs comprising further instructions causing the electronic device to:
display, on the display, an access credential input user interface for accessing restricted content on the multi-user device;
while displaying the access credential input user interface, obtain third motion information describing motion, through space, of the accessory during a second time period;
in response to obtaining the third motion information of the accessory:
in accordance with a determination that fourth motion information of the respective user device describing motion, through space, of the respective user device during the second time period was obtained, and that the motion of the accessory and the motion of the respective user device during the second time period satisfy access-credential criteria, including a criterion that is satisfied when the motion of the accessory and the motion of the respective user device have corresponding movement profiles during the second time period, input access credentials from the respective user device to the access credential input user interface for accessing the restricted content on the multi-user device; and
in accordance with a determination that fifth motion information of a second respective user device describing motion, through space, of the second respective user device during the second time period was obtained, and that the motion of the accessory and the motion of the second respective user device during the second time period satisfy the access-credential criteria, including a criterion that is satisfied when the motion of the accessory and the motion of the second respective user device have corresponding movement profiles during the second time period, input access credentials from the second respective user device to the access credential input user interface for accessing the restricted content on the multi-user device.

90. The non-transitory computer readable storage medium of claim 61, wherein:
the first motion information and the second motion information are both received by the electronic device, and
determining whether the motion of the accessory and the motion of the respective user device satisfy the profile-switching criteria is performed by the electronic device, and is based on the first motion information and the second motion information.

* * * * *